US012741715B2

(12) United States Patent
Tachibana et al.

(10) Patent No.: US 12,741,715 B2
(45) Date of Patent: Sep. 22, 2026

(54) COMPONENT FOR HUMAN-POWERED VEHICLE AND CONTROL SYSTEM FOR HUMAN-POWERED VEHICLE

(71) Applicant: Shimano Inc., Sakai (JP)

(72) Inventors: Katsuhiro Tachibana, Sakai (JP); Tomoki Koide, Sakai (JP)

(73) Assignee: Shimano Inc., Osaka (JP)

( * ) Notice: Subject to any disclaimer, the term of this patent is extended or adjusted under 35 U.S.C. 154(b) by 41 days.

(21) Appl. No.: 18/409,389

(22) Filed: Jan. 10, 2024

(65) Prior Publication Data

US 2024/0262461 A1 Aug. 8, 2024

(30) Foreign Application Priority Data

Feb. 7, 2023 (JP) ................................ 2023-017081
Aug. 8, 2023 (JP) ................................ 2023-129275

(51) Int. Cl.
*B62M 25/08* (2006.01)

(52) U.S. Cl.
CPC .................................. *B62M 25/08* (2013.01)

(58) Field of Classification Search
CPC ...................................................... B62M 25/08
USPC ........................................................... 307/9.1
See application file for complete search history.

(56) References Cited

U.S. PATENT DOCUMENTS 10,308,319 B1 6/2019 Chuang et al.
10,392,078 B2 8/2019 Jordan et al.
10,940,909 B2 3/2021 Masuda et al.
2019/0031283 A1 1/2019 Suzuki et al.
2019/0248438 A1* 8/2019 Masuda .................. B62J 45/20
2022/0266939 A1 8/2022 Ericksen et al.

FOREIGN PATENT DOCUMENTS

CN 109249877 A 1/2019
CN 109808825 A 5/2019
CN 110138396 A 8/2019
CN 111294073 A 6/2020

* cited by examiner

*Primary Examiner* — Richard Tan
(74) *Attorney, Agent, or Firm* — Spencer Fane, LLP

(57) ABSTRACT

A human-powered vehicle component includes a communicator and an electronic controller. The communicator is configured to receive a first signal transmitted from at least one transmitter that is separate from the component. The electronic controller is configured to control the communicator in accordance with a communicator control state. The communicator control state includes a first communicator control state, a second communicator control state in which power consumption of the communicator is greater than power consumption of the communicator in the first communicator control state, and a third communicator control state in which power consumption of the communicator is greater than the power consumption of the communicator in the second communicator control state. In a case where the communicator control state is the second communicator control state, the electronic controller is configured to switch the communicator control state to the third communicator control state in accordance with the first signal.

32 Claims, 28 Drawing Sheets

10
20B
22H
22
22F
34
34B
30
30B
34
34A
28
12
14
16
32
22S
30
30A
18
98
26
26A
26X
20A

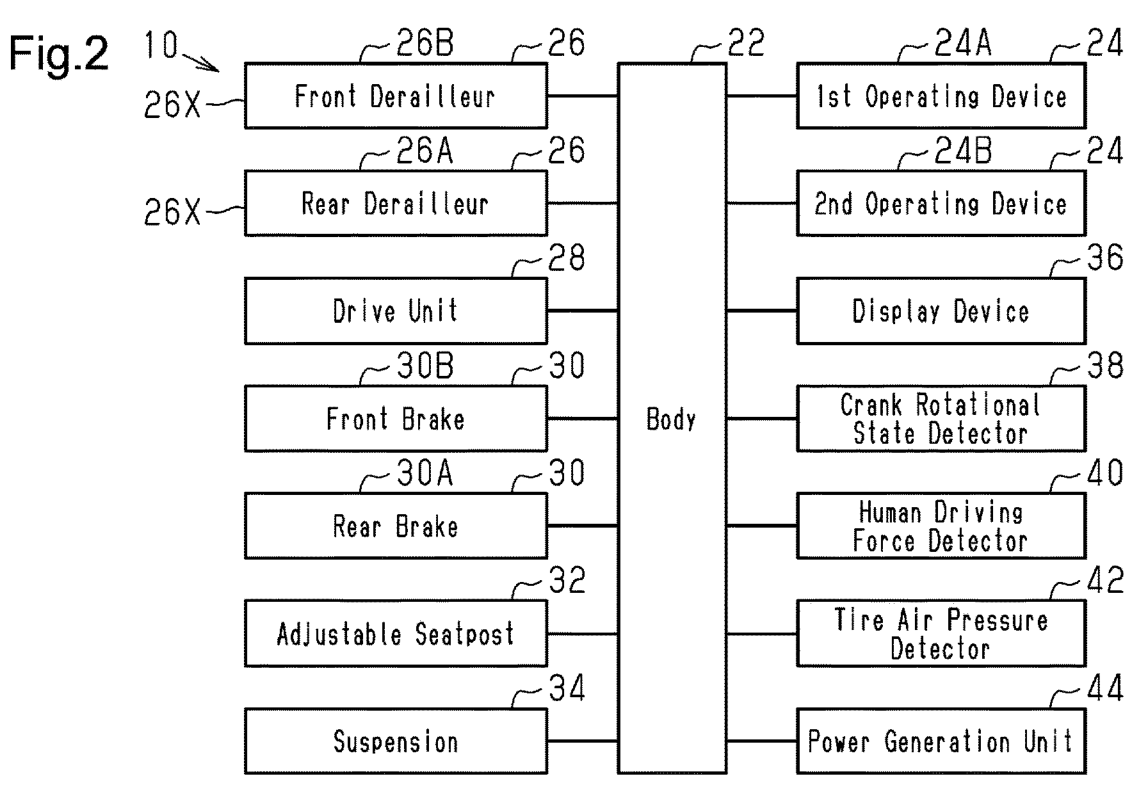
Fig.2
10
26X
26B
26
Front Derailleur
26X
26A
26
Rear Derailleur
28
Drive Unit
30B
30
Front Brake
30A
30
Rear Brake
32
Adjustable Seatpost
34
Suspension
22
Body
24A
24
1st Operating Device
24B
24
2nd Operating Device
36
Display Device
38
Crank Rotational State Detector
40
Human Driving Force Detector
42
Tire Air Pressure Detector
44
Power Generation Unit

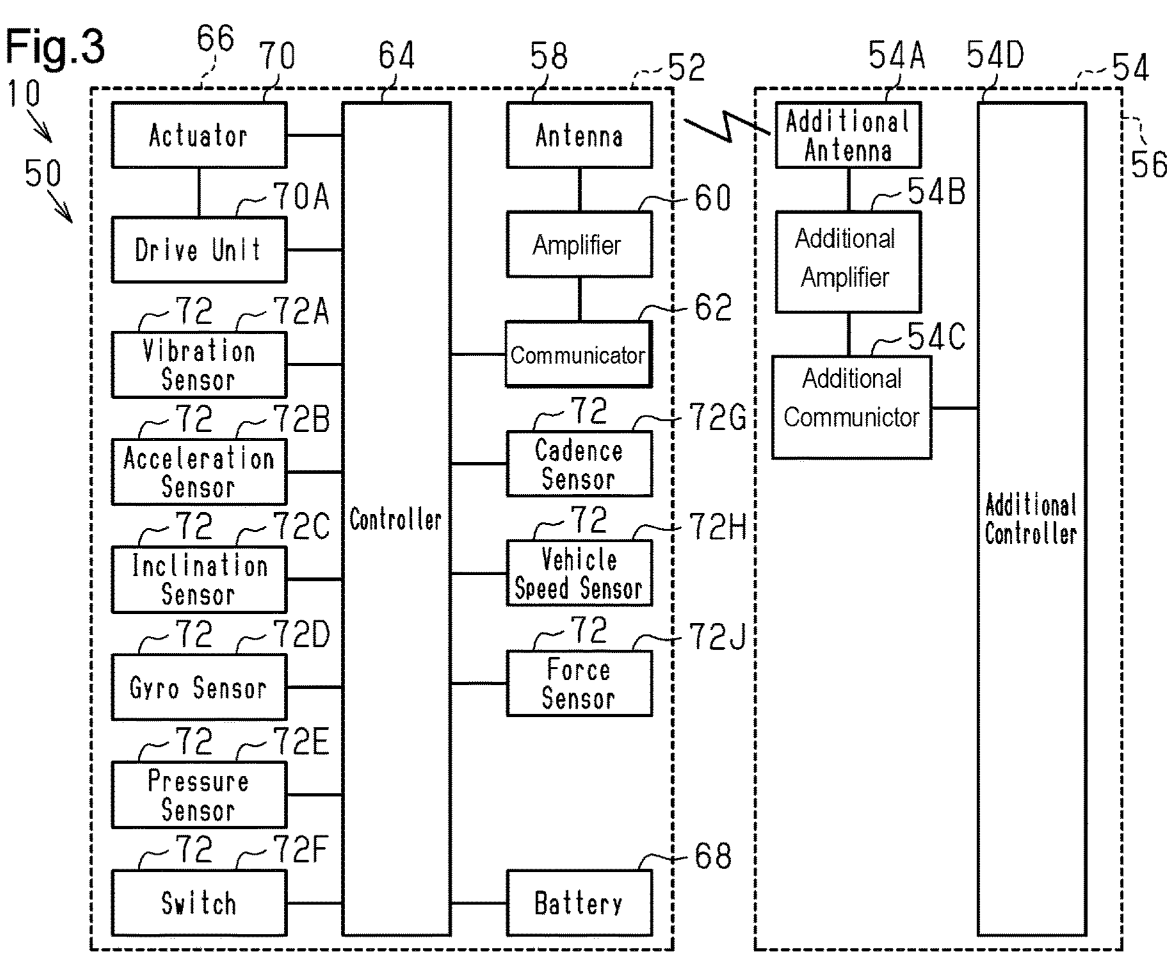
Fig.3
10
50
66
70
64
58
52
Actuator
Drive Unit
70A
72
72A
Vibration Sensor
72
72B
Acceleration Sensor
72
72C
Inclination Sensor
72
72D
Gyro Sensor
72
72E
Pressure Sensor
72
72F
Switch
Controller
Antenna
60
Amplifier
62
Communicator
72
72G
Cadence Sensor
72
72H
Vehicle Speed Sensor
72
72J
Force Sensor
68
Battery
54A
54D
54
56
Additional Antenna
54B
Additional Amplifier
54C
Additional Communictor
Additional Controller

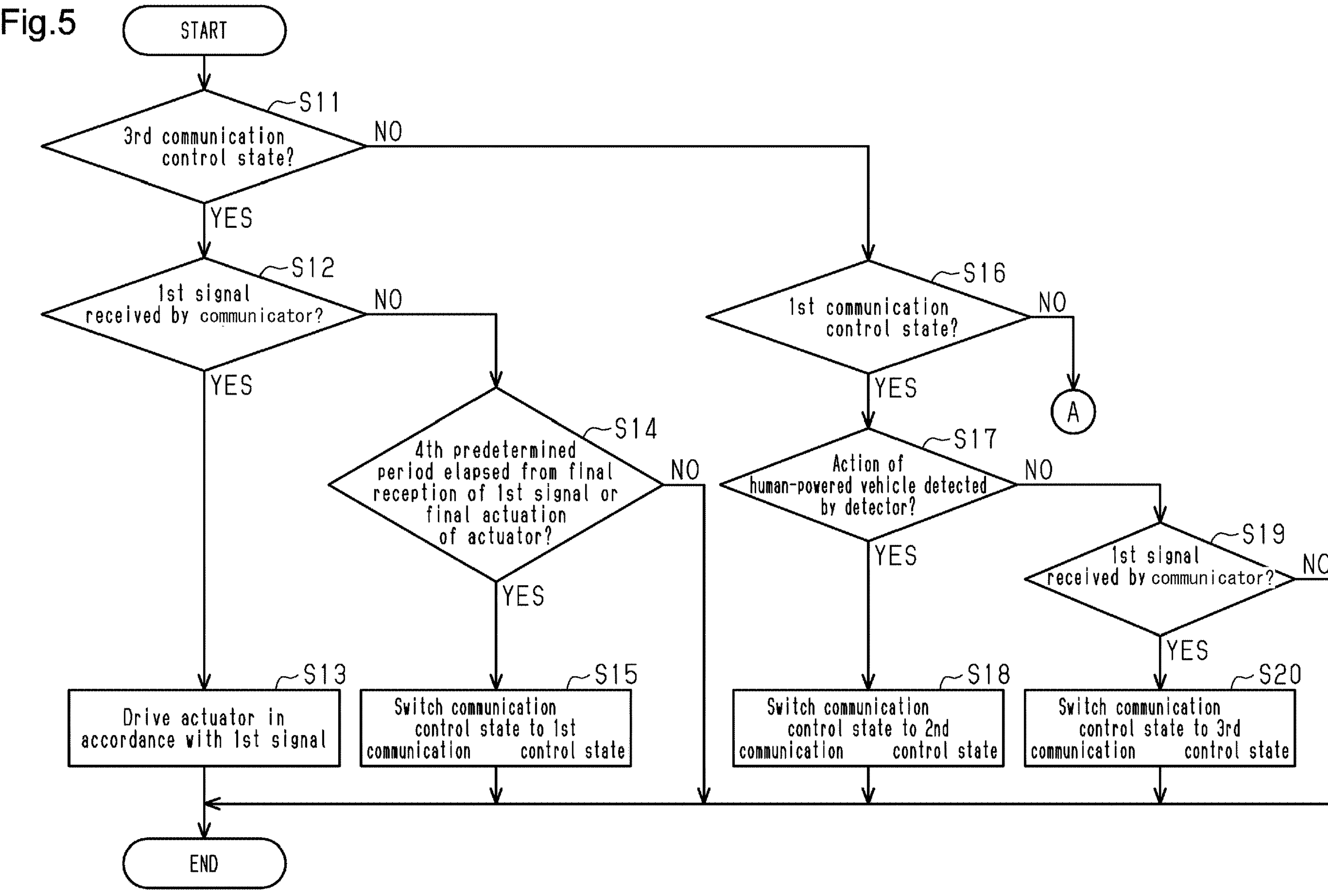
Fig.5
START
S11
3rd communication control state?
YES
NO
S12
1st signal received by communicator?
YES
NO
S13
Drive actuator in accordance with 1st signal
S14
4th predetermined period elapsed from final reception of 1st signal or final actuation of actuator?
YES
NO
S15
Switch communication control state to 1st communication control state
S16
1st communication control state?
YES
NO
A
S17
Action of human-powered vehicle detected by detector?
YES
NO
S18
Switch communication control state to 2nd communication control state
S19
1st signal received by communicator?
YES
NO
S20
Switch communication control state to 3rd communication control state
END

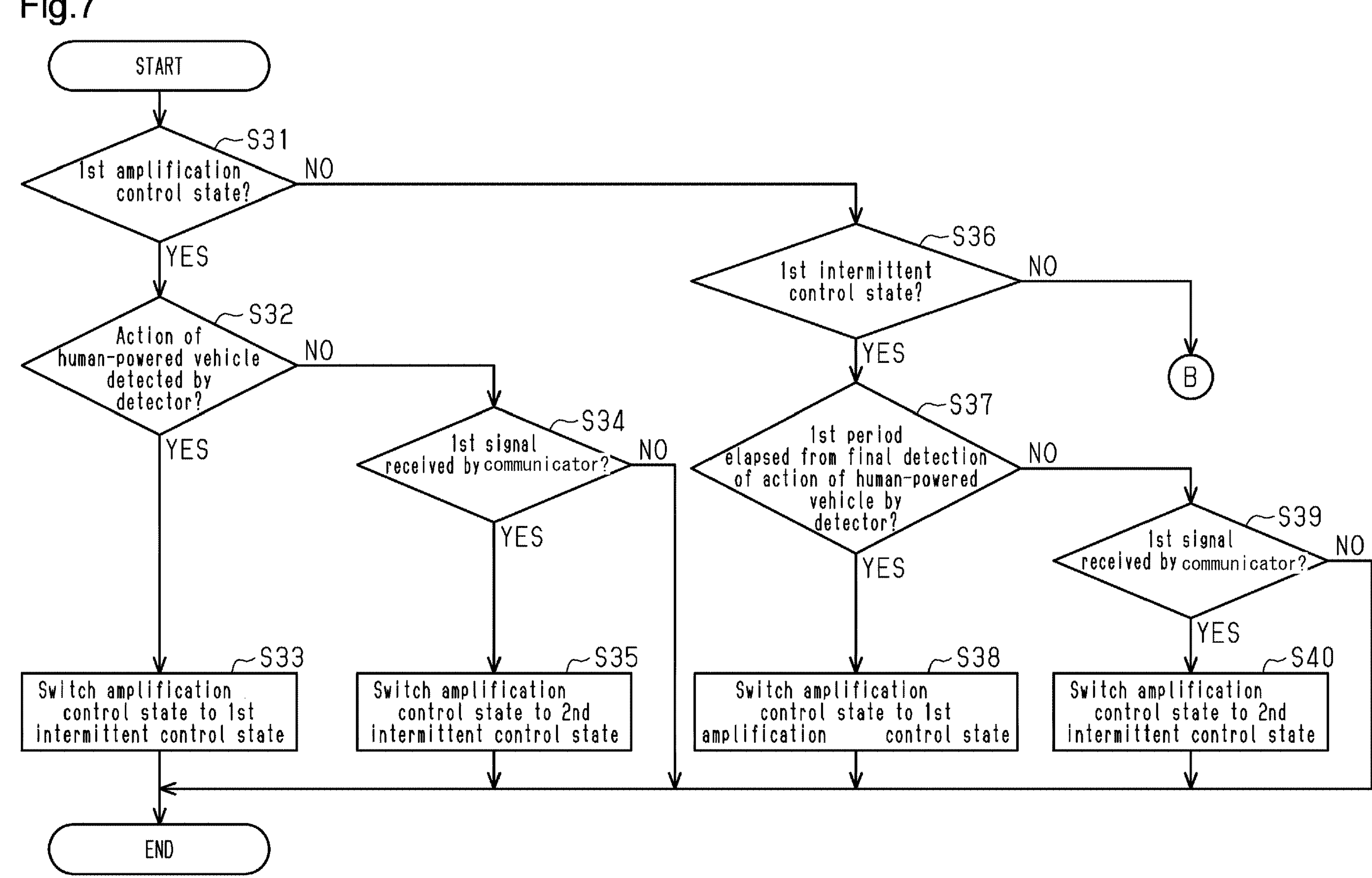
Fig.7
START
S31
1st amplification control state?
YES
NO
S32
Action of human-powered vehicle detected by detector?
YES
NO
S33
Switch amplification control state to 1st intermittent control state
S34
1st signal received by communicator?
YES
NO
S35
Switch amplification control state to 2nd intermittent control state
S36
1st intermittent control state?
YES
NO
B
S37
1st period elapsed from final detection of action of human-powered vehicle by detector?
YES
NO
S38
Switch amplification control state to 1st amplification control state
S39
1st signal received by communicator?
YES
NO
S40
Switch amplification control state to 2nd intermittent control state
END (a) Detector
Detection
Non-Detection
(b) Communicator
Activation State
Standby State
(c) Amplifier
Activation State
Standby State
(d) Actuator
Driven
Non-Driven
(e) Communication Device
Transmission
Non-Transmission
Time
t10
t11
t12
t13
t14
t15
t16
t17
t18
t19
t20
R1
R2
R3
R4
R5
R6
R7
R8
R9
R10
A1
A2
A3
A4
A5
A6
A7
A8
A9
A10
X1
X2
X3

(a)Detector
Detection
Non-Detection
(b) Communicator
Activation State
Standby State
(c) Amplifier
Activation State
Standby State
(d)Actuator
Driven
Non-Driven
(e)Communication Device
Transmission
Non-Transmission
Y2
t60
t61
t62
t63
Time

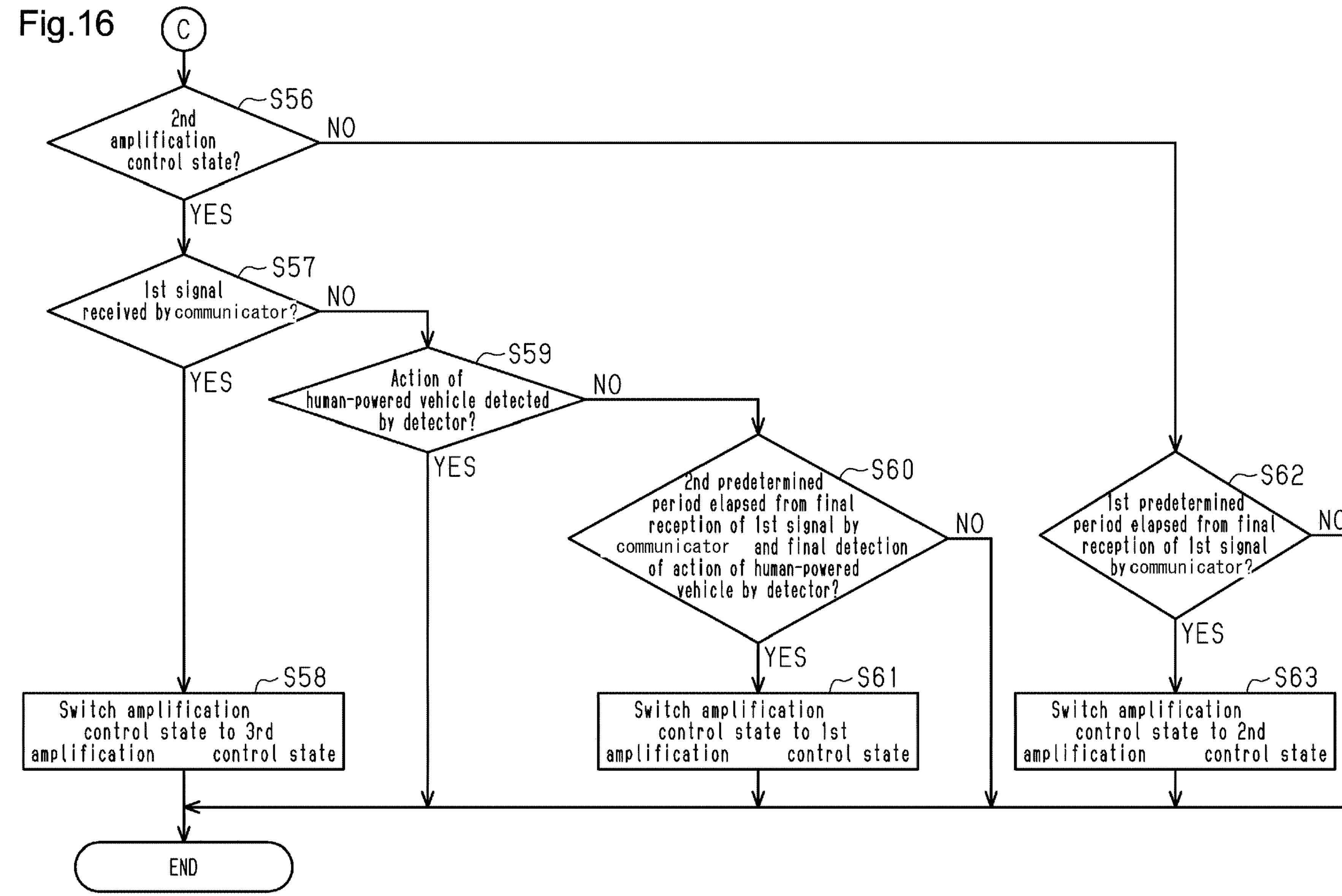
Fig.16
C
S56
2nd amplification control state?
YES
NO
S57
1st signal received by communicator?
YES
NO
S58
Switch amplification control state to 3rd amplification control state
S59
Action of human-powered vehicle detected by detector?
YES
NO
S60
2nd predetermined period elapsed from final reception of 1st signal by communicator and final detection of action of human-powered vehicle by detector?
YES
NO
S61
Switch amplification control state to 1st amplification control state
S62
1st predetermined period elapsed from final reception of 1st signal by communicator?
YES
NO
S63
Switch amplification control state to 2nd amplification control state
END

Fig.20

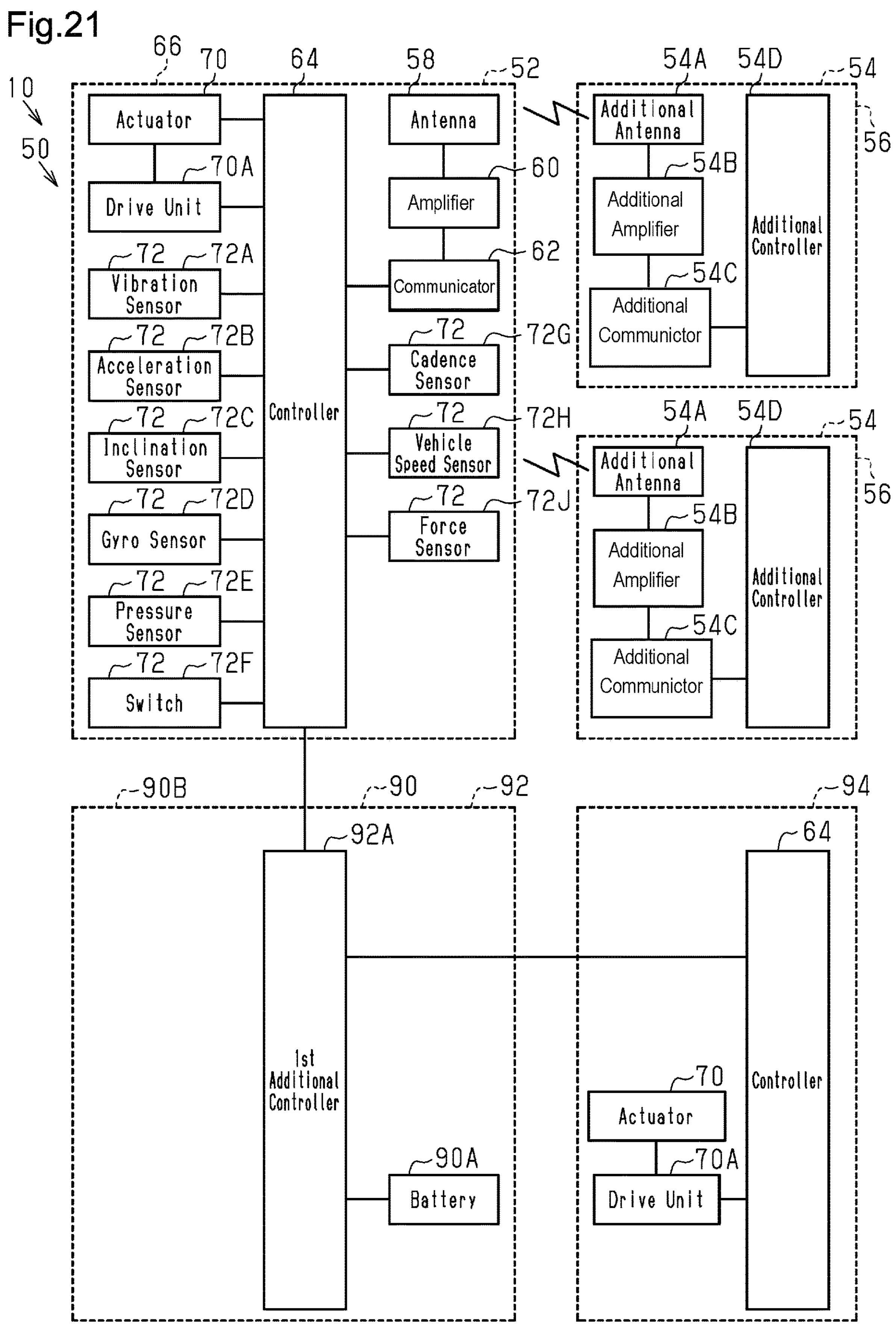
Fig.21
10
50
66
70
64
58
52
54A
54D
54
56
Actuator
Drive Unit
70A
Vibration Sensor
72
72A
Acceleration Sensor
72B
Inclination Sensor
72C
Gyro Sensor
72D
Pressure Sensor
72E
Switch
72F
Controller
Antenna
Amplifier
60
Communicator
62
Cadence Sensor
72G
Vehicle Speed Sensor
72H
Force Sensor
72J
Additional Antenna
Additional Amplifier
54B
Additional Communictor
54C
Additional Controller
90B
90
92
94
92A
1st Additional Controller
Battery
90A
Controller
Actuator
Drive Unit

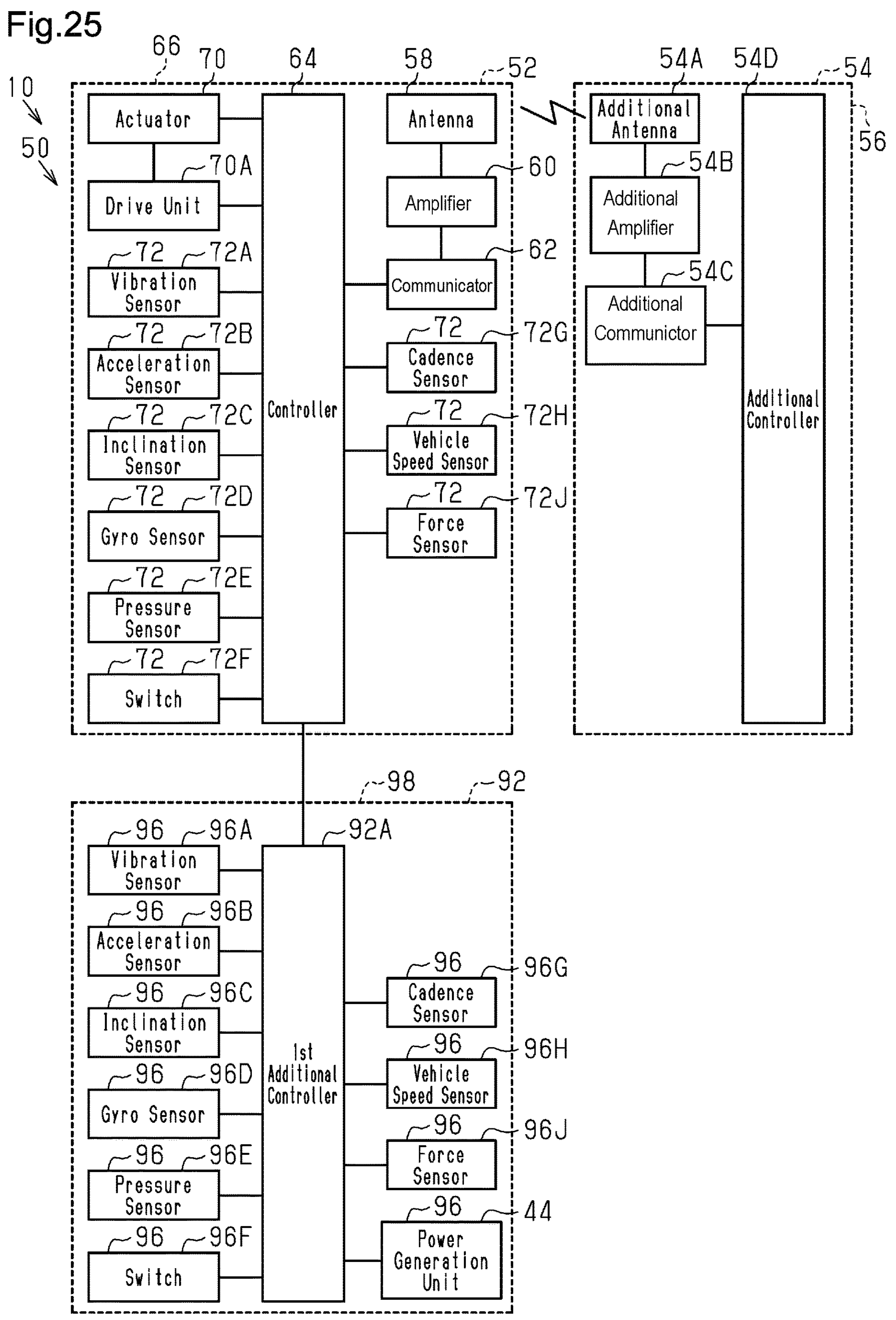
Fig.25
10
50
66
70
64
58
52
54A
54D
54
56
Actuator
Drive Unit
70A
Vibration Sensor
72
72A
Acceleration Sensor
72B
Inclination Sensor
72C
Gyro Sensor
72D
Pressure Sensor
72E
Switch
72F
Controller
Antenna
Amplifier
60
Communicator
62
Cadence Sensor
72G
Vehicle Speed Sensor
72H
Force Sensor
72J
Additional Antenna
Additional Amplifier
54B
Additional Communictor
54C
Additional Controller
98
92
92A
Vibration Sensor
96
96A
Acceleration Sensor
96B
Inclination Sensor
96C
Gyro Sensor
96D
Pressure Sensor
96E
Switch
96F
1st Additional Controller
Cadence Sensor
96G
Vehicle Speed Sensor
96H
Force Sensor
96J
Power Generation Unit
44

10
24
20B
30B
30
22H
34
34B
22F
22
28
14
12
26B
26
32
16
22S
30
30A
20A
26X
18
98
26
26A

COMPONENT FOR HUMAN-POWERED VEHICLE AND CONTROL SYSTEM FOR HUMAN-POWERED VEHICLE

CROSS-REFERENCE TO RELATED APPLICATIONS

This application claims priority to Japanese Patent Application No. 2023-0170821, filed on Feb. 7, 2023 and Japanese Patent Application No. 2023-129275, filed on Aug. 8, 2023. The entire disclosures of Japanese Patent Application No. 2023-0170821 and Japanese Patent Application No. 2023-129275 are hereby incorporated herein by reference.

BACKGROUND

Technical Field

The present disclosure generally relates to a component for a human-powered vehicle and a control system for a human-powered vehicle.

Background Information

U.S. Patent Application Publication No. 2019/0031283 (Patent Document 1) discloses an example of a component for a human-powered vehicle that includes a communicator.

SUMMARY

The human-powered vehicle component of Patent Document 1 controls the communicator in accordance with different control states.

One object of the present disclosure is to provide a component for a human-powered vehicle and a control system for a human-powered vehicle that control a communicator in a preferred manner.

A component in accordance with a first aspect of the present disclosure is for a human-powered vehicle. The component comprises a communicator and an electronic controller. The communicator is configured to receive a first signal transmitted from at least one transmitter that is separate from the component. The electronic controller is configured to control the communicator in accordance with a communication control state. The communication control state includes a first communication control state, a second communication control state in which power consumption of the communicator is greater than power consumption of the communicator in the first communication control state, and a third communication control state in which power consumption of the communicator is greater than the power consumption of the communicator in the second communication control state. The electronic controller is configured to switch the communication control state to the third communication control state in accordance with the first signal in a case where the communication control state is the second communication control state. The electronic controller is configured to control the communicator in the first communication control state so that a reception cycle of the communicator is a first reception cycle. The electronic controller is configured to control the communicator in the second communication control state so that a reception cycle of the communicator is a second reception cycle that is shorter than the first reception cycle. The first reception cycle includes a first reception period. The second reception cycle includes a second reception period. The electronic controller is configured to control the communicator so that the communicator receives the first signal in the first reception period. The electronic controller is configured to control the communicator so that the communicator receives the first signal in the second reception period.

With the component according to the first aspect, the communicator is controlled in the three communication control states differing in power consumption. Since the communication control state is switched in accordance with the first signal, the component limits increases in power consumption of the communicator in accordance with the first signal. Thus, the component controls the communicator in a preferred manner. In the component according to the first aspect, the reception cycle of the first communication control state differs from the reception cycle of the second communication control state. Thus, increases in power consumption are limited in a preferred manner.

In accordance with a second aspect of the present disclosure, the component according to the first aspect is configured so that the first reception cycle further includes a first reception interval from the first reception period to a following first reception period. The second reception cycle further includes a second reception interval from the second reception period to a following second reception period.

With the component according to the second aspect, in a case where the communication control state is the first communication control state, the communicator is controlled between the first reception period and the first reception interval. Also, in a case where the communication control state is the second communication control state, the communicator is controlled between the second reception period and the second reception interval.

In accordance with a third aspect of the present disclosure, the component according to the second aspect is configured so that the first reception interval is longer than the second reception interval.

With the component according to the third aspect, the reception interval in which the communication control state is the first communication control state is longer than the reception interval in which the communication control state is the second communication control state.

A component in accordance with a fourth aspect of the present disclosure is for a human-powered vehicle. The component comprises a communicator and an electronic controller. The communicator is configured to receive a first signal transmitted from at least one transmitter that is separate from the component, and a controller configured to control the communicator in accordance with a communication control state. The communication control state includes a first communication control state, a second communication control state in which power consumption of the communicator is greater than power consumption of the communicator in the first communication control state, and a third communication control state in which power consumption of the communicator is greater than the power consumption of the communicator in the second communication control state. The electronic controller is configured to switch the communication control state to the third communication control state in accordance with the first signal in a case where the communication control state is the second communication control state. The electronic controller is configured to control the communicator in the first communication control state so that a reception cycle of the communicator is a first reception cycle. The electronic controller is configured to control the communicator in the second communication control state so that a reception cycle of the communicator is a second reception cycle. The first reception cycle includes a first reception period and a first reception interval from the first reception period to a following first reception period. The second reception cycle includes a second reception period and a second reception interval from the second reception period to a following second reception period. The second reception interval is shorter than the first reception interval. The electronic controller is configured to control the communicator so that the communicator receives the first signal in the first reception period. The electronic controller is configured to control the communicator so that the communicator receives the first signal in the second reception period.

With the component according to the fourth aspect, the communicator is controlled in the three communication control states differing in power consumption. Since the communication control state is switched in accordance with the first signal, the component limits increases in power consumption of the communicator in accordance with the first signal. Thus, the component controls the communicator in a preferred manner. In the component according to the fourth aspect, the first reception interval of the first communication control state differs from the second reception interval of the second communication control state. Thus, increases in power consumption are limited in a preferred manner.

In accordance with a fifth aspect of the present disclosure, the component according to the third or fourth aspect is configured so that the first reception interval includes a first low sensitivity period. The electronic controller is configured to control the communicator so that a reception sensitivity of the communicator in the first low sensitivity period is lower than a reception sensitivity of the communicator in the first reception period.

With the component according to the fifth aspect, the reception sensitivity of the communicator is lowered so that power consumption of the communicator in the first reception interval is less than power consumption of the communicator in the first reception period.

In accordance with a sixth aspect of the present disclosure, the component according to the fifth aspect is configured so that the first low sensitivity period includes a first non-reception period. The electronic controller is configured to control the communicator so that the communicator does not receive the first signal in the first non-reception period.

With the component according to the sixth aspect, in the first non-reception period, the communicator does not consume power for receiving the first signal. This decreases power consumption of the communicator in the first reception interval.

In accordance with a seventh aspect of the present disclosure, the component according to any one of the third to sixth aspects is configured so that the second reception interval includes a second low sensitivity period. The electronic controller is configured to control the communicator so that a reception sensitivity of the communicator in the second low sensitivity period is lower than a reception sensitivity of the communicator in the second reception period.

With the component according to the seventh aspect, the reception sensitivity of the communicator is lowered so that power consumption of the communicator in the second reception interval is less than power consumption of the communicator in the second reception period.

In accordance with an eighth aspect of the present disclosure, the component according to the seventh aspect is configured so that the second low sensitivity period includes a second non-reception period. The electronic controller is configured to control the communicator so that the communicator does not receive the first signal in the second non-reception period.

With the component according to the eighth aspect, in the second non-reception period, the communicator does not consume power for receiving the first signal. This decreases power consumption of the communicator in the second reception interval.

In accordance with a ninth aspect of the present disclosure, the component according to any one of the first to eighth aspects is configured so that the electronic controller is configured to switch the communication control state to the third communication control state in accordance with the first signal in a case where the communication control state is the first communication control state.

With the component according to the ninth aspect, the communication control state is switched from the first communication control state to the third communication control state in accordance with the first signal. Thus, the communication control state is changed without a user operating a button or the like provided on the component. The component improves usability.

In accordance with a tenth aspect of the present disclosure, the component according to any one of the first to ninth aspects is configured so that the electronic controller is configured to control the communicator so that the first reception period becomes equal to the second reception period.

With the component according to the tenth aspect, power consumption corresponding to one cycle in the second reception cycle becomes close to power consumption corresponding to one cycle in the first reception cycle.

In accordance with an eleventh aspect of the present disclosure, the component according to any one of the first to tenth aspects is configured so that the electronic controller is configured to control the communicator in the third communication control state so that the communicator continuously receives the first signal.

With the component according to the eleventh aspect, in the third communication control state, the first signal is continuously received. Thus, the first signal is received in a preferred manner.

In accordance with a twelfth aspect of the present disclosure, the component according to any one of the first to eleventh aspects further comprises an actuator. the electronic controller is configured to control the actuator in accordance with the first signal in a case where the communicator receives the first signal in a case where the communication control state is the third communication control state.

With the component according to the twelfth aspect, in the third communication control state, the actuator is controlled in accordance with the first signal.

In accordance with a thirteenth aspect of the present disclosure, the component according to any one of the first to twelfth aspects is configured so that the electronic controller is configured to switch the communication control state to the other one of the first communication control state and the second communication control state in accordance with a state of the human-powered vehicle in a case where the communication control state is one of the first communication control state and the second communication control state.

The component according to the thirteenth aspect switches from one of the first communication control state and the second communication control state to the other of the first communication control state and the second communication control state when necessary. The electronic controller switches the communication control state from one of the first communication control state and the second communication control state to the other one of the first communication control state and the second communication control state based on a condition differing from the condition for switching the communication control state from the second communication control state to the third communication control state. Thus, the component switches the communication control state in a preferred manner.

In accordance with a fourteenth aspect of the present disclosure, the component according to any one of the first to thirteenth aspects is configured so that the electronic controller is configured to switch the communication control state to the first communication control state in a case where the communication control state is the second communication control state, and where the communicator does not receive the first signal and the human-powered vehicle is continuously maintained in a predetermined state over a first period or longer.

With the component according to the fourteenth aspect, in a case where the communication control state is the second communication control state, if the does not receive the first signal and the human-powered vehicle is continuously maintained in the predetermined state over the first period or longer, the communication control state is switched to the first communication control state. This limits increases in power consumption of the communicator.

In accordance with a fifteenth aspect of the present disclosure, the component according to any one of the first to fourteenth aspects is configured so that the electronic controller is configured to switch the communication control state to the first communication control state in a case where the communication control state is the second communication control state and the communicator does not receive the first signal before an elapsed period from when the communication control state is switched to the second communication control state becomes a second period.

With the component according to the fifteenth aspect, in a case where the elapsed period from when the communication control state is switched to the second communication control state becomes the second period, the communication control state is switched to the first communication control state. Thus, the component readily maintains the communication control state in the first communication control state. This limits increases in power consumption of the communicator.

A component in accordance with a sixteenth aspect of the present disclosure is for a human-powered vehicle. The component comprises a communicator and an electronic controller. The communicator is configured to receive a first signal transmitted from at least one transmitter that is separate from the component, and a controller configured to control the communicator in accordance with a communication control state. The communication control state includes a first communication control state and a second communication control state in which power consumption of the communicator is greater than power consumption of the communicator in the first communication control state. The electronic controller is configured to switch the communication control state to the first communication control state in a case where the communication control state is the second communication control state and the communicator does not receive the first signal before an elapsed period from when the communication control state is switched to the second communication control state becomes a second period.

With the component according to the sixteenth aspect, the communicator is controlled in the two communication control states differing in power consumption. In a case where the elapsed period from when the communication control state is switched to the second communication control state becomes the second period, the communication control state is switched to the first communication control state. This limits increases in power consumption of the communicator.

In accordance with a seventeenth aspect of the present disclosure, in the component according to the sixteenth aspect, the electronic controller is configured to control the communicator in the first communication control state so that a reception cycle of the communicator is a first reception cycle. The electronic controller is configured to control the communicator in the second communication control state so that a reception cycle of the communicator is a second reception cycle. The first reception cycle includes a first reception period. The second reception cycle includes a second reception period. The electronic controller is configured to control the communicator so that the communicator receives the first signal in the first reception period. The electronic controller is configured to control the communicator so that the communicator receives the first signal in the second reception period.

With the component according to the seventeenth aspect, the communicator is controlled in accordance with the first reception cycle and the second reception cycle.

In accordance with an eighteenth aspect of the present disclosure, the component according to the seventeenth aspect is configured so that the first reception cycle is longer than the second reception cycle.

With the component according to the eighteenth aspect, the communicator is controlled between the first communication control state and the second communication control state that differ in reception cycle.

In accordance with a nineteenth aspect of the present disclosure, the component according to any one of the fifteenth to eighteenth aspects is configured so that the electronic controller is configured to switch the communication control state to the first communication control state as the second period elapses regardless of state of the human-powered vehicle in a case where the communication control state is the second communication control state and the communicator does not receive the first signal before the elapsed period from when the communication control state is switched to the second communication control state becomes the second period.

With the component according to the nineteenth aspect, in a case where the elapsed period from when the communication control state is switched to the second communication control state becomes the second period, if the component does not receive the first signal, the communication control state is switched to the first communication control state regardless of the state of the human-powered vehicle. This limits increases in power consumption of the communicator.

In accordance with a twentieth aspect of the present disclosure, the component according to any one of the thirteenth, fourteenth, and nineteenth aspects is configured so that the state of the human-powered vehicle includes at least one of vehicle body state of the human-powered vehicle, traveling state of the human-powered vehicle, and state of a rider of the human-powered vehicle.

With the component according to the twentieth aspect, the communication control state is switched in accordance with at least one of the vehicle body state of the human-powered vehicle, the traveling state of the human-powered vehicle, and the state of the rider of the human-powered vehicle.

In accordance with a twenty-first aspect of the present disclosure, the component according to the twentieth aspect further comprises a detector configured to detect the state of the human-powered vehicle. The detector includes at least one of a vibration sensor, an acceleration sensor, an inclination sensor, a gyro sensor, a pressure sensor, a switch, a cadence sensor, a vehicle speed sensor, and a force sensor.

With the component according to the twenty-first aspect, the state of the human-powered vehicle is detected by at least one of the vibration sensor, the acceleration sensor, the inclination sensor, the gyro sensor, the pressure sensor, the switch, the cadence sensor, the vehicle speed sensor, and the force sensor.

In accordance with a twenty-second aspect of the present disclosure, the component according to the twentieth aspect is configured so that the human-powered vehicle includes a first additional component that is separate from the component. The first additional component includes a detector configured to detect the state of the human-powered vehicle. The electronic controller is configured to switch the communication control state to the other one of the first communication control state and the second communication control state in accordance with predetermined information transmitted from a first additional controller of the first additional component based on a detection result of the detector in a case where the communication control state is one of the first communication control state and the second communication control state.

With the component according to the twenty-second aspect, the electronic controller switches the communication control state based on a detection result of the detector of the first additional component. The trigger for switching the communication control state is obtained by the detector of the first additional component differing from the component. Thus, the electronic controller switches the communication control state from one of the first communication control state and the second communication control state to the other one of the first communication control state and the second communication control state.

In accordance with a twenty-third aspect of the present disclosure, the component according to the twenty-second aspect is configured so that the detector includes at least one of a vibration sensor, an acceleration sensor, an inclination sensor, a gyro sensor, a pressure sensor, a switch, a cadence sensor, a vehicle speed sensor, and a force sensor.

With the component according to the twenty-third aspect, the state of the human-powered vehicle is detected by at least one of the vibration sensor, the acceleration sensor, the inclination sensor, the gyro sensor, the pressure sensor, the switch, the cadence sensor, the vehicle speed sensor, and the force sensor.

In accordance with a twenty-fourth aspect of the present disclosure, the component according to the twenty-second or twenty-third aspect is configured so that the first additional component includes a battery configured to supply electric power to the communicator. The first additional component is configured to be attached to the human-powered vehicle separated from the component.

The component according to the twenty-fourth aspect switches the communication control state when necessary so that increases in power consumption of the communicator are limited. This limits increases in the size of the battery. Since increases in the size of the battery are limited, the position of the first additional component on the human-powered vehicle is set in a preferred manner.

In accordance with a twenty-fifth aspect of the present disclosure, the component according to the twenty-second or twenty-third aspect is configured so that the first additional component includes a power generation unit configured to supply electric power to the communicator. The power generation unit is configured to be attached to the human-powered vehicle separated from the component.

With the component according to the twenty-fifth aspect, the communication control state is switched when necessary so that increases in power consumption of the communicator are limited. Thus, electric power generated by the power generation unit is used in the human-powered vehicle in a preferred manner.

In accordance with a twenty-sixth aspect of the present disclosure, the component according to any one of the first to twenty-first aspects is configured so that the human-powered vehicle includes a battery configured to supply electric power to the communicator. The battery is configured to supply electric power to a second additional component that is separate from the component and is configured to be attached to the human-powered vehicle separated from the component.

With the component according to the twenty-sixth aspect, the communication control state is switched when necessary so that increases in power consumption of the communicator are limited. Thus, the second additional component is supplied with electric power in a preferred manner. In addition, since the communication control state is switched when necessary so that increases in power consumption of the communicator are limited, increases in the size of the battery are limited. Since increases in the size of the battery are limited, the position of the battery on the human-powered vehicle is set in a preferred manner.

In accordance with a twenty-seventh aspect of the present disclosure, the component according to any one of the first to twenty-first aspects further comprises a battery configured to supply electric power to the communicator.

The component according to the twenty-seventh aspect switches the communication control state when necessary so that increases in power consumption of the communicator are limited. This limits increases in the size of the battery.

In accordance with a twenty-eighth aspect of the present disclosure, the component according to the twenty-seventh aspect further comprises a housing provided with the communicator, the electronic controller, and the battery.

With the component according to the twenty-eighth aspect, the communicator, the electronic controller, and the battery are provided in the housing.

In accordance with a twenty-ninth aspect of the present disclosure, the component according to any one of the first to twenty-eighth aspects is configured so that the component includes at least one of an operating device, a transmission device, a drive unit that applies a propulsion force to the human-powered vehicle, a brake, an adjustable seatpost, a suspension, a display device, a crank rotational state detector, a human driving force detector, and a tire pressure detector.

The component according to the twenty-ninth aspect limits increases in power consumption of at least one of the operating device, the transmission device, the drive unit, the brake, the adjustable seatpost, the suspension, the display device, the crank rotational state detector, the human driving force detector, and the tire pressure detector.

In accordance with a thirtieth aspect of the present disclosure, the component according to the twenty-ninth aspect is configured so that the component includes the transmission device. The transmission device includes a derailleur.

The component according to the thirtieth aspect limits increases in power consumption of the derailleur.

A control system in accordance with a thirty-first aspect of the present disclosure is for a human-powered vehicle. The control system comprises the component according to any one of the first to thirtieth aspects of the present disclosure and the at least one transmitter.

The control system according to the thirty-first aspect limits increases in power consumption of the component.

A control system in accordance with a thirty-second aspect of the present disclosure is for a human-powered vehicle. The control system comprises a plurality of components, and at least one transmitter that is separate from the components. Each of the components is the component according to any one of the first to thirtieth aspects of the present disclosure.

With the component according to the thirty-second aspect, the communicator of each of the components is controlled in the communication control states differing in power consumption. In each of the components, the communication control state of the communicator is appropriately switched. Thus, the overall power consumption of the human-powered vehicle is controlled in a preferred manner.

The human-powered vehicle component and the human-powered vehicle control system according to the present disclosure control the communicator in a preferred manner.

BRIEF DESCRIPTION OF THE DRAWINGS

Referring now to the attached drawings which form a part of this original disclosure.

FIG. 2 is a block diagram showing the structure of the human-powered vehicle shown in FIG. 1.

FIG. 3 is a block diagram showing the structure of the human-powered vehicle control system and the human-powered vehicle component of the first embodiment.

FIG. 5 is a first part of a flowchart of a process for controlling an actuator in accordance with a first signal executed by an electronic controller shown in FIG. 3.

FIG. 7 is a first part of a flowchart of a process for switching an amplification control state executed by the electronic controller shown in FIG. 3.

FIG. 16 is a second part of the flowchart of the process for switching the amplification control state executed by the electronic controller of the third embodiment.

FIG. 20 is a block diagram showing the structure of a human-powered vehicle in accordance with a seventh embodiment.

FIG. 21 is a block diagram showing the structure of the human-powered vehicle control system and the human-powered vehicle component of the seventh embodiment.

FIG. 25 is a block diagram showing the structure of of a human-powered vehicle control system and the human-powered vehicle component in accordance with the tenth embodiment.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
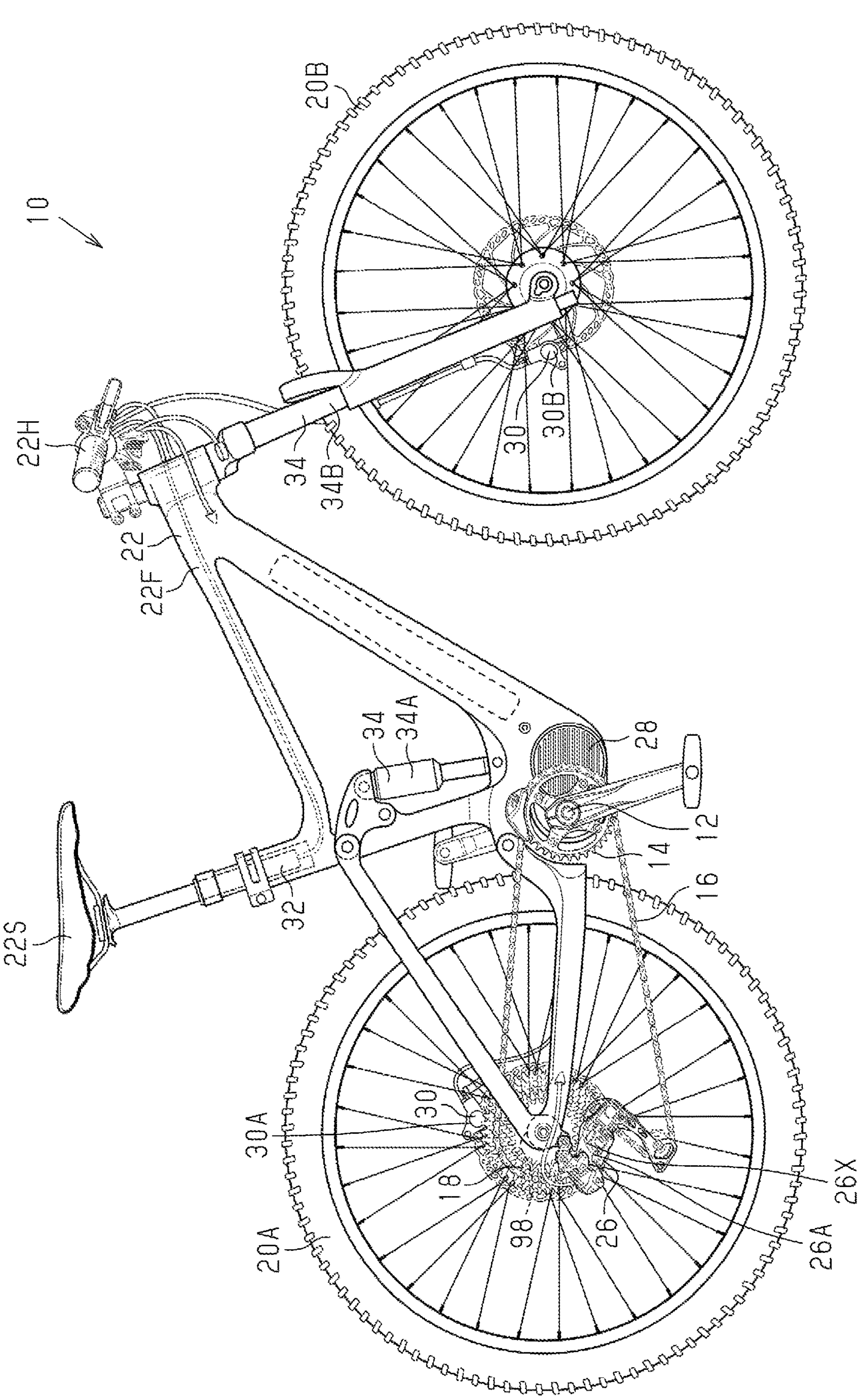
FIG. 1 is a side elevational view of a human-powered vehicle including a first embodiment of a control system for a human-powered vehicle and a component for a human-powered vehicle.

As shown in FIG. 1, a human-powered vehicle 10 is illustrated that is equipped with a human-powered vehicle control system 50 for a human-powered vehicle and a human-powered vehicle component 52 for a human-powered vehicle. A first embodiment of the human-powered vehicle control system 50 and the human-powered vehicle component 52 will now be described with reference to FIGS. 1 to 12.

The human-powered vehicle 10 is a vehicle including at least one wheel and driven by at least a human driving force. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a unicycle and a vehicle including two or more wheels. The human-powered vehicle 10 is not limited to a vehicle configured to be driven only by a human driving force. The human-powered vehicle 10 includes an E-bike that uses a driving force of an electric motor in addition to the human driving force for propulsion. The E-bike includes an electric assist bicycle that assists in propulsion using an electric motor. In the embodiments described below, the human-powered vehicle 10 refers to a bicycle.

As shown in FIGS. 1 and 2, the human-powered vehicle 10 includes a crank 12, a front sprocket 14, a chain 16, a rear sprocket 18, a rear wheel 20A, and a front wheel 20B. The human driving force is input to the crank 12. The front sprocket 14 receives the human driving force from the crank 12. The chain 16 transmits the human driving force from the front sprocket 14 to the rear sprocket 18. The rear sprocket 18 is configured to output the human driving force to the rear wheel 20A.

The human-powered vehicle 10 includes, for example, a body 22, an operating device 24, a transmission device 26, a drive unit 28, a brake 30, an adjustable seatpost 32, a suspension 34, a display device 36, a crank rotational state detector 38, a human driving force detector 40, and a tire pressure detector 42. The body 22 includes, for example, the crank 12, the front sprocket 14, the chain 16, the rear sprocket 18, the rear wheel 20A, and the front wheel 20B. The body 22 includes, for example, a frame 22F of the human-powered vehicle 10, a handlebar 22H, and a saddle 22S. The human-powered vehicle component is, for example, provided on the body 22. The human-powered vehicle component includes, for example, at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. The term "detector" as used herein refers to a hardware device or instrument designed to detect the presence or absence of a particular event, object, substance, or a change in its environment, and to emit a signal in response. The term "detector" as used herein do not include a human being.

In an example, the operating device 24 is configured to be operable by the rider. In an example, the operating device 24 is provided on the handlebar 22H. The operating device 24 is configured to operate at least one of the transmission device 26, the drive unit 28, the brake 30, the adjustable seatpost 32, the suspension 34, the display device 36, the crank rotational state detector 38, the human driving force detector 40, and the tire pressure detector 42. In an example, the operating device 24 operates a human-powered vehicle component differing from the operating device 24 by transmitting a predetermined signal related to an operation of the human-powered vehicle component to the human-powered vehicle component. In an example, the operating device 24 includes at least one of a button, a dial, and a lever. The operating device 24 includes a first operating device 24A and a second operating device 24B. Each of the first operating device 24A and the second operating device 24B is configured to operate a different human-powered vehicle component. The operating device 24 can be provided on a position other than the handlebar 22H.

The transmission device 26 is configured to shift the transmission ratio of the human-powered vehicle 10 in accordance with the shift stage. In an example, the transmission device 26 is provided on the frame 22F. In an example, the transmission ratio of the human-powered vehicle 10 is a ratio of a rotational speed of the rear wheel 20A to a rotational speed of the crank 12. In an example, the transmission device 26 includes an external transmission device. In an example, the transmission device 26 includes at least one of a rear derailleur 26A and a front derailleur 26B. In the present embodiment, the transmission device 26 includes the rear derailleur 26A and the front derailleur 26B. The transmission device 26 can include an internal transmission device. In an example, the internal transmission device is provided on a hub of the rear wheel 20A. In an example, the transmission device 26 includes an electric transmission device. In an example, the transmission device 26 includes an actuator actuated by electric power. In an example, the actuator of the transmission device 26 is configured to shift the transmission ratio of the human-powered vehicle 10 in accordance with a predetermined signal.

In an example, the drive unit 28 applies a propulsion force to the human-powered vehicle 10. In an example, the drive unit 28 is provided on the frame 22F. In an example, the drive unit 28 operates in accordance with the human driving force input to the crank 12. In an example, the drive unit 28 includes an actuator actuated by electric power. In an example, the actuator of the drive unit 28 includes a motor. In an example, the actuator of the drive unit 28 is configured to change the ratio of a motor driving force to a human driving force in accordance with a predetermined signal.

The brake 30 is configured to break the human-powered vehicle 10. In an example, the brake 30 is provided on the frame 22F. In an example, the brake 30 includes a rear brake 30A and a front brake 30B. In an example, the brake 30 includes an electric brake. In an example, the brake 30 includes an actuator actuated by electric power. In an example, the actuator of the brake 30 is configured to change braking force applied to the human-powered vehicle 10 in accordance with a predetermined signal.

The adjustable seatpost 32 is configured to change the height of the saddle 22S relative to the frame 22F. In an example, the adjustable seatpost 32 is provided on the frame 22F. In an example, the adjustable seatpost 32 includes an electric adjustable seatpost. In an example, the adjustable seatpost 32 includes an actuator actuated by electric power. In an example, the actuator of the adjustable seatpost 32 is configured to change the height of the saddle 22S relative to the frame 22F in accordance with a predetermined signal.

The suspension 34 is configured to absorb impacts on the rear wheel 20A and the front wheel 20B. In an example, the suspension 34 is provided on the frame 22F. In an example, the suspension 34 includes an electric suspension. The suspension 34 can be a coil suspension, a hydraulic suspension, or an air suspension. In an example, the suspension 34 includes a rear suspension 34A and a front suspension 34B. The suspension 34 includes a first part and a second part that is fitted into the first part and movable relative to the first part. In an example, the first part of the suspension 34 is connected to the axle of the rear wheel 20A or the front wheel 20B. In an example, the second part of the suspension 34 is connected to the frame 22F. The suspension 34 absorbs impacts on the rear wheel 20A and the front wheel 20B by movement of the second part of the suspension 34 relative to the first part of the suspension 34. In an example, the suspension 34 includes an actuator. In an example, the actuator of the suspension 34 is configured to change an allowed amount of relative movement of the first part and the second part.

In an example, the display device 36 is configured to notify a rider of a state related to the human-powered vehicle 10. In an example, the display device 36 is provided on the handlebar 22H. In an example, the display device 36 is configured to receive the state related to the human-powered vehicle 10 from a human-powered vehicle component. The display device 36 can be detachably provided on the frame 22F of the human-powered vehicle 10. In an example, the display device 36 includes at least one of a smartphone and a cycle computer.

The crank rotational state detector 38 is configured to detect a rotational state of the crank 12. In an example, the crank rotational state detector 38 includes a magnet provided on the crank 12 and a magnetic sensor provided on the frame 22F. The magnetic sensor of the crank rotational state detector 38 is configured to detect the magnetism of the magnet of the crank rotational state detector 38 as the crank 12 rotates. The crank rotational state detector 38 detects rotation of the magnet of the crank rotational state detector 38 to detect the rotational state of the crank 12.

The human driving force detector 40 is configured to detect a human driving force input to the human-powered vehicle 10. In an example, the human driving force detector 40 includes a strain sensor. In an example, the strain sensor of the human driving force detector 40 detects strain of the human-powered vehicle 10. In an example, the strain sensor of the human driving force detector 40 is provided on the crank 12. In an example, the strain sensor of the human driving force detector 40 is configured to detect strain of the crank 12 in a case where human driving force is input to the crank 12. The strain sensor of the human driving force detector 40 is provided on at least one of the axle of the rear wheel 20A, the axle of the front wheel 20B, the frame 22F, and the handlebar 22H.

The tire pressure detector 42 is configured to detect air pressure of at least one of the rear wheel 20A and the front wheel 20B. In an example, the tire pressure detector 42 is provided on at least one of the rear wheel 20A and the front wheel 20B.

In an example, the human-powered vehicle 10 includes a power generation unit 44. In an example, the power generation unit 44 includes a hub dynamo provided on at least one of the rear wheel 20A and the front wheel 20B. The hub dynamo generates electric power in accordance with rotation of at least one of the rear wheel 20A and the front wheel 20B. The electric power generated by the power generation unit 44 is, for example, supplied to at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. In an example, the power generation unit 44 can charge a battery 68 or a battery differing from the battery 68.

In an example, the human-powered vehicle 10 includes the control system 50. In an example, the control system 50 includes the component 52 and at least one communication device 54. The term "communication device" as used herein refers to a hardware device or hardware devices, and does not include a human being. The control system 50 is configured to transmit a predetermined signal between the component 52 and the communication device 54 through wireless communication. In an example, the predetermined signal includes a first signal and a second signal. The first signal is transmitted from the communication device 54 to the component 52. In an example, the first signal includes information related to operation of the component 52. The second signal is transmitted from the component 52 to the communication device 54. In an example, the second signal includes information related to a state of the component 52. In an example, the component 52 and the communication device 54 are configured to perform wireless communication using a communication method including at least one of Bluetooth®, ANT+®, Wi-Fi®, and infrared communication. The component 52 and the communication device 54 can be configured to perform wireless communication using an original communication method differing from Bluetooth®, ANT+®, Wi-Fi®, and versatile infrared communication.

Figure 4:
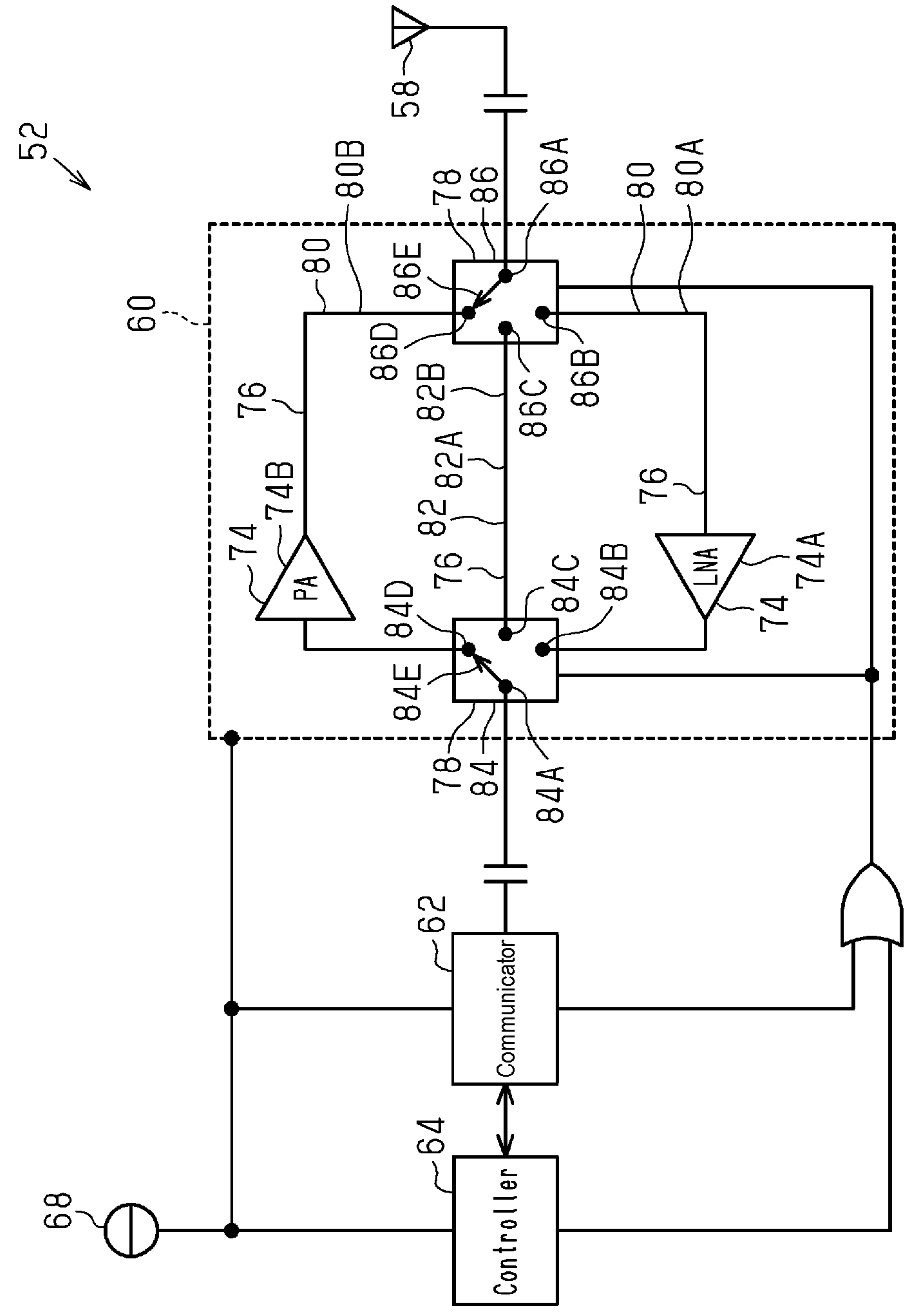
FIG. 4 is a block diagram showing the electrical configuration of the human-powered vehicle component shown in FIG. 3.

In an example, the component 52 shown in FIGS. 2 and 4 includes at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42.

The component 52 of the present embodiment includes the transmission device 26. In an example, the transmission device 26 includes a derailleur 26X. In an example, the derailleur 26X includes at least one of the rear derailleur 26A and the front derailleur 26B. In a case where the component 52 includes the derailleur 26X, the first signal includes, for example, information related to the shift stage of the derailleur 26X. In an example, the second signal includes information related to the shift stage of the derailleur 26X, information related to a shifting initiation of the derailleur 26X and a shifting completion of the derailleur 26X. In a case where the component 52 includes the derailleur 26X, the derailleur 26X is configured to change the shift stage in accordance with the first signal.

In an example, the at least one communication device 54 includes at least one of the operating device 24, the drive unit 28, the brake 30, the adjustable seatpost 32, the suspension 34, the display device 36, the crank rotational state detector 38, the human driving force detector 40, and the tire pressure detector 42. In an example, in a case where the transmission device 26 includes one of the rear derailleur 26A and the front derailleur 26B, the communication device 54 can include the other of the rear derailleur 26A and the front derailleur 26B. In an example, the communication device 54 is configured to transmit the first signal to the transmission device 26 through wireless communication.

The communication device 54 of the present embodiment includes the operating device 24. In an example, the operating device 24 of the communication device 54 includes a shifter that operates the transmission device 26.

In an example, the at least one communication device 54 includes at least one transmitter 56. The at least one transmitter 56 transmits a predetermined signal. In an example, the control system 50 includes the component 52 and the at least one transmitter 56. In an example, the at least one transmitter 56 includes at least one of the operating device 24, the drive unit 28, the brake 30, the adjustable seatpost 32, the suspension 34, the display device 36, the crank rotational state detector 38, the human driving force detector 40, and the tire pressure detector 42.

In an example, the transmitter 56 is configured to transmit the first signal to the component 52 through wireless communication. Thus, the transmitter 56 can be referred to as a wireless transmitter. In an example, in a case where the shifter is operated, the transmitter 56 of the present embodiment transmits the first signal to the transmission device 26. The transmitter 56 can be formed separately from the communication device 54.

In an example, the communication device 54 includes an additional antenna 54A, an additional amplifier 54B, an additional communicator 54C, and an additional controller 54D. The additional controller 54D can also be referred to as an additional electronic controller. The terms "controller" and "electronic controller" as used herein refer to a hardware device or hardware devices that executes a software program, and does not include a human being. The additional antenna 54A is configured to perform at least one of transmission of the first signal and reception of the second signal with the component 52. The additional amplifier 54B is electrically connected to the additional antenna 54A. The additional amplifier 54B amplifies the predetermined signal, received from the additional antenna 54A, in intensity. The additional communicator 54C performs at least one of reception of the second signal and transmission of the first signal via the additional amplifier 54B.

In an example, the additional controller 54D is configured to control the communication device 54. The additional controller 54D can include additional storage. The additional storage can be any computer storage device or any non-transitory computer-readable medium with the sole exception of a transitory, propagating signal. In an example, the additional storage stores control programs and information used for various control processes. In an example, the additional storage includes at least one of a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The component 52 includes an antenna 58, an amplifier 60, and a communicator 62, and an electronic controller 64 (hereinafter referred to as the controller 64). In an example, the component 52 is configured to receive the first signal via the antenna 58. In an example, the component 52 further includes a housing 66. In an example, the housing 66 is provided on the body 22. In an example, the communicator 62, the controller 64, and the battery 68 are provided on the housing 66. In an example, the antenna 58 is provided on the housing 66. In an example, the antenna 58, the amplifier 60, the communicator 62, and the controller 64 are provided on an electric substrate accommodated in the housing 66.

In an example, the component 52 further includes an actuator 70. In an example, the actuator 70 includes an electric motor. In an example, the actuator 70 is provided on the housing 66. In an example, the component 52 performs a predetermined action using the actuator 70. In an example, in a case where an action request is received, the component 52 drives the actuator 70 for a predetermined period. In an example, the action request is set in a case where the first signal is received. The component 52 can exclude the actuator 70. The component 52 can include an electric part that differs from the actuator 70. In an example, in a case where the component 52 includes an electric part differing from the actuator 70, the component 52 can change the state of electric power supplied to the electric part.

The actuator 70 of the present embodiment is the actuator of the transmission device 26. The actuator 70 is configured to be actuated in accordance with the first signal. The transmission device 26 performs a shifting action that shifts the transmission ratio in accordance with the first signal. In an example, the component 52 includes a drive unit 70A that controls actuation of the actuator 70. The actuator 70 is connected to the controller 64 through the drive unit 70A. The controller 64 is configured to actuate the actuator 70 in accordance with a predetermined signal. The controller 64 is configured to actuate the actuator 70 in accordance with the first signal. In an example, the drive unit 70A is configured to transmit a completion signal to the controller 64 upon completion of actuation of the actuator 70.

In an example, the component 52 further includes the battery 68. The battery 68 includes, for example, one or more battery elements. The battery element includes, for example, a rechargeable battery. The battery 68 is electrically connected to the amplifier 60, the communicator 62, and the controller 64. In an example, the battery 68 is configured to supply electric power to the communicator 62. In an example, the battery 68 is configured to supply electric power to the controller 64 and the amplifier 60. The battery 68 is configured to supply electric power to the actuator 70. The battery 68 can be accommodated in the housing 66 or can be detachably mounted on the housing 66.

In an example, the component 52 further includes a detector 72. In an example, the detector 72 is configured to detect the state of the human-powered vehicle 10. The detector 72 is connected to the controller 64 to perform wired or wireless communication with the controller 64. The detector 72 is configured to transmit information related to the human-powered vehicle 10 to the controller 64. In an example, the detector 72 is provided on the housing 66. The detector 72 can be provided separately from the component 52.

In an example, the state of the human-powered vehicle 10 includes at least one of a vehicle body state of the human-powered vehicle 10, a traveling state of the human-powered vehicle 10, and a state of a rider of the human-powered vehicle 10. In an example, the vehicle body state of the human-powered vehicle 10 includes at least one of vibration of the human-powered vehicle 10 and inclination of the human-powered vehicle 10. In an example, the traveling state of the human-powered vehicle 10 includes whether the human-powered vehicle 10 is traveling, the travel speed of the human-powered vehicle 10, and the inclination angle of the road on which the human-powered vehicle 10 is traveling. In an example, the state of the rider of the human-powered vehicle 10 includes whether the rider mounts the human-powered vehicle 10, the posture of the rider, and the amount of a human driving force of the rider.

The detector 72 detects an action of the human-powered vehicle 10 in accordance with the vehicle body state of the human-powered vehicle 10, the traveling state of the human-powered vehicle 10, and the state of the rider of the human-powered vehicle 10. In an example, in a case where the detector 72 detects an action of the human-powered vehicle 10, the detector 72 is configured to output a detection signal related to the state of the human-powered vehicle 10 to the controller 64. Alternatively, the detector 72 can be configured to output a detection signal to the display device 36.

In an example, the detector 72 is configured to detect a parameter for determining whether a rider is using the human-powered vehicle 10. In an example, the detector 72 is configured to detect a parameter that changes in a case where a rider is using the human-powered vehicle 10. In an example, the case where the rider is using the human-powered vehicle 10 includes at least a state in which the human-powered vehicle 10 is traveling. In an example, the case where the rider is using the human-powered vehicle 10 includes all of a state in which the human-powered vehicle 10 is traveling, a state in which the rider mounts the human-powered vehicle 10 that is in a stopped state, and a state in which the rider is pushing and walking the human-powered vehicle 10.

In an example, the detector includes 72 at least one of a vibration sensor 72A, an acceleration sensor 72B, an inclination sensor 72C, a gyro sensor 72D, a pressure sensor 72E, a switch 72F, a cadence sensor 72G, a vehicle speed sensor 72H, and a force sensor 72J. The term "sensor" as used herein refers to a hardware device or instrument designed to detect the presence or absence of a particular event, object, substance, or a change in its environment, and to emit a signal in response. The term "sensor" as used herein do not include a human being.

In an example, the vibration sensor 72A is configured to detect vibration of the human-powered vehicle 10. In an example, the vibration sensor 72A is provided on at least one of the housing 66 and the body 22.

In an example, the acceleration sensor 72B is configured to detect at least one of vibration of the human-powered vehicle 10 and acceleration of the human-powered vehicle 10. The acceleration sensor 72B can include the vehicle speed sensor 72H. In a case where the acceleration sensor 72B includes the vehicle speed sensor 72H, the controller 64 can differentiate the vehicle speed to obtain the acceleration. In an example, the acceleration sensor 72B is provided on at least one of the housing 66, the crank 12, and the body 22.

In an example, the inclination sensor 72C is configured to detect at least one of the inclination of the human-powered vehicle 10, whether the human-powered vehicle 10 is traveling, and the inclination angle of the road on which the human-powered vehicle 10 is traveling. In an example, the inclination sensor 72C is provided on at least one of the housing 66 and the body 22.

The gyro sensor 72D is configured to detect at least one of the inclination of the human-powered vehicle 10, whether the human-powered vehicle 10 is traveling, the travel speed of the human-powered vehicle 10, and the inclination angle of the road on which the human-powered vehicle 10 is traveling. In an example, the gyro sensor 72D is provided on at least one of the housing 66, the crank 12, and the body 22.

The pressure sensor 72E is configured to detect at least one of whether the rider mounts the human-powered vehicle 10, the posture of the rider, and human driving force of the rider. In an example, the pressure sensor 72E is provided on at least one of the handlebar 22H, the crank 12, a pedal, and the saddle 22S. In a case where the component 52 includes at least one of the adjustable seatpost 32 and the suspension 34, the pressure sensor 72E can be provided on the housing 66.

The switch 72F is configured to detect at least one of whether the rider mounts the human-powered vehicle 10 and the posture of the rider. In an example, the switch 72F is provided on at least one of the handlebar 22H, the crank 12, the pedal, and the saddle 22S. In an example, the switch 72F can be provided on at least one of the crank 12, the pedal, and the saddle 22S. In a case where the component 52 includes at least one of the adjustable seatpost 32 and the suspension 34, the switch 72F can be provided on the housing 66.

In an example, the cadence sensor 72G is configured to detect a rotational state of the crank 12. In an example, the cadence sensor 72G detects a rotational speed of the crank 12. In an example, the cadence sensor 72G is provided on the crank 12 or the frame 22F. The cadence sensor 72G can be configured to detect human driving force. In an example, the cadence sensor 72G can include a power meter provided on the crank 12 or the pedal. In an example, the cadence sensor 72G can include a torque sensor provided on the crank 12. In a case where the cadence sensor 72G is configured to detect a human driving force, the detector 72 can be configured to detect the rotational state of the crank 12 from variation of the human driving force.

The vehicle speed sensor 72H is configured to detect at least one of whether the human-powered vehicle 10 is traveling and the travel speed of the human-powered vehicle 10. In an example, the vehicle speed sensor 72H is provided on the frame 22F and detects the magnetism of a magnet attached to at least one of the rear wheel 20A and the front wheel 20B. In an example, the vehicle speed sensor 72H detects a rotational speed of at least one of the rear wheel 20A and the front wheel 20B. The vehicle speed sensor 72H can detect the magnetism of a magnet attached to a member that integrally rotates with the rear sprocket 18.

In an example, the force sensor 72J is configured to detect human driving force. The human driving force is input by the rider from the pedal to the crank 12. In an example, the force sensor 72J includes a power meter provided on the crank 12 or the pedal. In an example, the force sensor 72J includes a torque sensor provided on the crank 12. In an example, the detector 72 is configured to detect at least one of whether the human-powered vehicle 10 is traveling and the travel speed of the human-powered vehicle 10 from the human driving force detected by the force sensor 72J.

The controller 64 determines whether the human-powered vehicle 10 is in a use state in accordance with a detection signal related to the state of the human-powered vehicle 10 output from the detector 72. In an example, a case where the human-powered vehicle 10 is in the use state includes at least one of a state in which the rider mounts the human-powered vehicle 10, a state in which the rider is pushing and walking the human-powered vehicle 10, and a state in which the rider is operating the human-powered vehicle 10. The controller 64 determines whether the human-powered vehicle 10 is in any of the use state and a predetermined state in accordance with a detection signal related to the state of the human-powered vehicle 10 output from the detector 72. In an example, the predetermined state refers to a state in which the human-powered vehicle 10 is not used by the rider. In an example, in a case where the human-powered vehicle 10 is not in the use state, the controller 64 determines that the human-powered vehicle 10 is in the predetermined state.

In an example, in a case where the detector 72 includes at least one of the vibration sensor 72A and the acceleration sensor 72B, the controller 64 determines whether the human-powered vehicle 10 is in the use state in accordance with a vibration of the human-powered vehicle 10. In an example, in a case where the amount of the vibration of the human-powered vehicle 10 is greater than or equal to a predetermined amount, the controller 64 determines the human-powered vehicle 10 is in the use state.

In an example, in a case where the detector 72 includes the acceleration sensor 72B, the controller 64 determines whether the human-powered vehicle 10 is in the use state in accordance with an acceleration of the human-powered vehicle 10. In an example, in a case where the acceleration of the human-powered vehicle 10 is greater than or equal to a predetermined acceleration, the controller 64 determines that the human-powered vehicle 10 is in the use state.

In an example, in a case where the detector 72 includes at least one of the inclination sensor 72C and the gyro sensor 72D, the controller 64 determines whether the human-powered vehicle 10 is in the use state in accordance with the inclination of the human-powered vehicle 10, whether the human-powered vehicle 10 is traveling, and the inclination angle of the road on which the human-powered vehicle 10 is traveling. In an example, in a case where a change amount of the inclination of the human-powered vehicle 10 is greater than or equal to a predetermined amount, the controller 64 determines that the human-powered vehicle 10 is in the use state. In an example, in a case where the change amount of the inclination angle of the road on which the human-powered vehicle 10 is traveling is greater than or equal to a predetermined angle, the controller 64 determines that the human-powered vehicle 10 is in the use state. In an example, in a case where the change amount of the inclination of the human-powered vehicle 10 or the change amount of the inclination angle of the road on which the human-powered vehicle 10 is traveling is greater than or equal to the predetermined angle, the controller 64 determines that the human-powered vehicle 10 is traveling. In an example, in a case where the human-powered vehicle 10 is traveling, the controller 64 determines the human-powered vehicle 10 is in the use state.

In an example, in a case where the detector 72 includes the pressure sensor 72E, if the pressure is greater than or equal to a predetermined pressure and/or a state in which the pressure is greater than or equal to the predetermined pressure continues over a predetermined period or longer, the controller 64 determines the human-powered vehicle 10 is in the use state.

In an example, in a case where the detector 72 includes the switch 72F and the switch 72F outputs an activation signal, the controller 64 determines that the human-powered vehicle 10 is in the use state. In an example, in a case where a pressed state continues over the predetermined period or longer, the switch 72F outputs the activation signal. In an example, in a case where the pressed state is changed to a release state, the switch 72F can be configured to output the activation signal.

In an example, in a case where the detector 72 includes the cadence sensor 72G, the controller 64 determines whether the human-powered vehicle 10 is in the use state in accordance with the rotational state of the crank 12. In an example, in a case where the crank 12 is rotating, the controller 64 determines the human-powered vehicle 10 is in the use state. In an example, in a case where the rotational speed of the crank 12 is greater than or equal to a predetermined speed, the controller 64 can be configured to determine that the human-powered vehicle 10 is in the use state.

In an example, in a case where the detector 72 includes the vehicle speed sensor 72H, the controller 64 determines that the human-powered vehicle 10 is in the use state in accordance with the vehicle speed. In an example, in a case where the vehicle speed is greater than or equal to a predetermined vehicle speed, the controller 64 determines that the human-powered vehicle 10 is in the use state.

In an example, in a case where the detector 72 includes the force sensor 72J, the controller 64 determines whether the human-powered vehicle 10 is in the use state in accordance with a human driving force. In an example, in a case where the human driving force is greater than or equal to a predetermined human driving force, the controller 64 determines that the human-powered vehicle 10 is in the use state.

The antenna 58 is configured to perform at least one of reception of a predetermined signal and transmission of a predetermined signal with the at least one communication device 54 that differs from the component 52. In an example, the antenna 58 is configured to perform at least one of reception of the first signal and transmission of the second signal with the communication device 54. The antenna 58 receives a predetermined signal from the at least one transmitter 56 differing from the component 52. The antenna 58 receives the first signal from the at least one transmitter 56 differing from the component 52.

In an example, the controller 64 includes a predetermined control program and a processor that executes a control process. The processor includes, for example, a central processing unit (CPU) or a micro processing unit (MPU). The controller 64 can include one or more microcomputers. The controller 64 can include multiple processors arranged at separate locations. The controller 64 can include storage. The storage can be any computer storage device or any non-transitory computer-readable medium with the sole exception of a transitory, propagating signal. In an example, the storage stores control programs and information used for various control processes. In an example, the storage includes at least one of a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

In an example, the controller 64 is configured to control the actuator 70 in accordance with information related to operation of the component 52 in the first signal. In an example, the controller 64 is configured to output information related to the state of the component 52 to the communicator 62 so that the second signal is transmitted from the antenna 58.

In an example, the communicator 62 is a wireless communicator. The communicator 62 receives the first signal from the at least one transmitter 56 differing from the component 52. In an example, the communicator 62 is configured to perform wireless communication with the communication device 54 using the antenna 58. In an example, the communicator 62 is configured to perform wireless communication with the transmitter 56 using the antenna 58. In an example, the communicator 62 can be configured to perform wireless communication with multiple communication devices 54. In an example, the communicator 62 includes a radio frequency integrated circuit (RFIC). The communicator 62 can separately include a receiver that receives the first signal and a transmitter that transmits the second signal.

The communicator 62 performs at least one of reception of a predetermined signal and transmission of a predetermined signal via the amplifier 60. The predetermined signal of the present embodiment includes the first signal and the second signal. In the present embodiment, the first signal corresponds to a predetermined signal transmitted from the transmitter 56 to the component 52. In the present embodiment, the second signal corresponds to a predetermined signal transmitted from the component 52 to the communication device 54.

The communicator 62 transmits the predetermined signal via the antenna 58 and the amplifier 60. The communicator 62 transmits the second signal to the communication device 54 via the antenna 58 and the amplifier 60. The communicator 62 receives the predetermined signal via the amplifier 60. The communicator 62 receives the first signal via the amplifier 60.

The communicator 62 is electrically connected to the controller 64. In a case where the communicator 62 receives the first signal, the communicator 62 outputs information related to the first signal to the controller 64. In an example, the information related to the first signal includes information related to operation of the component 52. In a case where information related to the second signal is received from the controller 64, the communicator 62 transmits the second signal through the antenna 58. In an example, the information related to the second signal includes information related to the state of the component 52.

In an example, the amplifier 60 is an amplifier. The amplifier 60 is electrically connected to the antenna 58. An amplification circuit 74 amplifies a predetermined signal in intensity. The amplifier 60 amplifies a predetermined signal received from the antenna 58 in intensity. In an example, the amplifier 60 amplifies the voltage of a signal. In an example, the amplifier 60 amplifies the first signal, received from the antenna 58, in intensity. In an example, the amplifier 60 amplifies a predetermined signal received from the communicator 62 in intensity. In an example, the amplifier 60 amplifies the second signal, received from the communicator 62, in intensity.

The amplifier 60 includes the amplification circuit 74, transfer paths 76, and a switching unit 78. The amplification circuit 74 includes a first amplification circuit 74A and a second amplification circuit 74B. In an example, the first amplification circuit 74A includes a low noise amplifier. In an example, the second amplification circuit 74B includes a power amplifier.

The transfer paths 76 include a first transfer path 80 and a second transfer path 82. The first transfer path 80 transmits a predetermined signal between the antenna 58 and the communicator 62 via the amplification circuit 74. The second transfer path 82 transmits a predetermined signal between the antenna 58 and the communicator 62 without using the amplification circuit 74. In a case where the first transfer path 80 is selected from the transfer paths 76, the predetermined signal travels between the antenna 58 and the communicator 62 via the amplification circuit 74. In a case where the second transfer path 82 is selected from the transfer paths 76, the predetermined signal travels between the antenna 58 and the communicator 62 without traveling through the amplification circuit 74.

In an example, the first transfer path 80 includes a first reception transfer path 80A that transfers a predetermined signal, received by the antenna 58, to the communicator 62 via the amplification circuit 74. In an example, the first transfer path 80 includes a first transmission transfer path 80B that transfers a predetermined signal, output from the communicator 62, to the antenna 58 via the amplification circuit 74. In a case where the first reception transfer path 80A is selected from the first transfer path 80, the predetermined signal transfers from the antenna 58 to the communicator 62 via the first amplification circuit 74A. In a case where the first transmission transfer path 80B is selected from the first transfer path 80, the predetermined signal transfers from the communicator 62 to the antenna 58 via the second amplification circuit 74B.

In an example, the second transfer path 82 includes a second reception transfer path 82A that transfers a predetermined signal, received by the antenna 58, to the communicator 62 without using the amplification circuit 74. In a case where the second transfer path 82 is selected from the transfer paths 76, a predetermined signal travels between the communicator 62 and the antenna 58 via the second reception transfer path 82A. In an example, the second transfer path 82 includes a second transmission transfer path 82B that transfers the second signal from the communicator 62 to the antenna 58 without using the amplification circuit 74. The second transmission transfer path 82B and the second reception transfer path 82A are configured as the same line.

The switching unit 78 selects one of the transfer paths 76. In an example, the switching unit 78 includes a latching relay. The switching unit 78 can include a transistor. In an example, the switching unit 78 includes a first switching portion 84 and a second switching portion 86. The first switching portion 84 includes a first connection terminal 84A, a first terminal 84B, a second terminal 84C, a third terminal 84D, and a first arm 84E.

The first switching portion 84 is configured to electrically connect the first connection terminal 84A to any one of the first terminal 84B, the second terminal 84C, and the third terminal 84D by the first arm 84E. The first connection terminal 84A is electrically connected to the communicator 62.

The second switching portion 86 includes a second connection terminal 86A, a fourth terminal 86B, a fifth terminal 86C, a sixth terminal 86D, and a second arm 86E. The second switching portion 86 is configured to electrically connect the second connection terminal 86A to any one of the fourth terminal 86B, the fifth terminal 86C, and the sixth terminal 86D by the second arm 86E. The second connection terminal 86A is electrically connected to the antenna 58.

The first terminal 84B is electrically connected to the fourth terminal 86B by the first amplification circuit 74A. The second terminal 84C is electrically connected to the fifth terminal 86C. The third terminal 84D is electrically connected to the sixth terminal 86D by the second amplification circuit 74B.

The switching unit 78 is configured to switch the connection state of the first arm 84E and the second arm 86E to select one of the transfer paths 76. At least one of the communicator 62 and the controller 64 is electrically connected to the amplifier 60. At least one of the communicator 62 and the controller 64 is configured to switch the connection state of the first arm 84E and the second arm 86E.

In a case where the first connection terminal 84A is connected to the first terminal 84B and the second connection terminal 86A is connected to the fourth terminal 86B, the first transfer path 80 is selected from the transfer paths 76. In a case where the first connection terminal 84A is connected to the first terminal 84B and the second connection terminal 86A is connected to the fourth terminal 86B, the first reception transfer path 80A is selected from the first transfer path 80. In the present embodiment, in a case where the first reception transfer path 80A is selected, the communicator 62 is allowed to receive the first signal that is amplified by the first amplification circuit 74A and the antenna 58 is not allowed to transmit the second signal.

In a case where the first connection terminal 84A is connected to the second terminal 84C and the second connection terminal 86A is connected to the fifth terminal 86C, the second transfer path 82 is selected from the transfer paths 76. In the present embodiment, in a case where the second transfer path 82 is selected, the communicator 62 is allowed to receive the first signal that is not amplified by the first amplification circuit 74A and the antenna 58 is allowed to transmit the second signal that is not amplified by the second amplification circuit 74B.

In a case where the first connection terminal 84A is connected to the third terminal 84D and the second connection terminal 86A is connected to the sixth terminal 86D, the first transfer path 80 is selected from the transfer paths 76. In a case where the first connection terminal 84A is connected to the third terminal 84D and the second connection terminal 86A is connected to the sixth terminal 86D, the first transmission transfer path 80B is selected from the first transfer path 80. In the present embodiment, in a case where the first transmission transfer path 80B is selected, the communicator 62 is not allowed to receive the first signal and the antenna 58 is allowed to transmit the second signal that is amplified by the second amplification circuit 74B.

The controller 64 is configured to control the communicator 62. In an example, the controller 64 is configured to switch the state of the communicator 62 between an activation state and a standby state. The communicator 62 is configured to perform at least one of reception of the first signal and transmission of the second signal in the activation state and is configured not to perform any of reception of the first signal and transmission of the second signal in the standby state. In the present embodiment, the communicator 62 is configured to receive the first signal in the activation state and not to receive the first signal in the standby state. Power consumption of the controller 64 in the standby state is less than power consumption of the communicator 62 in the activation state. The controller 64 can stop the supply of electric power from the battery 68 to the communicator 62 so that the communicator 62 enters the standby state.

Figure 9:
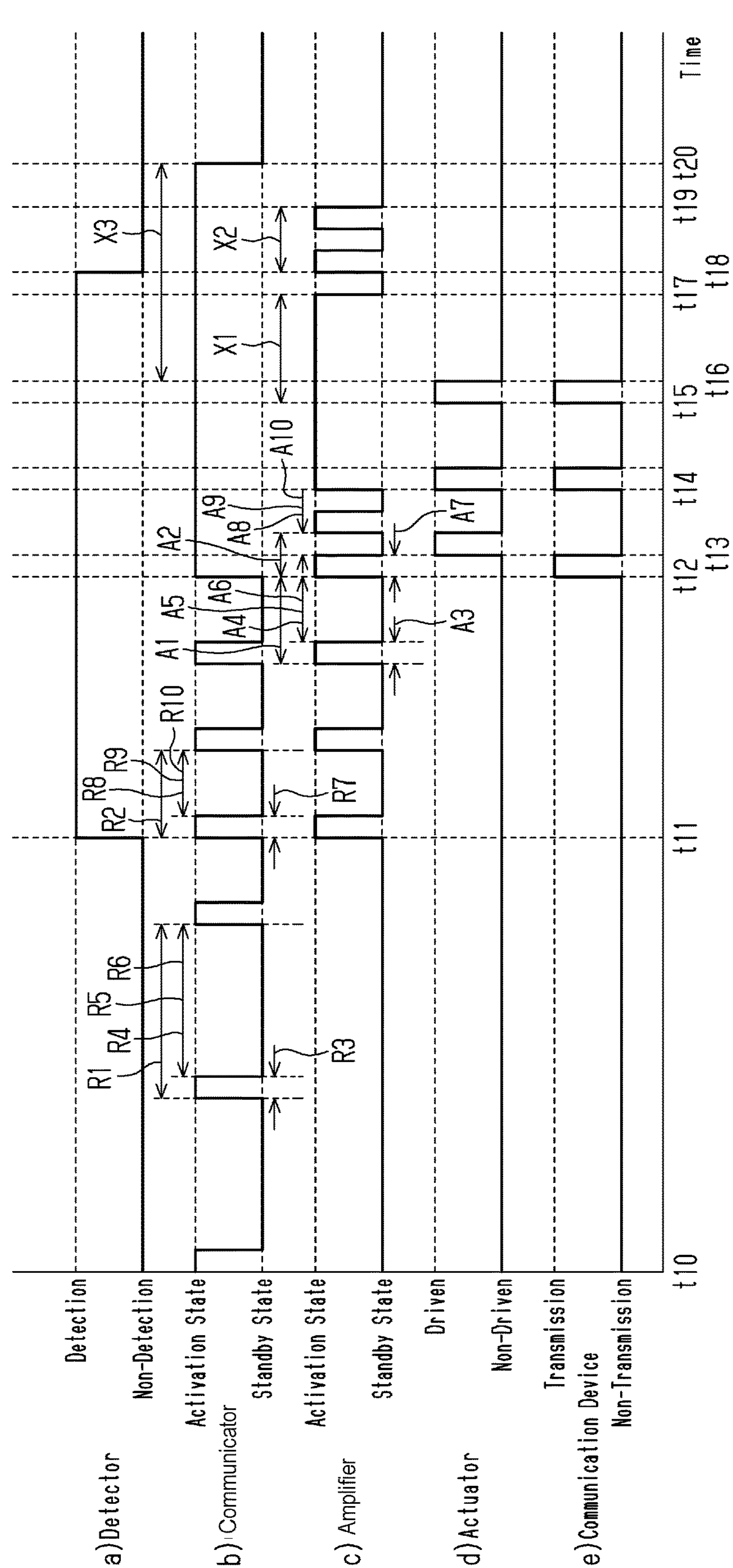
FIG. 9 is a timing chart showing a first example of changes in the states of a communicator, an amplifier, and the actuator shown in FIG. 3.

As shown in FIGS. 3 and 9, the controller 64 is configured to control the communicator 62 so that the communicator 62 continuously receives the first signal or the communicator 62 intermittently receives the first signal. In a case where the communicator 62 continuously receives, the controller 64 controls the communicator 62 so that the activation state of the communicator 62 is maintained over a predetermined period. In a case where the communicator 62 intermittently receives, the controller 64 controls the communicator 62 so that the activation state and the standby state of the communicator 62 are repeated in accordance with a reception cycle. In an example, the reception cycle includes the first reception cycle R1 and the second reception cycle R2. In an example, the second reception cycle R2 differs from the first reception cycle R1.

In an example, the first reception cycle R1 refers to a period from when the communicator 62 is changed from the standby state to the activation state until the next time the communicator 62 is changed from the standby state to the activation state. The first reception cycle R1 includes a first reception period R3. The controller 64 is configured to control the communicator 62 so that the communicator 62 receives the first signal in the first reception period R3. In the first reception period R3, the controller 64 controls the communicator 62 so that the activation state of the communicator 62 is maintained over the first reception period R3.

In an example, the first reception cycle R1 further includes a first reception interval R4 that is from the first reception period R3 to the following first reception period R3. In the first reception interval R4, the controller 64 controls the communicator 62 so that the standby state of the communicator 62 is maintained over the first reception interval R4. In an example, the first reception interval R4 includes a first low sensitivity period R5. In an example, the controller 64 is configured to control the communicator 62 so that a reception sensitivity of the communicator 62 in the first low sensitivity period R5 is lower than a reception sensitivity of the communicator 62 in the first reception period R3. In the first low sensitivity period R5, the communicator 62 is in the standby state. Thus, a reception sensitivity of the communicator 62 in the first low sensitivity period R5 is lower than a reception sensitivity of the communicator 62 in the first reception period R3.

In an example, the first low sensitivity period R5 includes a first non-reception period R6. In an example, the controller 64 is configured to control the communicator 62 so that the communicator 62 does not receive the first signal in the first non-reception period R6. In the first non-reception period R6, the communicator 62 is in the standby state. Thus, the communicator 62 does not receive the first signal in the first non-reception period R6.

The second reception cycle R2 refers to a period from when the communicator 62 is changed from the standby state to the activation state until the next time the communicator 62 is changed from the standby state to the activation state. The second reception cycle R2 includes a second reception period R7. The controller 64 is configured to control the communicator 62 so that the communicator 62 receives the first signal in the second reception period R7. In the second reception period R7, the controller 64 controls the communicator 62 so that the activation state of the communicator 62 is maintained over the second reception period R7.

In an example, the second reception cycle R2 further includes a second reception interval R8 that is from the second reception period R7 to the following second reception period R7. In the second reception interval R8, the controller 64 controls the communicator 62 so that the standby state of the communicator 62 is maintained over the second reception interval R8. In an example, the second reception interval R8 includes a second low sensitivity period R9. In an example, the controller 64 is configured to control the communicator 62 so that a reception sensitivity of the communicator 62 in the second low sensitivity period R9 is lower than a reception sensitivity of the communicator 62 in the second reception period R7. In the second low sensitivity period R9, the communicator 62 is in the standby state. Thus, the reception sensitivity of the communicator 62 in the second low sensitivity period R9 is lower than the reception sensitivity of the communicator 62 in the second reception period R7.

In an example, the second low sensitivity period R9 includes a second non-reception period R10. In an example, the controller 64 is configured to control the communicator 62 so that the communicator 62 does not receive the first signal in the second non-reception period R10. In the second non-reception period R10, the communicator 62 is in the standby state. Thus, the communicator 62 does not receive the first signal in the second non-reception period R10.

The controller 64 is configured to control the communicator 62 so that the first reception cycle R1 is longer than the second reception cycle R2. The first reception cycle R1 is, for example, 60 seconds. The second reception cycle R2 is, for example, 1.5 seconds. In an example, the controller 64 is configured to control the communicator 62 so that the first reception period R3 equals the second reception period R7. The first reception period R3 and the second reception period R7 are, for example, 15 microseconds. In an example, the first reception interval R4 is longer than the second reception interval R8. In an example, the first reception interval R4 is longer than the first reception period R3. In an example, the second reception interval R8 is longer than the second reception period R7.

The controller 64 is configured to control the amplifier 60. The state of the amplifier 60 is configured to be switched between the activation state and the standby state. The amplifier 60 is configured to amplify a predetermined signal in intensity in the activation state and is configured not to amplify a predetermined signal in intensity in the standby state. The amplifier 60 is configured to amplify the first signal in intensity in the activation state and is configured not to amplify the first signal in intensity in the standby state. The amplifier 60 is configured to amplify the second signal in intensity in the activation state and is configured not to amplify the second signal in intensity in the standby state.

In an example, the controller 64 switches the transfer paths 76 between the first transfer path 80 and the second transfer path 82 to switch the state of the amplifier 60 between the activation state and the standby state. In a case where the first transfer path 80 is selected from the transfer paths 76, the amplifier 60 is in the activation state. In a case where the second transfer path 82 is selected from the transfer paths 76, the amplifier 60 is in the standby state.

The controller 64 is configured to control the amplifier 60 so that the amplifier 60 continuously amplifies the predetermined signal, the amplifier 60 intermittently amplifies the predetermined signal, or the amplifier 60 enters sleep mode. In a case where the amplifier 60 continuously amplifies, the amplifier 60 is controlled by the controller 64 so as to be maintained in the activation state over the predetermined period. In a case where the amplifier 60 intermittently amplifies, the amplifier 60 is controlled by the controller 64 so as to repeat the activation state and the standby state in accordance with an amplification cycle. In an example, the amplification cycle includes a first amplification cycle A1 and a second amplification cycle A2. The second amplification cycle A2 differs from the first amplification cycle A1. In a case where the amplifier 60 enters sleep mode, the amplifier 60 is controlled by the controller 64 so that the standby state is maintained over the predetermined period.

The first amplification cycle A1 refers to a length of time from when the amplifier 60 is changed from the standby state to the activation state until the next time the amplifier 60 is changed from the standby state to the activation state. In an example, the first amplification cycle A1 includes a first amplification period A3. The controller 64 is configured to control the amplifier 60 so that the amplifier 60 amplifies the predetermined signal over the first amplification period A3. In the first amplification period A3, the controller 64 controls the amplifier 60 so that the activation state of the amplifier 60 is maintained over the first amplification period A3.

In an example, the first amplification cycle A1 further includes a first amplification interval A4 that is from the first amplification period A3 to the following first amplification period A3. In the first amplification interval A4, the controller 64 controls the amplifier 60 so that the standby state of the amplifier 60 is maintained over the first amplification interval A4. In an example, the first amplification interval A4 includes a first low amplification period A5. In an example, the controller 64 is configured to control the amplifier 60 in the first low amplification period A5 so that the amplifier 60 amplifies the predetermined signal at a degree lower than an amplification degree of the predetermined signal in the first amplification period A3. In the first low amplification period A5, the amplifier 60 is in the standby state. Thus, an amplification degree of the predetermined signal in the first low amplification period A5 is lower than the amplification degree of the predetermined signal in the first amplification period A3.

In an example, the first low amplification period A5 includes a first non-amplification period A6. In an example, the controller 64 is configured to control the amplifier 60 so that the amplifier 60 does not amplify the predetermined signal in intensity in the first non-amplification period A6. In the first non-amplification period A6, the amplifier 60 is in the standby state. Thus, the amplifier 60 does not amplify the predetermined signal in the first non-amplification period A6.

The second amplification cycle A2 refers to a length of time from when the amplifier 60 is changed from the standby state to the activation state until the next time the amplifier 60 is changed from the standby state to the activation state. In an example, the second amplification cycle A2 includes a second amplification period A7. The controller 64 is configured to control the amplifier 60 so that the amplifier 60 amplifies the predetermined signal over the second amplification period A7. In the second amplification period A7, the controller 64 controls the amplifier 60 so that the activation state of the amplifier 60 is maintained over the second amplification period A7.

In an example, the second amplification cycle A2 further includes a second amplification interval A8 that is from the second amplification period A7 to the following first amplification period A3. In the second amplification interval A8, the controller 64 controls the amplifier 60 so that the standby state of the amplifier 60 is maintained over the second amplification interval A8. In an example, the second amplification interval A8 includes a second low amplification period A9. In an example, the controller 64 is configured to control the amplifier 60 in the second low amplification period A9 so that the amplifier 60 amplifies the predetermined signal in intensity at a degree lower than an amplification degree of the predetermined signal in the second amplification period A7. In the second low amplification period A9, the amplifier 60 is in the standby state. Thus, an amplification degree of the predetermined signal in the second low amplification period A9 is lower than the amplification degree of the predetermined signal in the second amplification period A7.

In an example, the second low amplification period A9 includes a second non-amplification period A10. In an example, the controller 64 is configured to control the amplifier 60 so that the amplifier 60 does not amplify the predetermined signal in intensity in the second non-amplification period A10. In the second non-amplification period A10, the amplifier 60 is in the standby state. Thus, the amplifier 60 does not amplify the predetermined signal in the second non-amplification period A10.

The controller 64 is configured to control the amplifier 60 so that the first amplification cycle A1 is longer than the second amplification cycle A2. The first amplification cycle A1 is, for example, 1.5 seconds. The second amplification cycle A2 is, for example, 0.05 seconds. In an example, the controller 64 is configured to control the amplifier 60 so that the first amplification period A3 equals the second amplification period A7. In an example, the first amplification interval A4 is longer than the second amplification interval A8. In an example, the first amplification interval A4 is longer than the first amplification period A3. In an example, the second amplification interval A8 is longer than the second amplification period A7.

The controller 64 is configured to control the communicator 62 in accordance with a communication control state. The controller 64 is configured to control the amplifier 60 in accordance with an amplification control state. In an example, the controller 64 is configured to control the communicator 62 in accordance with the communication control state and control the amplifier 60 in accordance with the amplification control state.

In an example, the communication control state includes a first communication control state and a second communication control state. In an example, the communication control state includes the first communication control state, the second communication control state, and a third communication control state. Power consumption of the communicator 62 in the second communication control state is greater than power consumption of the communicator 62 in the first communication control state. Power consumption of the communicator 62 in the third communication control state is greater than the power consumption of the communicator 62 in the second communication control state.

The controller 64 is configured to control the communicator 62 in the first communication control state so that the reception cycle of the communicator 62 is the first reception cycle R1. In an example, the controller 64 is configured to control the communicator 62 in the first communication control state so that the communicator 62 intermittently receives the first signal in the first reception cycle R1. The controller 64 is configured to control the communicator 62 in the second communication control state so that the reception cycle of the communicator 62 is the second reception cycle R2. In an example, the controller 64 is configured to control the communicator 62 in the second communication control state so that the communicator 62 intermittently receives the first signal in the second reception cycle R2. In an example, the controller 64 is configured to control the communicator 62 in the third communication control state so that the communicator 62 continuously receives the first signal.

In an example, in a case where the communication control state is one of the first communication control state and the second communication control state, the controller 64 is configured to switch the communication control state to the other one of the first communication control state and the second communication control state in accordance with the state of the human-powered vehicle 10. The control executed by the controller 64 for switching the communication control state from one of the first communication control state and the second communication control state to the other one of the first communication control state and the second communication control state in accordance with the state of the human-powered vehicle 10 corresponds to, for example, a first example of control at time t11 and a fourth example of control at time t52. In an example, in a case where the human-powered vehicle 10 is operated, the controller 64 switches the communication control state from the first communication control state to the second communication control state. In an example, in a case where the human-powered vehicle 10 is continuously not operated for a first period Y1, the controller 64 switches the communication control state from the second communication control state to the first communication control state.

In an example, in a case where the communication control state is the first communication control state, the controller 64 is configured to switch the communication control state to the third communication control state in accordance with the first signal. The control executed by the controller 64 for switching the communication control state from the first communication control state to the third communication control state in accordance with the first signal corresponds to, for example, a second example of control at time t31. In an example, in a case where the first signal is input to the communicator 62, the controller 64 switches the communication control state from the first communication control state to the third communication control state.

In a case where the communication control state is the second communication control state, the controller 64 is configured to switch the communication control state to the third communication control state in accordance with the first signal. The control executed by the controller 64 for switching the communication control state from the second communication control state to the third communication control state in accordance with the first signal corresponds to, for example, the first example of control at time t12. In an example, in a case where the first signal is input to the communicator 62, the controller 64 switches the communication control state from the second communication control state to the third communication control state.

In an example, in a case where the communication control state is the second communication control state, if the communicator 62 does not receive the first signal and the human-powered vehicle 10 is continuously maintained in a predetermined state over the first period Y1 or longer, the controller 64 is configured to switch the communication control state to the first communication control state. The control executed by the controller 64 for switching the communication control state from the second communication control state to the first communication control state if the communicator 62 does not receive the first signal and the human-powered vehicle 10 is continuously maintained in the predetermined state over the first period Y1 or longer corresponds to, for example, the fourth example of control at time t52. In an example, the predetermined state refers to a state in which the human-powered vehicle 10 is not operated. In an example, in a case where the first signal is not received and the human-powered vehicle 10 is continuously not operated for the first period Y1, the controller 64 switches the communication control state from the second communication control state to the first communication control state.

In an example, in a case where the communication control state is one of the first communication control state and the second communication control state, if the communicator 62 receives the first signal, the controller 64 is configured to control the actuator 70 to perform a predetermined operation. In an example, in a case where the communication control state is the third communication control state, if the communicator 62 receives the first signal, the controller 64 is configured to control the actuator 70 in accordance with the first signal.

Figure 6:
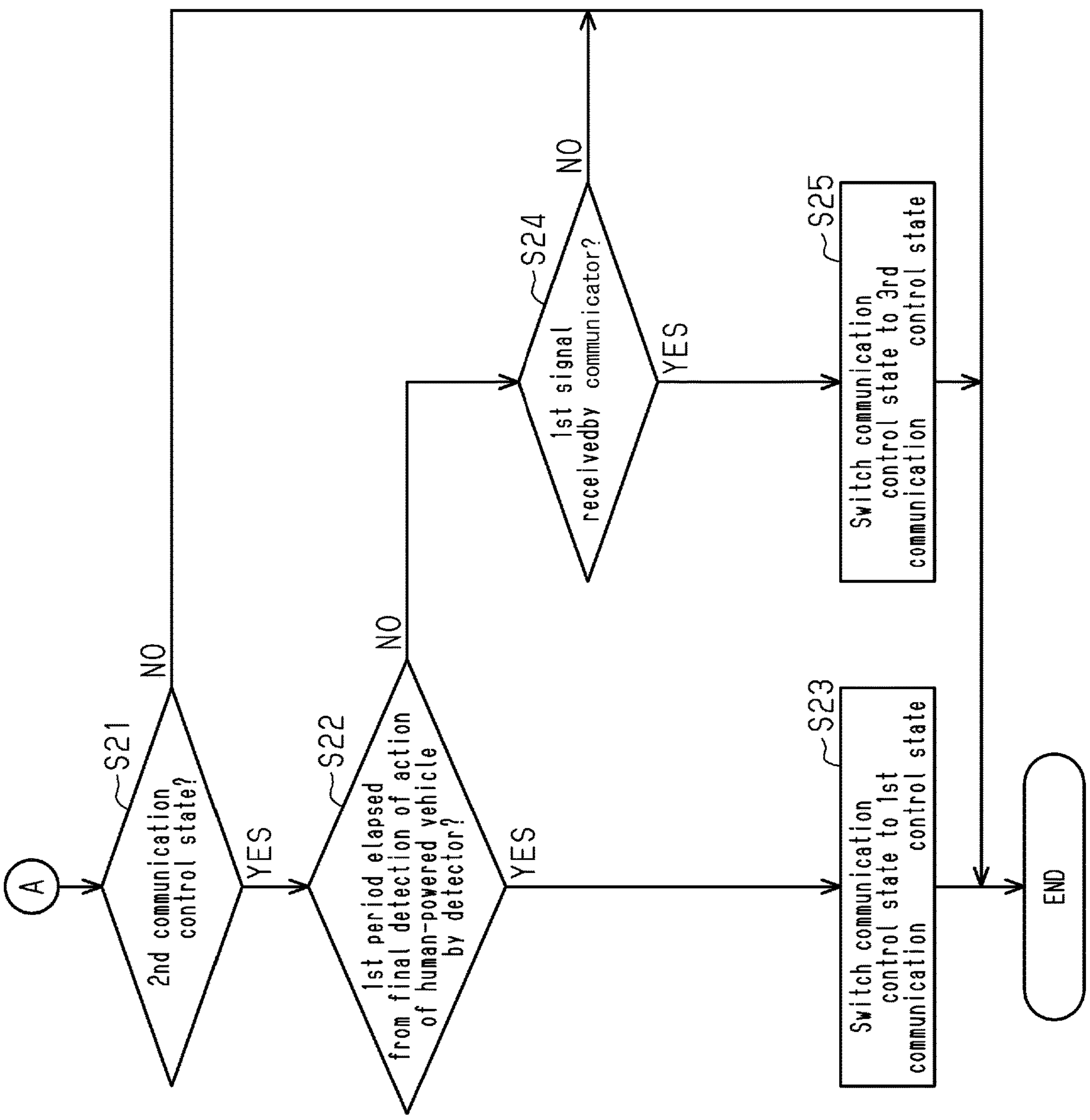
FIG. 6 is a second part of the flowchart of the process for controlling the actuator in accordance with the first signal executed by the electronic controller shown in FIG. 3.

With reference to FIGS. 5 and 6, control executed by the controller 64 on the component 52 will now be described. In an example, in a case where electric power is supplied to the controller 64, the controller 64 starts the process from step S11. In an example, in a case where the process shown in FIGS. 5 and 6 is completed, the controller 64 again starts the process from step S11 after a predetermined period. In a case where electric power is supplied, the communicator 62 can be configured to be activated in any one of the first communication control state, the second communication control state, and the third communication control state. In an example, in a case where electric power is supplied to the controller 64, the controller 64 can set the communication control state to any one of the first communication control state, the second communication control state, and the third communication control state. In an example, in a case where electric power is supplied to the controller 64, the controller 64 is configured to switch the communication control state to the third communication control state and then initially execute step S11. In an example, in a case where electric power is supplied to the controller 64, the controller 64 can be configured to switch the communication control state to the first communication control state and then initially execute step S11. In an example, in a case where electric power is supplied to the controller 64, the controller 64 can be configured to switch the communication control state to the second communication control state and then initially execute step S11.

In step S11, the controller 64 determines whether the communication control state is the third communication control state. In a case where the communication control state is the third communication control state, the controller 64 proceeds to step S12. In step S12, the controller 64 determines whether the first signal is received by the communicator 62. In an example, in a case where information related to operation of the component 52 is received from the communicator 62, the controller 64 determines that the first signal is received by the communicator 62. In a case where the first signal is received by the communicator 62, the controller 64 proceeds to step S13. In a case where the first signal is not received by the communicator 62, the controller 64 proceeds to step S14. In step S13, the controller 64 actuates the actuator 70 in accordance with the first signal, and then ends the process shown in FIGS. 5 and 6.

In step S14, the controller 64 determines whether a fourth predetermined period X4 has elapsed from when the first signal is finally received or the actuator 70 is finally actuated. In an example, the controller 64 is configured to measure a time elapsed from the final reception of the first signal. In an example, the controller 64 is configured to measure a time elapsed from when a completion signal is received from the drive unit 70A. In an example, in a case where the time elapsed from when the completion signal is received from the drive unit 70A is greater than or equal to the fourth predetermined period X4, the controller 64 determines that the fourth predetermined period X4 has elapsed from the final actuation of the actuator 70. In a case where the fourth predetermined period X4 has elapsed from the final reception of the first signal or the final actuation of the actuator 70, the controller 64 proceeds to step S15. In a case where the fourth predetermined period X4 has not elapsed from the final reception of the first signal and the fourth predetermined period X4 has not elapsed from the final actuation of the actuator 70, the controller 64 ends the process shown in FIGS. 5 and 6.

In step S15, the controller 64 switches the communication control state to the first communication control state and then ends the process shown in FIGS. 5 and 6.

In step S11, in a case where the communication control state is not the third communication control state, the controller 64 proceeds to step S16. In step S16, the controller 64 determines whether the communication control state is the first communication control state. In a case where the communication control state is the first communication control state, the controller 64 proceeds to step S17. In step S17, the controller 64 determines whether an action of the human-powered vehicle 10 is detected by the detector 72. In a case where an action of the human-powered vehicle 10 is detected by the detector 72, the controller 64 proceeds to step S18. In a case where an action of the human-powered vehicle 10 is not detected by the detector 72, the controller 64 proceeds to step S19. In an example, in a case where the parameter detected by the detector 72 corresponds to a case where the human-powered vehicle 10 is being used by the rider, the controller 64 determines that the detector 72 detects an action of the human-powered vehicle 10.

In step S18, the controller 64 switches the communication control state to the second communication control state and then ends the process shown in FIGS. 5 and 6.

In step S19, the controller 64 determines whether the first signal is received by the communicator 62. In a case where the first signal is received by the communicator 62, the controller 64 proceeds to step S20. In a case where the first signal is not received by the communicator 62, the controller 64 ends the process shown in FIGS. 5 and 6.

In step S20, the controller 64 switches the communication control state to the third communication control state and then ends the process shown in FIGS. 5 and 6.

In step S16, in a case where the communication control state is not the first communication control state, the controller 64 proceeds to step S21. In step S21, the controller 64 determines whether the communication control state is the second communication control state. In a case where the communication control state is the second communication control state, the controller 64 proceeds to step S22. In a case where the communication control state is not the second communication control state, the controller 64 ends the process shown in FIGS. 5 and 6.

In step S21, the case where the communication control state is not the second communication control state is, for example, a case where the controller 64 cannot determine the present communication control state. In a case where the communication control state includes a further communication control state differing from the first communication control state, the second communication control state, and the third communication control state, the case where the communication control state is not the second communication control state in step S21 can be a case where the communication control state is the further communication control state differing from the first communication control state, the second communication control state, and the third communication control state. Step S21 can be omitted. In a case where step S21 is omitted and the negative determination is made in step S16, the controller 64 proceeds to step S22.

In step S22, the controller 64 determines whether the first period Y1 has elapsed from when an action of the human-powered vehicle 10 is finally detected by the detector 72. In an example, the controller 64 is configured to measure a time elapsed from when the detection signal is finally received from the detector 72. In an example, in a case where the time elapsed from when a detection signal is received from the detector 72 is greater than or equal to the first period Y1, the controller 64 determines that the first period Y1 has elapsed from the final detection of an action of the human-powered vehicle 10 by the detector 72. In a case where the first period Y1 has elapsed from the final detection of an action of the human-powered vehicle 10 by the detector 72, the controller 64 proceeds to step S23. In a case where the first period Y1 has not elapsed from the final detection of an action of the human-powered vehicle 10 by the detector 72, the controller 64 proceeds to step S24.

In step S23, the controller 64 switches the communication control state to the first communication control state and then ends the process shown in FIGS. 5 and 6.

In step S24, the controller 64 determines whether the first signal is received by the communicator 62. In a case where the first signal is received by the communicator 62, the controller 64 proceeds to step S25. In a case where the first signal is not received by the communicator 62, the controller 64 ends the process shown in FIGS. 5 and 6.

In step S25, the controller 64 switches the communication control state to the third communication control state and then ends the process shown in FIGS. 5 and 6.

The amplification control state includes the first amplification control state and the second amplification control state. The amplification control state includes the first amplification control state, the second amplification control state, and a third amplification control state. Power consumption of the amplifier 60 in the second amplification control state is greater than power consumption of the amplifier 60 in the first amplification control state. Power consumption of the amplifier 60 in the third amplification control state is greater than the power consumption of the amplifier 60 in the second amplification control state.

In an example, in the first amplification control state, the controller 64 is configured to control the amplifier 60 so that the amplifier 60 enters sleep mode or operates intermittently. In the first amplification control state, the controller 64 is configured to control the amplifier 60 so that the amplifier 60 stops amplifying the predetermined signal in intensity.

In an example, in the second amplification control state, the controller 64 is configured to control the amplifier 60 so that the amplifier 60 operates continuously or operates intermittently. In an example, in the second amplification control state, the controller 64 is configured to control the amplifier 60 so that the amplifier 60 operates intermittently. In an example, in the third amplification control state, the controller 64 is configured to control the amplifier 60 so that the amplifier 60 operates intermittently or operates continuously.

In an example, in a case where the power consumption of the amplifier 60 in the second amplification control state is greater than the power consumption of the amplifier 60 in the first amplification control state and the power consumption of the amplifier 60 in the third amplification control state is greater than the power consumption of the amplifier 60 in the second amplification control state, each of the first amplification control state, the second amplification control state, and the third amplification control state can correspond to one of a state in which the amplifier 60 is in sleep mode, a state in which the amplifier 60 performs intermittent amplification in the first amplification cycle A1, a state in which the amplifier 60 performs intermittent amplification in the second amplification cycle A2, and a state in which the amplifier 60 performs continuous amplification.

The controller 64 controls the amplifier 60 in accordance with one of a first amplification control example, a second amplification control example, and a third amplification control example. In the first amplification control example, the controller 64 is configured to control the amplifier 60 so that, for example, the amplifier 60 is in sleep mode in the first amplification control state, the amplifier 60 operates intermittently in the first amplification cycle A1 or the second amplification cycle A2 in the second amplification control state, and the amplifier 60 operates continuously in the third amplification control state.

In the second amplification control example, the controller 64 is configured to control the amplifier 60 so that, for example, the amplifier 60 is in sleep mode in the first amplification control state, the amplifier 60 operates intermittently in the first amplification cycle A1 in the second amplification control state, and the amplifier 60 operates intermittently in the second amplification cycle A2 in the third amplification control state.

In the third amplification control example, the controller 64 is configured to control the amplifier 60 so that, for example, the amplifier 60 operates intermittently in the first amplification cycle A1 in the first amplification control state, the amplifier 60 operates intermittently the second amplification cycle A2 in the second amplification control state, and the amplifier 60 operates continuously in the third amplification control state.

In the first amplification control example, the second amplification control state includes a state in which the amplifier 60 operates intermittently in the first amplification cycle A1 and a state in which the amplifier 60 operates intermittently in the second amplification cycle A2. The second amplification control state includes, for example, a first intermittent control state and a second intermittent control state in which power consumption of the amplifier 60 is greater than power consumption of the amplifier 60 in the first intermittent control state. In an example of the first intermittent control state, the controller 64 is configured to control the amplifier 60 so that the amplification cycle of the amplifier 60 equals the first amplification cycle A1. In an example of the second intermittent control state, the controller 64 is configured to control the amplifier 60 so that the amplification cycle equals the second amplification cycle A2, which is shorter than the first amplification cycle A1. In an example of the first intermittent control state, the controller 64 is configured to control the amplifier 60 so that the amplifier 60 amplifies the predetermined signal in intensity in the first amplification period A3. In an example of the second intermittent control state, the controller 64 is configured to control the amplifier 60 so that the amplifier 60 amplifies the predetermined signal in intensity in the second amplification period A7. The second amplification control state can be configured to include only the first intermittent control state.

In an example, in a case where the amplification control state is the first amplification control state, the controller 64 is configured to switch the amplification control state to the second amplification control state in accordance with at least one of the predetermined signal, the state of the human-powered vehicle 10, and the state of the communicator 62.

In an example, in a case where the amplification control state is the first amplification control state, the controller 64 is configured to switch the amplification control state to the first intermittent control state in accordance with at least one of the predetermined signal, the state of the human-powered vehicle 10, and the state of the communicator 62.

In an example, in a case where the amplification control state is the first intermittent control state, the controller 64 is configured to switch the amplification control state to the second intermittent control state in accordance with the predetermined signal.

In an example, in a case where the amplification control state is the second amplification control state, the controller 64 is configured to switch the amplification control state to the third amplification control state in accordance with at least one of the predetermined signal, the state of the human-powered vehicle 10, and the state of the communicator 62. In an example, in a case where the communication control state is the third communication control state, the controller 64 is configured to switch the amplification control state from the second intermittent control state to the third amplification control state in accordance with the predetermined signal.

In an example, in a case where the amplification control state is the third amplification control state, if a time elapsed from the final input of the predetermined signal becomes greater than or equal to a first predetermined period X1, the controller 64 is configured to switch the amplification control state to the second amplification control state.

In an example, in a case where the amplification control state is the second intermittent control state, the controller 64 is configured to switch the amplification control state to the first intermittent control state in accordance with the predetermined signal.

In an example, in a case where the amplification control state is the second amplification control state, if the predetermined signal is not received and the human-powered vehicle 10 is continuously maintained in a predetermined state over a second predetermined period X2 or longer, the controller 64 is configured to switch the amplification control state to the first amplification control state.

Figure 8:
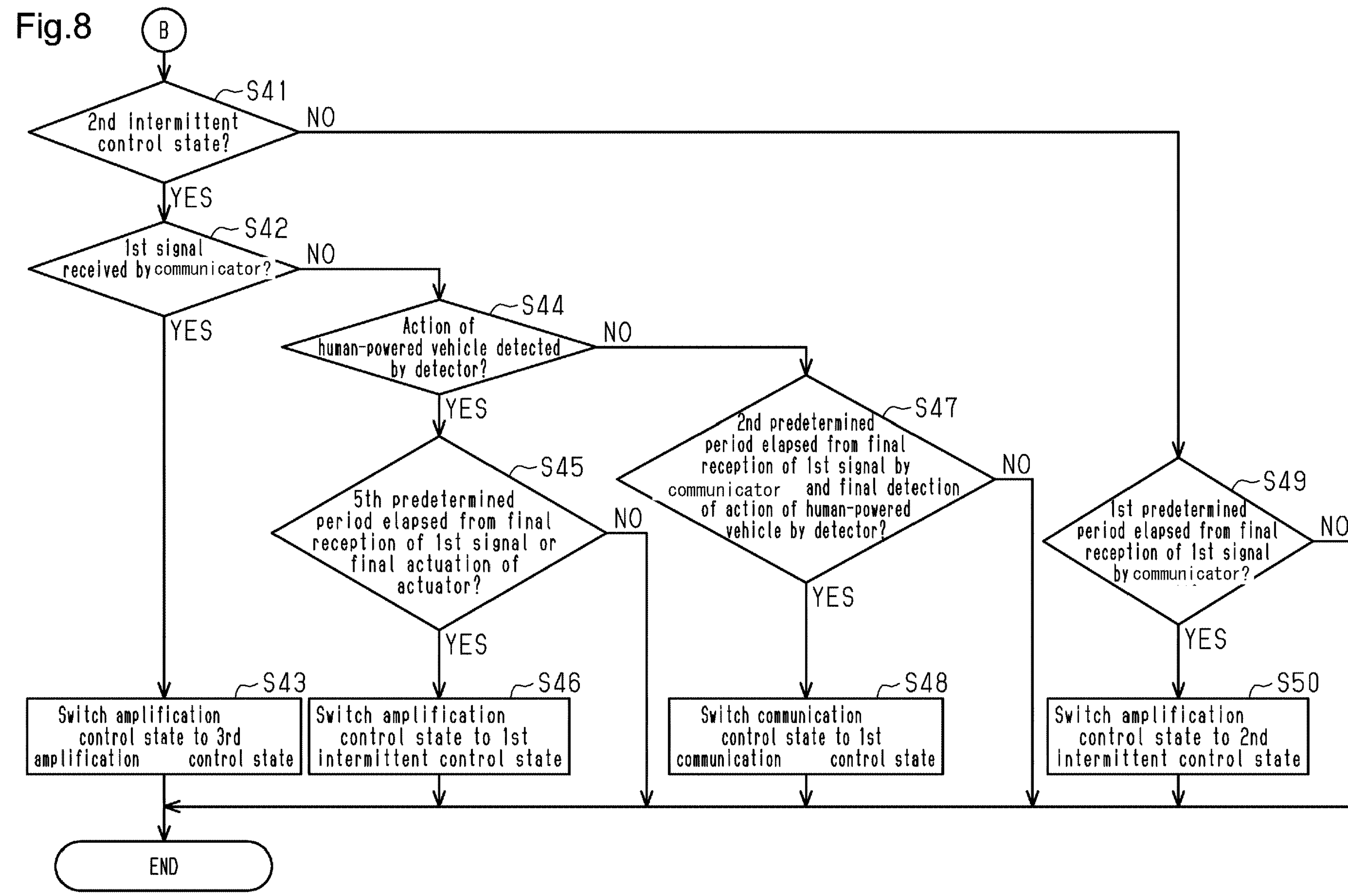
FIG. 8 is a second part of the flowchart of the process for switching the amplification control state executed by the electronic controller shown in FIG. 3.

An example of control executed by the controller 64 for switching the amplification control state will now be described with reference to FIGS. 7 and 8. In an example, in a case where electric power is supplied to the controller 64, the controller 64 starts the process from step S31. In an example, in a case where the process shown in FIGS. 7 and 8 is completed, the controller 64 again starts the process from step S31 after a predetermined period. In a case where electric power is supplied, the amplifier 60 can be configured to be activated in any one of the first amplification control state, the second amplification control state, and the third amplification control state. In an example, in a case where electric power is supplied to the controller 64, the controller 64 can set the amplification control state to any one of the first amplification control state, the second amplification control state, and the third amplification control state. In an example, in a case where electric power is supplied to the controller 64, the controller 64 is configured to switch the amplification control state to the third amplification control state and then initially execute step S31. In an example, in a case where electric power is supplied to the controller 64, the controller 64 can be configured to switch the amplification control state to the first amplification control state and then initially execute step S31. In an example, in a case where electric power is supplied to the controller 64, the controller 64 can be configured to switch the amplification control state to the second amplification control state and then initially execute step S31.

In step S31, the controller 64 determines whether the amplification control state is the first amplification control state. In a case where the amplification control state is the first amplification control state, the controller 64 proceeds to step S32. In a case where the amplification control state is not the first amplification control state, the controller 64 proceeds to step S36.

In step S32, the controller 64 determines whether the detector 72 detects an action of the human-powered vehicle 10. In a case where an action of the human-powered vehicle 10 is detected by the detector 72, the controller 64 proceeds to step S33. In a case where an action of the human-powered vehicle 10 is not detected by the detector 72, the controller 64 proceeds to step S34.

In step S33, the controller 64 switches the amplification control state to the first intermittent control state and then ends the process shown in FIGS. 7 and 8.

In step S34, the controller 64 determines whether the first signal is received by the communicator 62. In a case where the first signal is received by the communicator 62, the controller 64 proceeds to step S35. In a case where the first signal is not received by the communicator 62, the controller 64 ends the process shown in FIGS. 7 and 8.

In step S35, the controller 64 switches the amplification control state to the second intermittent control state and then ends the process shown in FIGS. 7 and 8.

In step S36, the controller 64 determines whether the amplification control state is the first intermittent control state. In a case where the amplification control state is the first intermittent control state, the controller 64 proceeds to step S37. In a case where the amplification control state is not the first intermittent control state, the controller 64 proceeds to step S41.

In step S37, the controller 64 determines whether the first period Y1 has elapsed from when an action of the human-powered vehicle 10 is finally detected by the detector 72. In a case where the first period Y1 has elapsed from the final detection of an action of the human-powered vehicle 10 by the detector 72, the controller 64 proceeds to step S38. In a case where the first period Y1 has not elapsed from the final detection of an action of the human-powered vehicle 10 by the detector 72, the controller 64 proceeds to step S39.

In step S38, the controller 64 switches the amplification control state to the first amplification control state and then ends the process shown in FIGS. 7 and 8.

In step S39, the controller 64 determines whether the first signal is received by the communicator 62. In a case where the first signal is received by the communicator 62, the controller 64 proceeds to step S40. In a case where the first signal is not received by the communicator 62, the controller 64 ends the process shown in FIGS. 7 and 8.

In step S40, the controller 64 switches the amplification control state to the second intermittent control state and then ends the process shown in FIGS. 7 and 8.

In step S41, the controller 64 determines whether the amplification control state is the second intermittent control state. In a case where the amplification control state is the second intermittent control state, the controller 64 proceeds to step S42. In a case where the amplification control state is not the second intermittent control state, the controller 64 proceeds to step S49.

In step S42, the controller 64 determines whether the first signal is received by the communicator 62. In a case where the first signal is received by the communicator 62, the controller 64 proceeds to step S43. In a case where the first signal is not received by the communicator 62, the controller 64 ends the process shown in FIGS. 7 and 8.

In step S43, the controller 64 switches the amplification control state to the third amplification control state and then ends the process shown in FIGS. 7 and 8.

In step S44, the controller 64 determines whether the detector 72 detects an action of the human-powered vehicle 10. In a case where an action of the human-powered vehicle 10 is detected by the detector 72, the controller 64 proceeds to step S45. In a case where an action of the human-powered vehicle 10 is not detected by the detector 72, the controller 64 proceeds to step S47.

In step S45, the controller 64 determines whether a fifth predetermined period X5 has elapsed from when the first signal is finally received or the actuator 70 is finally actuated. In an example, in a case where a time elapsed from when the completion signal is received from the drive unit 70A is greater than or equal to the fifth predetermined period X5, the controller 64 determines that the fifth predetermined period X5 has elapsed from the final actuation of the actuator 70. In a case where the fifth predetermined period X5 has elapsed from the final reception of the first signal or the final actuation of the actuator 70, the controller 64 proceeds to step S46. In a case where the fifth predetermined period X5 has not elapsed from the final reception of the first signal and the fifth predetermined period X5 has not elapsed from the final actuation of the actuator 70, the controller 64 ends the process shown in FIGS. 7 and 8.

In step S46, the controller 64 switches the amplification control state to the first intermittent control state and then ends the process shown in FIGS. 7 and 8.

In step S47, the controller 64 determines whether the second predetermined period X2 has elapsed from when the first signal is finally received by the communicator 62 and an action of the human-powered vehicle 10 is finally detected by the detector 72. In a case where the second predetermined period X2 has elapsed from the final reception of the first signal by the communicator 62 and the final detection of an action of the human-powered vehicle 10 by the detector 72, the controller 64 proceeds to step S48. In a case where the second predetermined period X2 has not elapsed from the final reception of the first signal by the communicator 62 and the final detection of an action of the human-powered vehicle 10 by the detector 72, the controller 64 ends the process shown in FIGS. 7 and 8.

In step S48, the controller 64 switches the amplification control state to the first amplification control state and then ends the process shown in FIGS. 7 and 8.

In step S49, the controller 64 determines whether the first predetermined period X1 has elapsed from when the first signal is finally received by the communicator 62. In a case where the first predetermined period X1 has elapsed from when the final reception of the first signal by the communicator 62, the controller 64 proceeds to step S50. In a case where the first predetermined period X1 has not elapsed from when the final reception of the first signal by the communicator 62, the controller 64 ends the process shown in FIGS. 7 and 8.

In step S50, the controller 64 switches the amplification control state to the second intermittent control state and then ends the process shown in FIGS. 7 and 8.

A first example of changes in the states of the communicator 62, the amplifier 60, and the actuator 70 will now be described with reference to FIGS. 3 and 9. The controller 64 is configured to control the communicator 62, the amplifier 60, and the actuator 70 in accordance with the state of the detector 72 and the state of the communication device 54.

The controller 64 controls the communicator 62, the amplifier 60, and the actuator 70 in accordance with a state of the human-powered vehicle 10. The state of the human-powered vehicle 10 is, for example, a state in which the human-powered vehicle 10 is in the predetermined state. The state of the human-powered vehicle 10 includes, for example, the state of the detector 72. In an example, the controller 64 determines the state of the human-powered vehicle 10 based on the state of the detector 72. The controller 64 determines whether the human-powered vehicle 10 is in the predetermined state based on a detection signal of the detector 72.

The state of the detector 72 includes, for example, a detection state and a non-detection state. In an example, the detection state refers to a state in which the human-powered vehicle 10 is being used by the rider. The non-detection state refers to a state in which the human-powered vehicle 10 is not used by the rider. For example, a case where the detector 72 is in the detection state corresponds to a case where the human-powered vehicle 10 is in the use state. For example, a case where the detector 72 is in the non-detection state corresponds to a case where the human-powered vehicle 10 is in the predetermined state. In a case where the detector 72 detects vibration of the human-powered vehicle 10, the detection state includes, for example, a state in which the detector 72 outputs a detection signal to the controller 64. In a case where the detector 72 detects vibration of the human-powered vehicle 10, the non-detection state includes, for example, a state in which the detector 72 does not output a detection signal to the controller 64.

In an example, in a case where the detector 72 is changed from the non-detection state to the detection state, the controller 64 determines that the human-powered vehicle 10 is operated by the rider and the human-powered vehicle 10 is changed from the predetermined state to the use state.

The state of the communication device 54 includes, for example, a transmission state and a non-transmission state. The state in which the communication device 54 is in the transmission state refers to a state in which the communicator 62 transmits the first signal to the component 52. The state in which the communication device 54 is in the non-transmission state refers to a state in which the communicator 62 does not transmit the first signal to the component 52. In the transmission state, the communication device 54 is configured to continue transmission of the first signal over a predetermined period. The communication device 54 can be configured to continue transmission of the first signal by repeating transmission of the first signal over the predetermined period.

At time t10, the detector 72 is in the non-detection state, and the communication device 54 is in the non-transmission state. At time t10, the controller 64 controls the communicator 62 so that the communicator 62 intermittently receives the first signal in the first reception cycle R1. At time t10, the controller 64 controls the amplifier 60 so that the amplifier 60 is in sleep mode.

At time t11, in a state in which the communication device 54 is in the non-transmission state, the detector 72 is changed from the non-detection state to the detection state. At time t11, an action of the human-powered vehicle 10 is detected by the detector 72. At time t11, for example, the rider mounts the human-powered vehicle 10. From time t11, the controller 64 controls the communicator 62 so that the communicator 62 intermittently receives the first signal in the second reception cycle R2. From time t11, the controller 64 controls the amplifier 60 so that the amplifier 60 intermittently amplifies the predetermined signal in the first amplification cycle A1.

At time t12, the detector 72 is in the detection state, and the communication device 54 is changed from the non-transmission state to the transmission state. At time t12, the communicator 62 receives the first signal for the first time. At time t12, for example, the communication device 54 is operated by the rider. From time t12, the controller 64 controls the communicator 62 so that the communicator 62 continuously receives the first signal. From time t12, the controller 64 controls the amplifier 60 so that the amplifier 60 intermittently amplifies the predetermined signal in the second amplification cycle A2.

At time t13, the controller 64 controls the actuator 70 using the drive unit 70A so that the actuator 70 performs a predetermined operation. The predetermined operation is, for example, an operation for notifying the rider that the first signal is received by the component 52.

At time t14, the detector 72 is in the detection state, and the communication device 54 is changed from the non-transmission state to the transmission state. At time t14, the communicator 62 receives the first signal for the second time. From time t14, the controller 64 controls the amplifier 60 so that the amplifier 60 continuously amplifies the predetermined signal. At time t14, the controller 64 controls the actuator 70 in accordance with the first signal.

At time t15, the detector 72 is in the detection state, and the communication device 54 is changed from the non-transmission state to the transmission state. At time t15, the communicator 62 receives the first signal for the third time. At time t15, the controller 64 controls the actuator 70 in accordance with the first signal.

At time t16, the operation of the actuator 70 started at time t15 is completed.

At time t17, the detector 72 is in the detection state, the communication device 54 is in the non-transmission state, and the first predetermined period X1 has elapsed from time t15. From time t17, the controller 64 controls the amplifier 60 so that the amplifier 60 intermittently amplifies the predetermined signal in the second amplification cycle A2.

At time t18, the communication device 54 is in the non-transmission state, and the detector 72 is changed from the detection state to the non-detection state. At time t18, for example, detection of an action of the human-powered vehicle 10 by the detector 72 is stopped. At time t18, for example, the rider dismounts from the human-powered vehicle 10.

At time t19, the detector 72 is in the non-detection state, the communication device 54 is in the non-transmission state, and the second predetermined period X2 has elapsed from time t18. From time t19, the controller 64 controls the amplifier 60 so that the amplifier 60 is in sleep mode.

At time t20, the detector 72 is in the non-detection state, the communication device 54 is in the non-transmission state, and a third predetermined period X3 has elapsed from time t16. At time t20, the third predetermined period X3 has elapsed from completion of the operation of the actuator 70 and the detector 72 is the non-detection state. From time t20, the controller 64 controls the communicator 62 so that the communicator 62 intermittently receives the first signal in the first reception cycle R1. From time t20, the controller 64 continues to control the communicator 62 and the amplifier 60.

Figure 10:
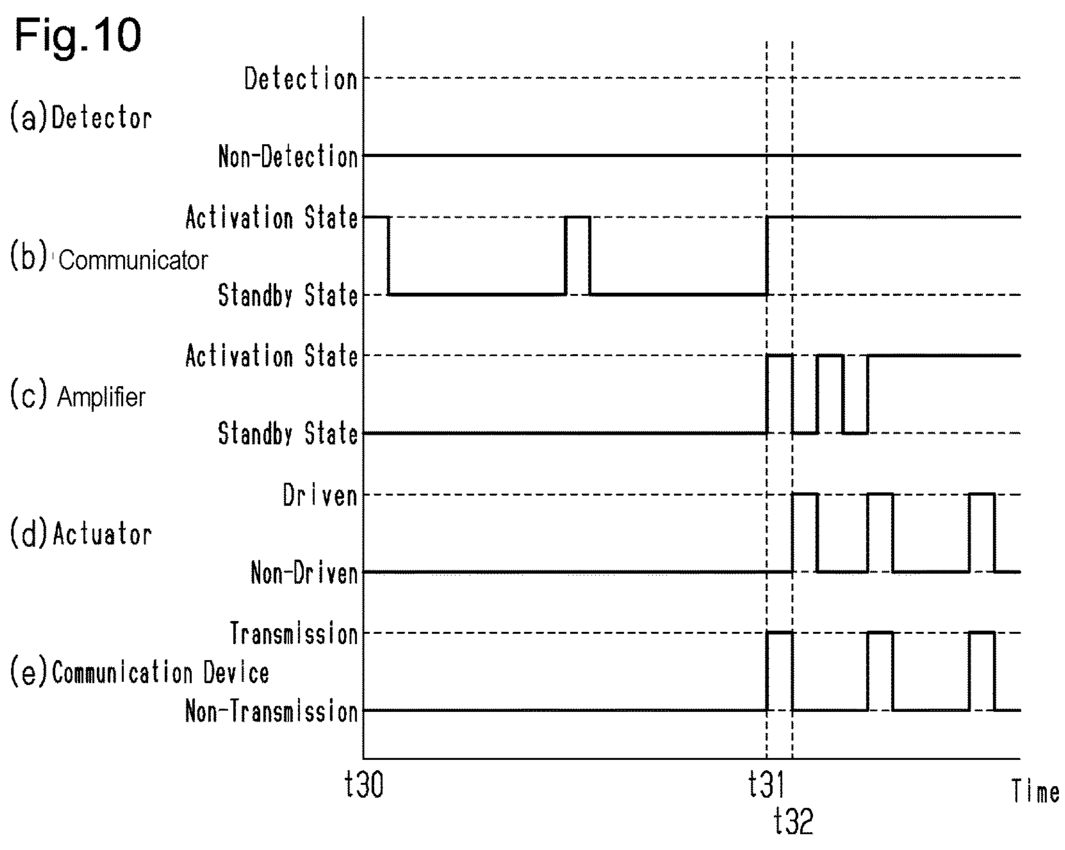
FIG. 10 is a timing chart showing a second example of changes in the states of the communicator, the amplifier, and the actuator shown in FIG. 3.

A second example of control of the communicator 62, the amplifier 60, and the actuator 70 executed by the controller 64 will now be described with reference to FIGS. 3 and 10.

The control of the controller 64 at time t30 is in the same state as that of the first example at time t10.

At time t31, in a state in which the detector 72 is in the non-detection state, the communication device 54 is changed from the non-transmission state to the transmission state. From time t31, the controller 64 controls the communicator 62 so that the communicator 62 continuously receives the first signal. From time t31, the controller 64 controls the amplifier 60 so that the amplifier 60 intermittently amplifies the predetermined signal in the second amplification cycle A2.

The control of the controller 64 from time t32 is the same as the control in the first example from time t13 and will not be described in detail.

A third example of control of the communicator 62, the amplifier 60, and the actuator 70 executed by the controller 64 will now be described with reference to FIGS. 3 and 11.

The control of the controller 64 at time t40 is the same as the control in the first example at time t10. The control from time t41 to time t46 is the same as the control in the first example from time t12 to time t17. At time t44, the detector 72 is in the detection state, and the communication device 54 is changed from the non-transmission state to the transmission state. At time t44, the controller 64 controls the actuator 70 in accordance with the first signal. At time t45, the operation of the actuator 70 started at time t44 is completed.

At time t47, the detector 72 is in the detection state, the communication device 54 is in the non-transmission state, and a fourth predetermined period X4 has elapsed from time t45. At time t47, the detector 72 is in the detection state, the communication device 54 is in the non-transmission state, and the fifth predetermined period X5 has elapsed from time t44. From time t47, the controller 64 controls the communicator 62 so that the communicator 62 intermittently receives the first signal in the second reception cycle R2. From time t47, the controller 64 controls the amplifier 60 so that the amplifier 60 intermittently amplifies the predetermined signal in the first amplification cycle A1.

At time t48, the detector 72 is in the non-detection state, the communication device 54 is in the non-transmission state, and a sixth predetermined period X6 has elapsed from time t45. From time t48, the controller 64 controls the communicator 62 so that the communicator 62 intermittently receives the first signal in the first reception cycle R1. From time t48, the controller 64 controls the amplifier 60 so that the amplifier 60 is in sleep mode.

Figure 12:
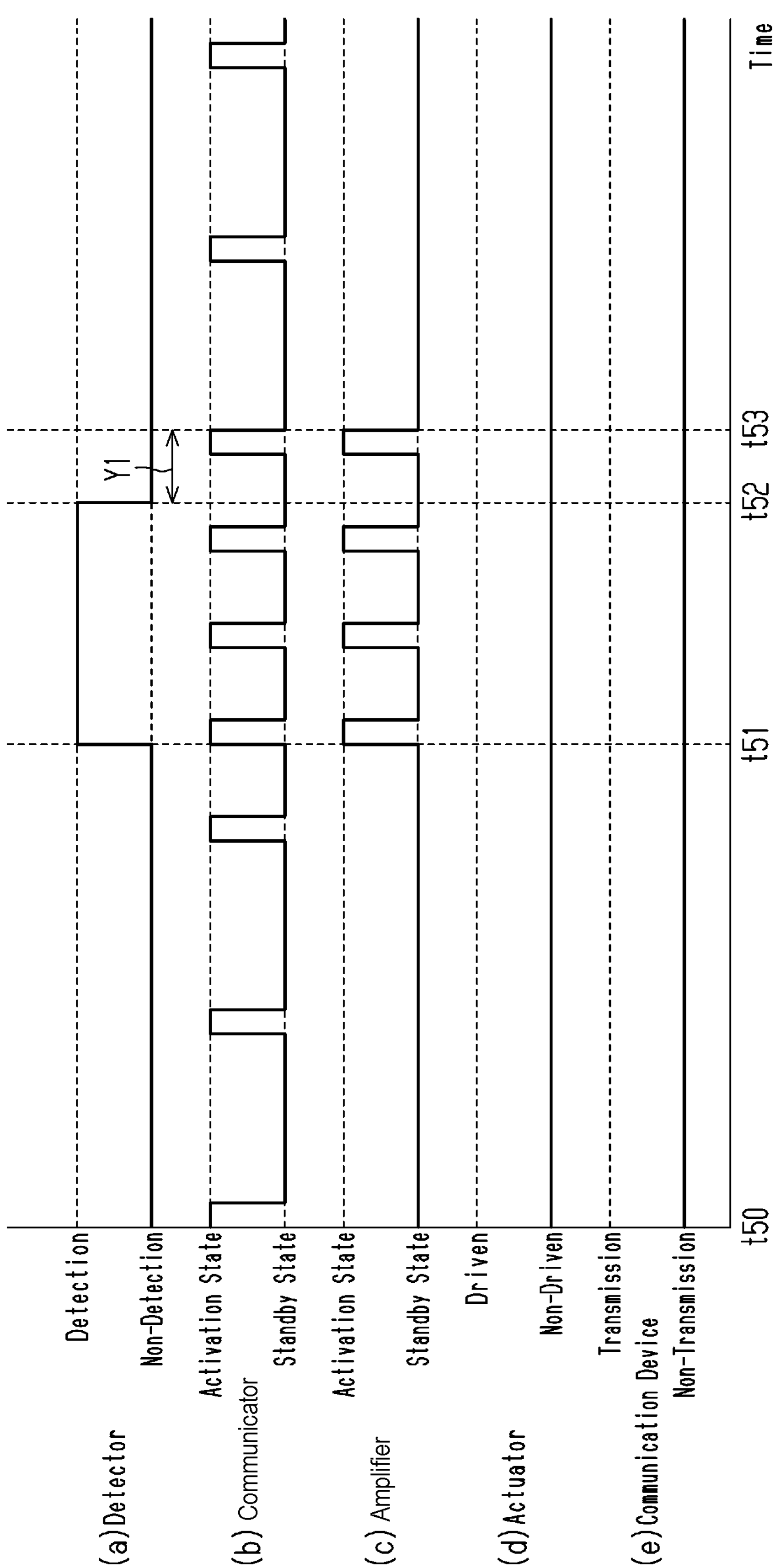
FIG. 12 is a timing chart showing a fourth example of changes in the states of the communicator, the amplifier, and the actuator shown in FIG. 3.

A fourth example of control of the communicator 62, the amplifier 60, and the actuator 70 executed by the controller 64 will now be described with reference to FIGS. 3 and 12.

The control of the controller 64 from time t50 to time t51 is the same as the control in the first example from time t10 to time t11.

At time t52, the communication device 54 is in the non-transmission state, and the detector 72 is changed from the detection state to the non-detection state. At time t52, for example, detection of an action of the human-powered vehicle 10 by the detector 72 is stopped.

At time t53, the first period Y1 has elapsed from time t52. From time t53, the controller 64 controls the communicator 62 so that the communicator 62 intermittently receives the first signal in the first reception cycle R1. From time t53, the controller 64 controls the amplifier 60 so that the amplifier 60 does not amplify the predetermined signal.

The control executed by the controller 64 for switching the amplification control state from the first amplification control state to the second amplification control state in accordance with at least one of the state of the human-powered vehicle 10 and the state of the communicator 62 corresponds to, for example, the first example of control at time t11 and the first example of control at time t12. At time t11 in the first example, for example, in a case where the human-powered vehicle 10 is operated, the controller 64 switches the amplification control state from the first amplification control state to the second amplification control state. At time t12 in the first example, for example, in a case where the predetermined signal is input, the controller 64 switches the amplification control state from the first amplification control state to the second amplification control state.

The control executed by the controller 64 for switching the amplification control state from the first amplification control state to the first intermittent control state in accordance with at least one of the state of the human-powered vehicle 10 and the state of the communicator 62 corresponds to, for example, the first example of control at time t11 and the second example of control at time t31. At time t11 in the first example, for example, in a case where the human-powered vehicle 10 is operated, the controller 64 switches the amplification control state from the first amplification control state to the first intermittent control state. At time t31 in the second example, for example, in a case where the predetermined signal is input, the controller 64 switches the amplification control state from the first amplification control state to the first intermittent control state.

The control executed by the controller 64 for switching the amplification control state from the first intermittent control state to the second intermittent control state in accordance with the predetermined signal corresponds to, for example, the first example of control at time t12. At time t12 in the first example, for example, in a case where the predetermined signal is input, the controller 64 switches the amplification control state from the first intermittent control state to the second intermittent control state.

The control executed by the controller 64 for switching the amplification control state from the second amplification control state to the third amplification control state in accordance with at least one of the predetermined signal, the state of the human-powered vehicle 10, and the state of the communicator 62 corresponds to, for example, the first example of control at time t14. At time t14 in the first example, for example, in a case where the predetermined signal is input, the controller 64 switches the amplification control state from the second amplification control state to the third amplification control state.

The control executed by the controller 64 for switching the amplification control state from the third amplification control state to the second amplification control state in a case where the period elapsed from the final input of the predetermined signal becomes greater than or equal to the first predetermined period X1 corresponds to, for example, the first example of control at time t17. At time t17 in the first example, for example, in a case where a time elapsed from time t15, at which the predetermined signal is finally received by the communicator 62, becomes greater than or equal to the first predetermined period X1, the controller 64 switches the amplification control state from the third amplification control state to the second amplification control state.

The control executed by the controller 64 for switching the amplification control state from the second intermittent control state to the first intermittent control state in accordance with the predetermined signal corresponds to, for example, the third example of control at time t47. At time t47 in the third example, for example, in a case where the fifth predetermined period X5 has elapsed from the final reception of the predetermined signal by the communicator 62, the controller 64 switches the amplification control state from the second intermittent control state to the first intermittent control state.

The control executed by the controller 64 for switching the amplification control state from the second amplification control state to the first amplification control state in a case where the predetermined signal is not input and the human-powered vehicle 10 is continuously maintained in the predetermined state over the second predetermined period X2 or longer corresponds to, for example, the first example of control at time t19. At time t19 in the first example, for example, in a case where the predetermined signal is not input from time t18, at which the human-powered vehicle 10 enters the predetermined state, and the human-powered vehicle 10 is maintained in the predetermined state over the second predetermined period X2, the controller 64 switches the amplification control state from the second amplification control state to the first amplification control state.

The component 52 switches the communication control state and the amplification control state to appropriately adjust the state that readily receives the first signal with more power consumption and the state that does not readily receive the first signal with less power consumption. This achieves efficient power consumption and allows for reduction in size of the battery 68.

The communicator 62 is configured to receive the first signal in a case where the communication control state is any one of the first communication control state, the second communication control state, and the third communication control state. This allows the component 52 to perform wireless communication with the communication device 54. In a case where the communication device 54 includes the operating device 24, the component 52 is appropriately actuated in accordance with operation of the operating device 24 performed by the rider.

In a state in which the first signal is highly likely to be input, the controller 64 controls the amplifier 60 so that the amplifier 60 continuously amplifies the first signal. This reduces the probability of a reception error of the first signal. The state in which the first signal is highly likely to be input is, for example, a state in which the communicator 62 consecutively receives the first signal two times or more. In an example, the first signal includes first signals differing in transmission period. The transmitter 56 is configured to transmit a first signal having a long transmission period in a case where the operation time of the transmitter 56 is long, and a first signal having a short transmission period in a case where the operation time of the transmitter 56 is short. The continuous amplification of the amplifier 60 avoids, for example, a situation in which the amplifier 60 enters the standby state while receiving the first signal having a long transmission period. Thus, erroneous reception of the first signal having a long transmission period as the first signal having a short transmission period occurs less frequently.

Second Embodiment

A second embodiment of the human-powered vehicle control system 50 and the human-powered vehicle component 52 will now be described with reference to FIGS. 3, 6, 13, and 14. The second embodiment of the human-powered vehicle control system 50 and the human-powered vehicle component 52 is the same as the first embodiment of the human-powered vehicle control system 50 and the human-powered vehicle component 52 except for the control of the communicator 62, the amplifier 60, and the actuator 70 executed by the controller 64. Thus, same reference characters are given to those elements that are the same as the corresponding elements of the first embodiment. Such elements will not be described in detail.

In the present embodiment, in a case where the communication control state is the second communication control state and the communicator 62 does not receive the first signal before an elapsed period from when the communication control state is switched to the second communication control state becomes a second period Y2, the controller 64 is configured to switch the communication control state to the first communication control state.

In an example, in a case where the communication control state is the second communication control state and the communicator 62 does not receive the first signal before the elapsed period from when the communication control state is switched to the second communication control state becomes the second period Y2, the controller 64 is configured to switch the communication control state to the first communication control state as the second period Y2 elapses regardless of the state of the human-powered vehicle 10. In a case where the communication control state is the second communication control state and the communicator 62 does not receive the first signal before the elapsed period from when the communication control state is switched to the second communication control state becomes the second period Y2, the controller 64 is configured to switch the communication control state to the first communication control state as the second period Y2 elapses, for example, even if the human-powered vehicle 10 is operated.

Control executed by the controller 64 for switching the communication control state in the present embodiment will now be described with reference to FIGS. 6 and 13.

Figure 13:
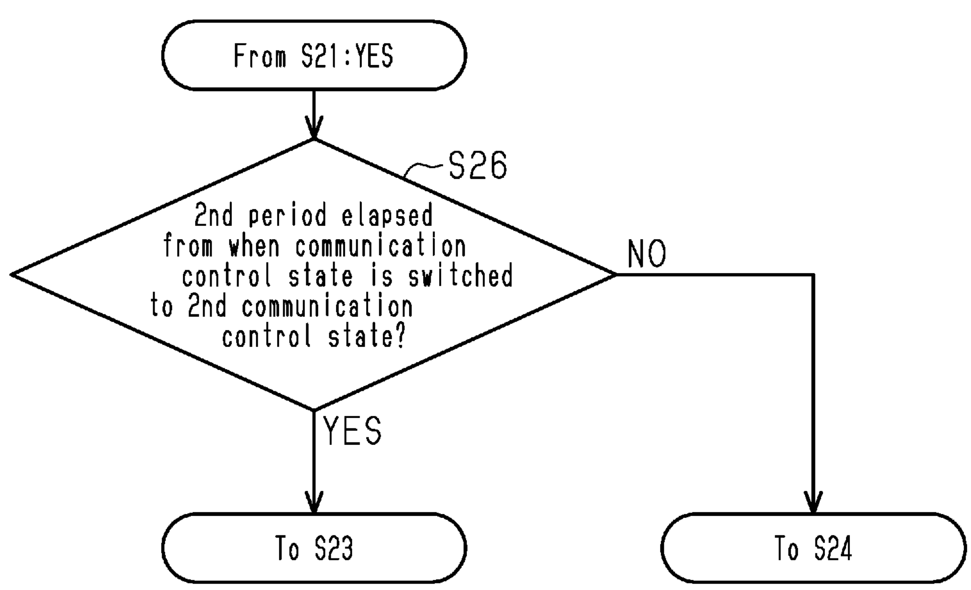
FIG. 13 is a part of a flowchart of a process for switching the amplification control state executed by an electronic controller in accordance with a second embodiment.

In the present embodiment, in step S21 shown in FIG. 6, in a case where the communication control state is the second communication control state, the controller 64 proceeds to step S26 shown in FIG. 13. In step S26, the controller 64 determines whether the second period Y2 has elapsed from when the communication control state is switched to the second communication control state. In a case where the second period Y2 has elapsed from when the communication control state is switched to the second communication control state, the controller 64 proceeds to step S23 shown in FIG. 6. In a case where the second period Y2 has not elapsed from when the communication control state is switched to the second communication control state, the controller 64 proceeds to step S24 shown in FIG. 6.

Figure 14:
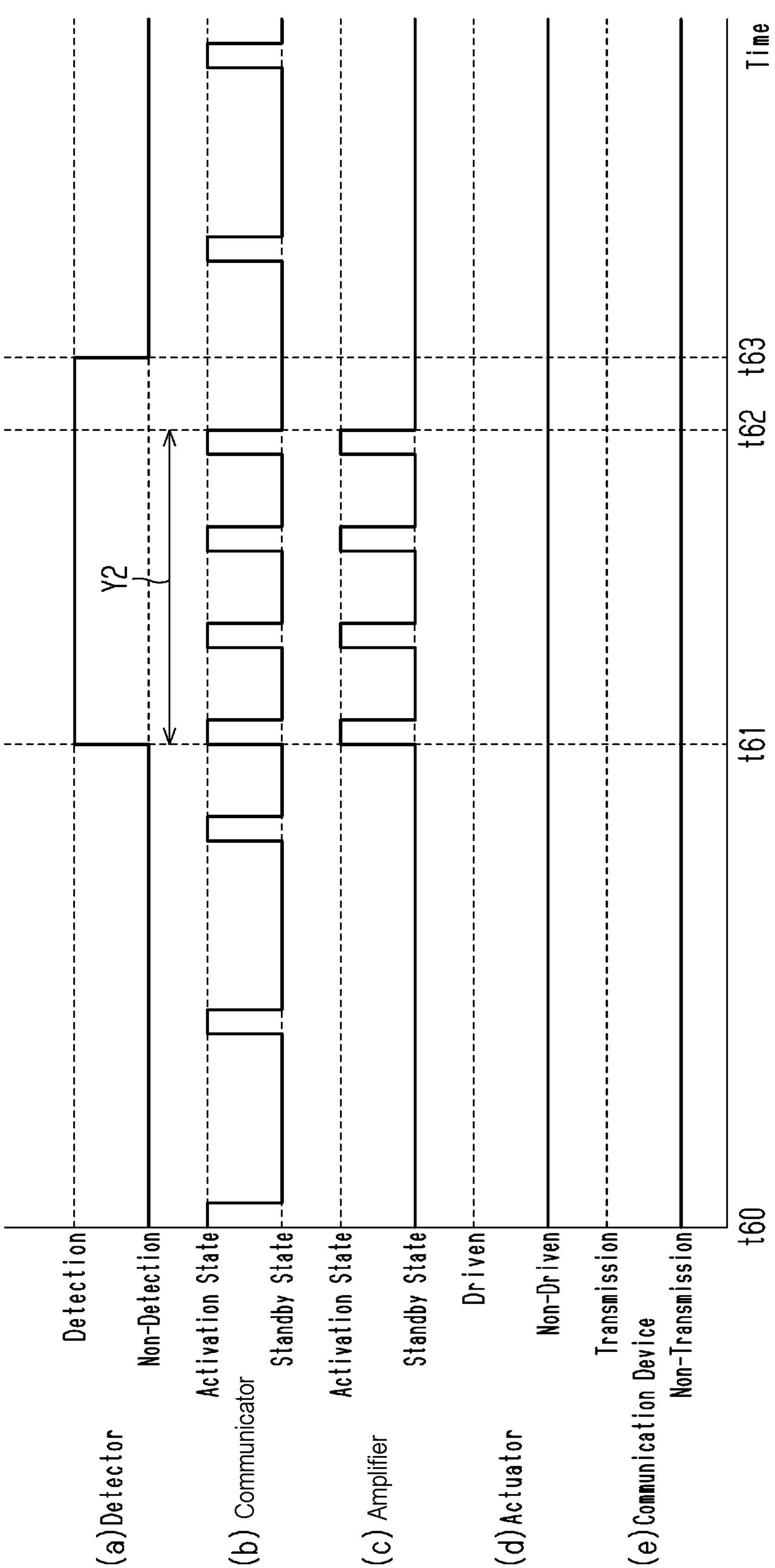
FIG. 14 is a timing chart showing the fourth example of changes in the states of the communicator, the amplifier, and the actuator in the second embodiment.

A fifth example of control of the communicator 62, the amplifier 60, and the actuator 70 executed by the controller 64 will now be described with reference to FIGS. 3 and 14. The control of the controller 64 from time t60 to time t61 is the same as the control in the first example from time t10 to time t11.

At time t62, the second period Y2 has elapsed from time t61. From time t62, the controller 64 controls the communicator 62 so that the communicator 62 intermittently receives the first signal in the first reception cycle R1. From time t62, the controller 64 controls the amplifier 60 so that the amplifier 60 does not amplify the predetermined signal.

At time t63, in a state in which the communication device 54 is in the non-transmission state, the detector 72 is changed from the detection state to the non-detection state. At time t63, for example, detection of an action of the human-powered vehicle 10 by the detector 72 is stopped.

In the present embodiment, the controller 64 switches the communication control state to the first communication control state, for example, in a case where the communicator 62 does not receive the first signal over the second period Y2 from when the communication control state is switched to the second communication control state regardless of whether the rider mounts the human-powered vehicle 10. Thus, for example, in a case where the first signal is less likely to be input, the communication control state is likely to be maintained in the first communication control state.

Third Embodiment

A third embodiment of the human-powered vehicle control system 50 and the human-powered vehicle component 52 will now be described with reference to FIGS. 3, 15, and 16. The third embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

In the present embodiment, for example, the second amplification control state does not include the first intermittent control state and includes only the second intermittent control state In an example, in a case where the amplification control state is one of the first amplification control state and the second amplification control state and the communicator 62 receives the first signal for the first time, the controller 64 switches the amplification control state to the third amplification control state. In an example, in the second amplification control state, the controller 64 controls the amplifier 60 so that the amplifier 60 operates intermittently in the second amplification cycle A2. In the present embodiment, the second amplification control state does not include the second intermittent control state and includes only the first intermittent control state. In the second amplification control state, the controller 64 can be configured to control the amplifier 60 so that the amplifier 60 operates intermittently in the first amplification cycle A1.

Control executed by the controller 64 for switching the amplification control state in the present embodiment will now be described with reference to FIGS. 15 and 16. In an example, in a case where electric power is supplied to the controller 64, the controller 64 starts the process from step S51. In an example, in a case where the process shown in FIGS. 15 and 16 is completed, the controller 64 again starts the process from step S51 after a predetermined period.

In step S51, the controller 64 determines whether the amplification control state is the first amplification control state. In a case where the amplification control state is the first amplification control state, the controller 64 proceeds to step S52. In a case where the amplification control state is not the first amplification control state, the controller 64 proceeds to step S56.

In step S52, the controller 64 determines whether the detector 72 detects an action of the human-powered vehicle 10. In a case where an action of the human-powered vehicle 10 is detected by the detector 72, the controller 64 proceeds to step S53. In a case where an action of the human-powered vehicle 10 is not detected by the detector 72, the controller 64 proceeds to step S54.

Figure 15:
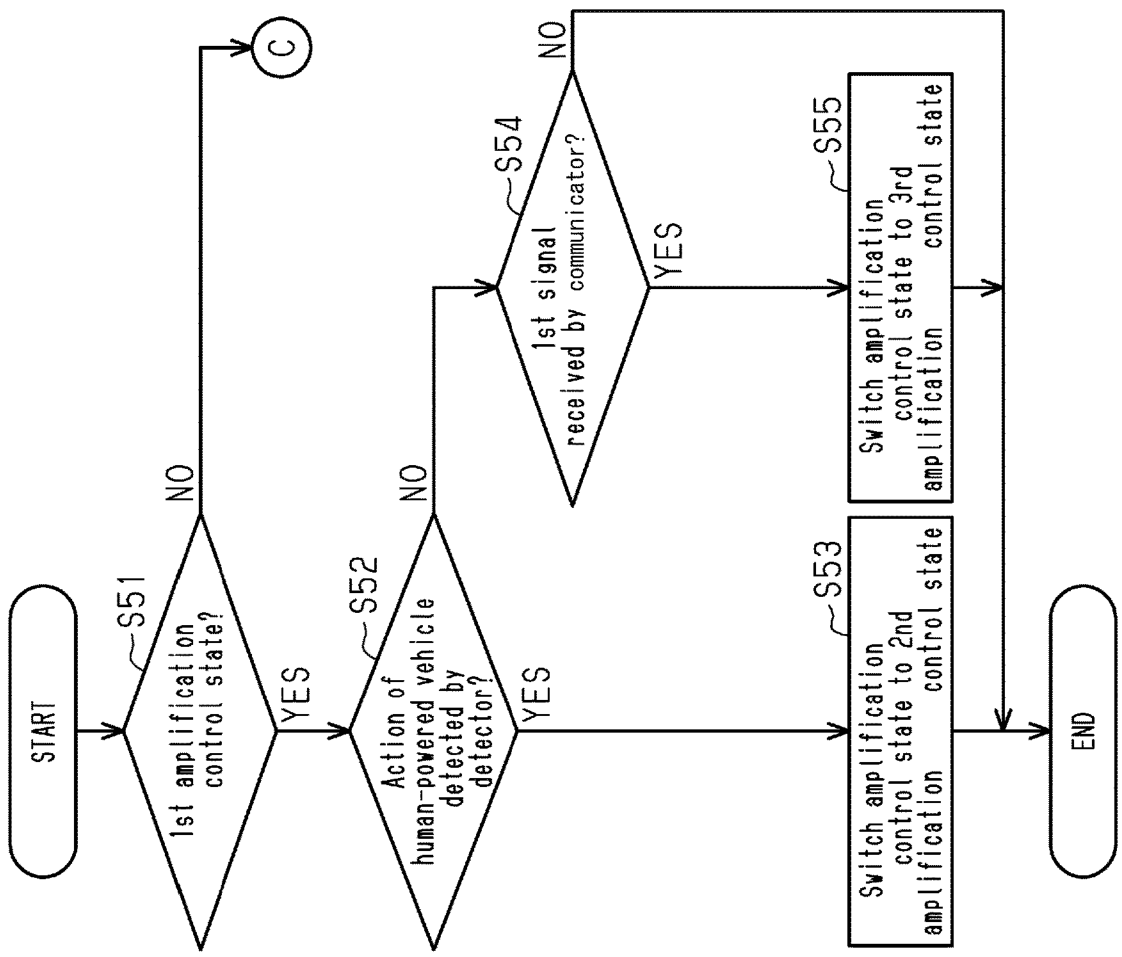
FIG. 15 is a first part of a flowchart of a process for switching the amplification control state executed by an electronic controller in accordance with a third embodiment.

In step S53, the controller 64 switches the amplification control state to the second amplification control state and then ends the process shown in FIGS. 15 and 16.

In step S54, the controller 64 determines whether the first signal is received by the communicator 62. In a case where the first signal is received by the communicator 62, the controller 64 proceeds to step S55. In a case where the first signal is not received by the communicator 62, the controller 64 ends the process shown in FIGS. 15 and 16.

In step S55, the controller 64 switches the amplification control state to the third amplification control state and then ends the process shown in FIGS. 15 and 16.

In step S56, the controller 64 determines whether the amplification control state is the second amplification control state. In a case where the amplification control state is the second amplification control state, the controller 64 proceeds to step S57. In the amplification control state is not the second amplification control state, the controller 64 proceeds to step S59.

In step S57, the controller 64 determines whether the first signal is received by the communicator 62. In a case where the first signal is received by the communicator 62, the controller 64 proceeds to step S58. In a case where the first signal is not received by the communicator 62, the controller 64 proceeds to step S59.

In step S58, the controller 64 switches the amplification control state to the third amplification control state and then ends the process shown in FIGS. 15 and 16.

In step S59, the controller 64 determines whether the detector 72 detects an action of the human-powered vehicle 10. In a case where an action of the human-powered vehicle 10 is detected by the detector 72, the controller 64 ends the process shown in FIGS. 15 and 16. In a case where an action of the human-powered vehicle 10 is not detected by the detector 72, the controller 64 proceeds to step S60.

In step S60, the controller 64 determines whether the second predetermined period X2 has elapsed from when the first signal is finally received by the communicator 62 and an action of the human-powered vehicle 10 is finally detected by the detector 72. In a case where the second predetermined period X2 has elapsed from the final reception of the first signal by the communicator 62 and the final detection of an action of the human-powered vehicle 10 by the detector 72, the controller 64 proceeds to step S61. In a case where the second predetermined period X2 has not elapsed from the final reception of the first signal by the communicator 62 and the final detection of an action of the human-powered vehicle 10 by the detector 72, the controller 64 ends the process shown in FIGS. 15 and 16. In step S60, the controller 64 can be configured to determine only whether the second predetermined period X2 has elapsed from when an action of the human-powered vehicle 10 is finally received by the detector 72 without determining whether the first signal is finally received by the communicator 62.

In step S61, the controller 64 switches the amplification control state to the first amplification control state and then ends the process shown in FIGS. 15 and 16.

In step S62, the controller 64 determines whether the first predetermined period X1 has elapsed from when the first signal is finally received by the communicator 62. In a case where the first predetermined period X1 has elapsed from the final reception of the first signal by the communicator 62, the controller 64 proceeds to step S63. In a case where the first predetermined period X1 has not elapsed from the final reception of the first signal by the communicator 62, the controller 64 ends the process shown in FIGS. 15 and 16.

In step S63, the controller 64 switches the amplification control state to the second amplification control state and then ends the process shown in FIGS. 15 and 16.

Fourth Embodiment

A fourth embodiment of the human-powered vehicle control system 50 and the human-powered vehicle component 52 will now be described with reference to FIGS. 3 and 17. The fourth embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

Control executed by the controller 64 for switching the communication control state in the present embodiment will now be described with reference to FIG. 17. In an example, in a case where electric power is supplied to the controller 64, the controller 64 starts the process from step S71. In an example, in a case where the process shown in FIG. 17 is completed, the controller 64 again starts the process from step S71 after a predetermined period.

In step S71, the controller 64 determines whether the communication control state is the first communication control state. In a case where the communication control state is the first communication control state, the controller 64 proceeds to step S72. In a case where the communication control state is not the first communication control state, the controller 64 ends the process shown in FIG. 17.

In step S72, the controller 64 determines whether the human-powered vehicle 10 is in the use state. In a case where the human-powered vehicle 10 is in the use state, the controller 64 proceeds to step S73. In a case where the human-powered vehicle 10 is not in the use state, the controller 64 ends the process shown in FIG. 17.

In step S73, the controller 64 switches the communication control state to the second communication control state and then proceeds to step S74. In step S74, the controller 64 resets the counter and proceeds to step S75. In step S75, the controller 64 resets a timer and proceeds to step S76. In step S76, the controller 64 starts measuring the time using the timer and proceeds to step S77.

In step S77, the controller 64 determines whether the time measured by the timer is greater than or equal to the second reception cycle R2. In a case where the time measured by the timer is greater than or equal to the second reception cycle R2, the controller 64 proceeds to step S78. In a case where the time measured by the timer is not greater than or equal to the second reception cycle R2, the controller 64 repeats the process of step S77.

In step S78, the controller 64 determines whether the human-powered vehicle 10 is continuously in the use state. In a case where the human-powered vehicle 10 is continuously in the use state, the controller 64 proceeds to step S75. In a case where the human-powered vehicle 10 is not continuously in the use state, the controller 64 proceeds to step S79. In step S79, the controller 64 increments the counter and proceeds to step S80.

In step S80, the controller 64 determines whether the counter has reached a predetermined value. The predetermined value corresponds to, for example, the first period Y1. In a case where the counter has reached the predetermined value, the controller 64 proceeds to step S81. In a case where the counter has not reached the predetermined value, the controller 64 proceeds to step S75.

Figure 17:
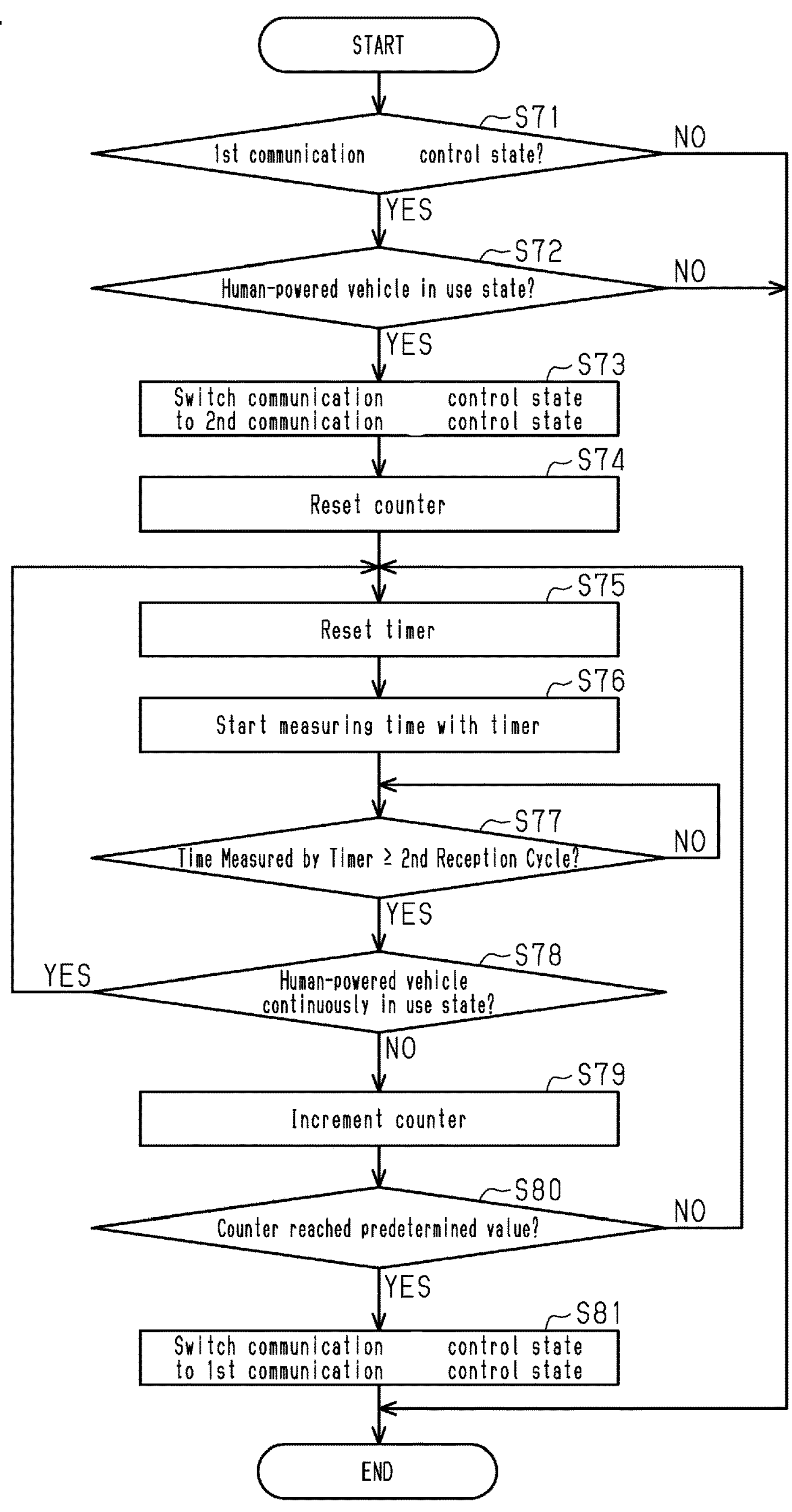
FIG. 17 is a flowchart of a process for switching a communication control state executed by an electronic controller in accordance with a fourth embodiment.

In step S81, the controller 64 switches the communication control state to the first communication control state and then ends the process shown in FIG. 17.

Fifth Embodiment

Figure 18:
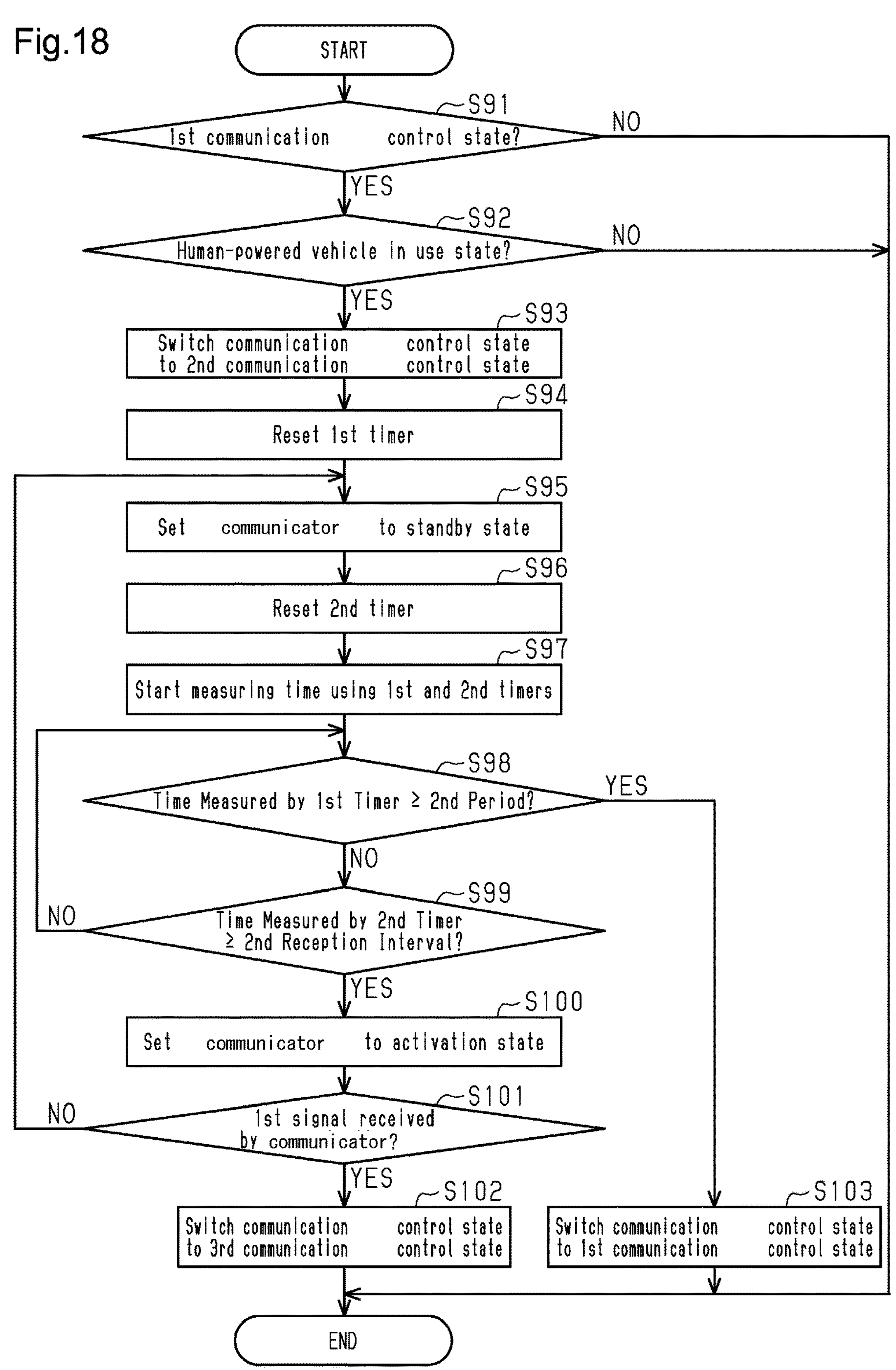
FIG. 18 is a flowchart of a process for switching a communication control state executed by an electronic controller in accordance with a fifth embodiment.

A fifth embodiment of the human-powered vehicle control system 50 and the human-powered vehicle component 52 will now be described with reference to FIGS. 3 and 18. The fifth embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

Control executed by the controller 64 for switching the communication control state in the fifth embodiment will now be described with reference to FIG. 18. In an example, in a case where electric power is supplied to the controller 64, the controller 64 starts the process from step S91. In an example, in a case where the process shown in FIG. 18 is completed, the controller 64 again starts the process from step S91 after a predetermined period.

In step S91, the controller 64 determines whether the communication control state is the first communication control state. In a case where the communication control state is the first communication control state, the controller 64 proceeds to step S92. In a case where the communication control state is not the first communication control state, the controller 64 ends the process shown in FIG. 18.

In step S92, the controller 64 determines whether the human-powered vehicle 10 is in the use state. In a case where the human-powered vehicle 10 is in the use state, the controller 64 proceeds to step S93. In a case where the human-powered vehicle 10 is not in the use state, the controller 64 ends the process shown in FIG. 18.

In step S93, the controller 64 switches the communication control state to the second communication control state and then proceeds to step S94. In step S94, the controller 64 resets a first timer and proceeds to step S95. In step S95, the controller 64 sets the communicator 62 to the standby state and proceeds to step S96. In step S96, the controller 64 resets a second timer and proceeds to step S97. In step S97, the controller 64 starts measuring the time using the first timer and the second timer and proceeds to step S98.

In step S98, the controller 64 determines whether the time measured by the first timer is greater than or equal to the second period Y2. In a case where the time measured by the first timer is not greater than or equal to the second period Y2, the controller 64 proceeds to step S99. In a case where the time measured by the first timer is greater than or equal to the second period Y2, the controller 64 proceeds to step S103.

In step S99, the controller 64 determines whether the time measured by the second timer is greater than or equal to the second reception interval R8. In a case where the time measured by the second timer is greater than or equal to the second reception interval R8, the controller 64 proceeds to step S100. In a case where the time measured by the second timer is not greater than or equal to the second reception interval R8, the controller 64 proceeds to step S98.

In step S100, the controller 64 sets the communicator 62 to the activation state and proceeds to step S101. In step S101, the controller 64 determines whether the first signal is received. In a case where the first signal is received, the controller 64 proceeds to step S102. In a case where the first signal is not received, the controller 64 proceeds to step S95. In step S102, the controller 64 switches the communication control state to the third communication control state and ends the process shown in FIG. 18.

In step S102, the controller 64 switches the communication control state to the first communication control state and then ends the process.

Sixth Embodiment

A sixth embodiment of the human-powered vehicle control system 50 and the human-powered vehicle component 52 will now be described with reference to FIGS. 3 and 19. The sixth embodiment of the human-powered vehicle control system 50 and the human-powered vehicle component 52 is the same as the first embodiment of the human-powered vehicle control system 50 and the human-powered vehicle component 52 except for the control of the amplifier 60 executed by the controller 64. Thus, same reference characters are given to those elements that are the same as the corresponding elements of the first embodiment. Such elements will not be described in detail.

In the present embodiment, the communication control state includes the first communication control state and the second communication control state. In the present embodiment, the communication control state can exclude the third communication control state. In the present embodiment, the power consumption of the communicator 62 in the second communication control state only needs to be greater than the power consumption of the communicator 62 in the first communication control state. The second communication control state of the present embodiment can correspond to the second communication control state or the third communication control state of the first embodiment. In an example, the second communication control state of the present embodiment corresponds to the second communication control state of the first embodiment. The first communication control state of the present embodiment corresponds to the first communication control state of the first embodiment. In an example, the second communication control state of the present embodiment corresponds to the third communication control state of the first embodiment. The first communication control state of the present embodiment corresponds to the first communication control state and the second communication control state of the first embodiment.

In the present embodiment, the amplification control state includes the first amplification control state and the second amplification control state. In the present embodiment, the amplification control state can exclude the third amplification control state. In the present embodiment, the power consumption of the amplifier 60 in the second amplification control state only needs to be greater than the power consumption of the amplifier 60 in the first amplification control state. The second amplification control state of the present embodiment corresponds to the first intermittent control state, the second intermittent control state, or the third amplification control state of the first embodiment. In an example, the second amplification control state of the present embodiment corresponds to the first intermittent control state of the first embodiment, and the first amplification control state of the present embodiment corresponds to the first amplification control state of the first embodiment. In an example, the second amplification control state of the present embodiment corresponds to the second intermittent control state of the first embodiment, and the first amplification control state of the present embodiment corresponds to the first amplification control state or the first intermittent control state of the first embodiment. In an example, the second amplification control state of the present embodiment corresponds to the third amplification control state of the first embodiment, and the first amplification control state of the present embodiment corresponds to the first amplification control state, the first intermittent control state, or the second intermittent control state of the first embodiment.

In the present embodiment, in a case where the communication control state is a predetermined control state, the controller 64 is configured to control the amplifier 60. The predetermined control state of the communication control state is, for example, the second communication control state. In an example, in a case where the communication control state is the second communication control state, the controller 64 is configured to switch the amplification control state from the first amplification control state to the second amplification control state based on at least one of the predetermined signal and the state of the human-powered vehicle 10. In the present embodiment, for example, in a case where the communication control state is the second communication control state and the first signal is received, the controller 64 is configured to switch the amplification control state from the first amplification control state to the second amplification control state.

Figure 19:
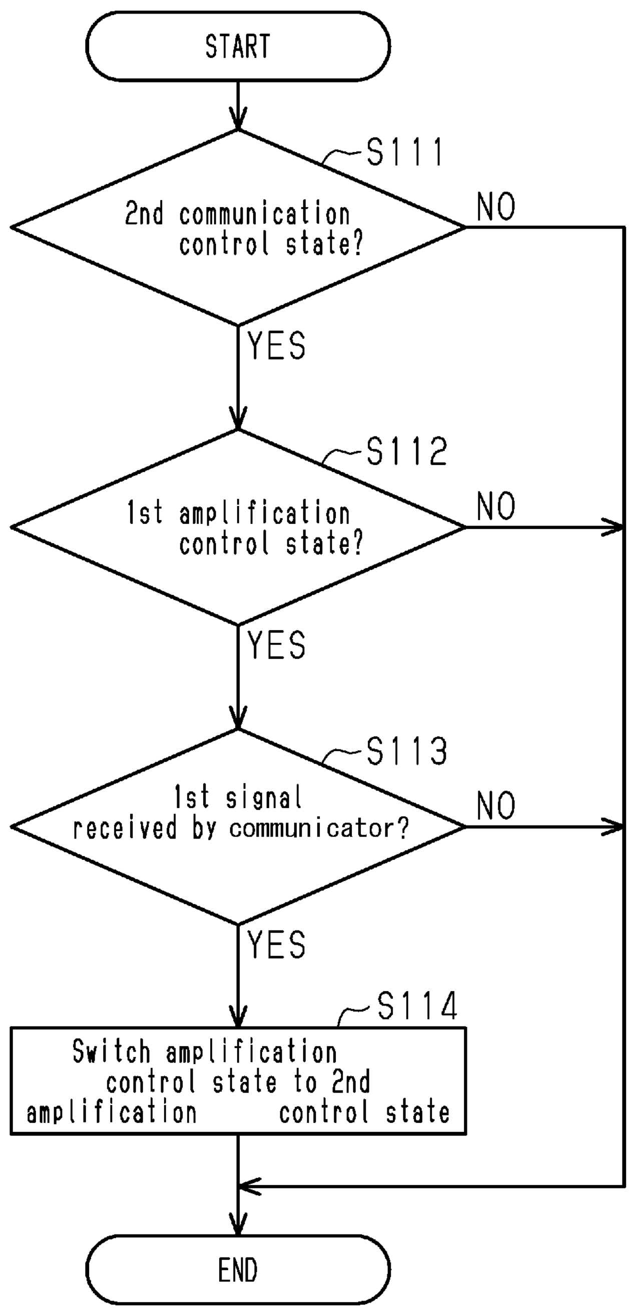
FIG. 19 is a flowchart of a process for switching the amplification control state executed by an electronic controller in accordance with a sixth embodiment.

With reference to FIG. 19, control executed by the controller 64 on the component 52 will now be described. In an example, in a case where electric power is supplied to the controller 64, the controller 64 starts the process from step S111. In an example, in a case where the process shown in FIG. 19 is completed, the controller 64 again starts the process from step S111 after a predetermined period.

In step S111, the controller 64 determines whether the communication control state is the second communication control state. In a case where the communication control state is the second communication control state, the controller 64 proceeds to step S112. In a case where the communication control state is not the second communication control state, the controller 64 ends the process shown in FIG. 19.

In step S112, the controller 64 determines whether the amplification control state is the first amplification control state. In a case where the amplification control state is the first amplification control state, the controller 64 proceeds to step S113. In a case where the amplification control state is not the first amplification control state, the controller 64 ends the process shown in FIG. 19.

In step S113, the controller 64 determines whether the first signal is received by the communicator 62. In a case where the communicator 62 receives the first signal, the controller 64 proceeds to step S114 to switch the amplification control state to the second amplification control state and then ends the process shown in FIG. 19. In a case where the first signal is not received by the communicator 62, the controller 64 ends the process shown in FIG. 19.

In an example, in a case where the communication control state is the second communication control state and an action of the human-powered vehicle 10 is detected, the controller 64 can be configured to switch the amplification control state from the first amplification control state to the second amplification control state. In step S113 shown in FIG. 19, the controller 64 can determine whether the detector 72 detects an action of the human-powered vehicle 10. In a case where an action of the human-powered vehicle 10 is detected by the detector 72, the controller 64 proceeds to step S114. In a case where an action of the human-powered vehicle 10 is not detected by the detector 72, the controller 64 ends the process shown in FIG. 19.

The control for switching the amplification control state from the first amplification control state to the second amplification control state based on at least one of the predetermined signal and the state of the human-powered vehicle 10 in a case where the communication control state is the second communication control state corresponds to, for example, the first example of control at time t14 shown in FIG. 9. In the first example shown in FIG. 9, at time t14, the third communication control state of the first embodiment corresponds to the second communication control state of the present embodiment. The second intermittent control state of the first embodiment corresponds to the first amplification control state of the present embodiment. The third amplification control state of the first embodiment corresponds to the second amplification control state of the present embodiment.

In the present embodiment of the human-powered vehicle control system 50 and the human-powered vehicle component 52, the amplification control state is maintained in the first amplification control state even when the communication control state is the second communication control state. This achieves efficient power consumption of at least the amplifier 60 and allows for reduction in size of the battery 68.

Seventh Embodiment

A seventh embodiment of the human-powered vehicle control system 50 and the human-powered vehicle component 52 will now be described with reference to FIGS. 20 and 21. In the seventh embodiment of the human-powered vehicle control system 50 and the human-powered vehicle component 52, the same reference characters are given to those elements that are the same as the corresponding elements of the first embodiment. Such elements will not be described in detail.

Figure 20:
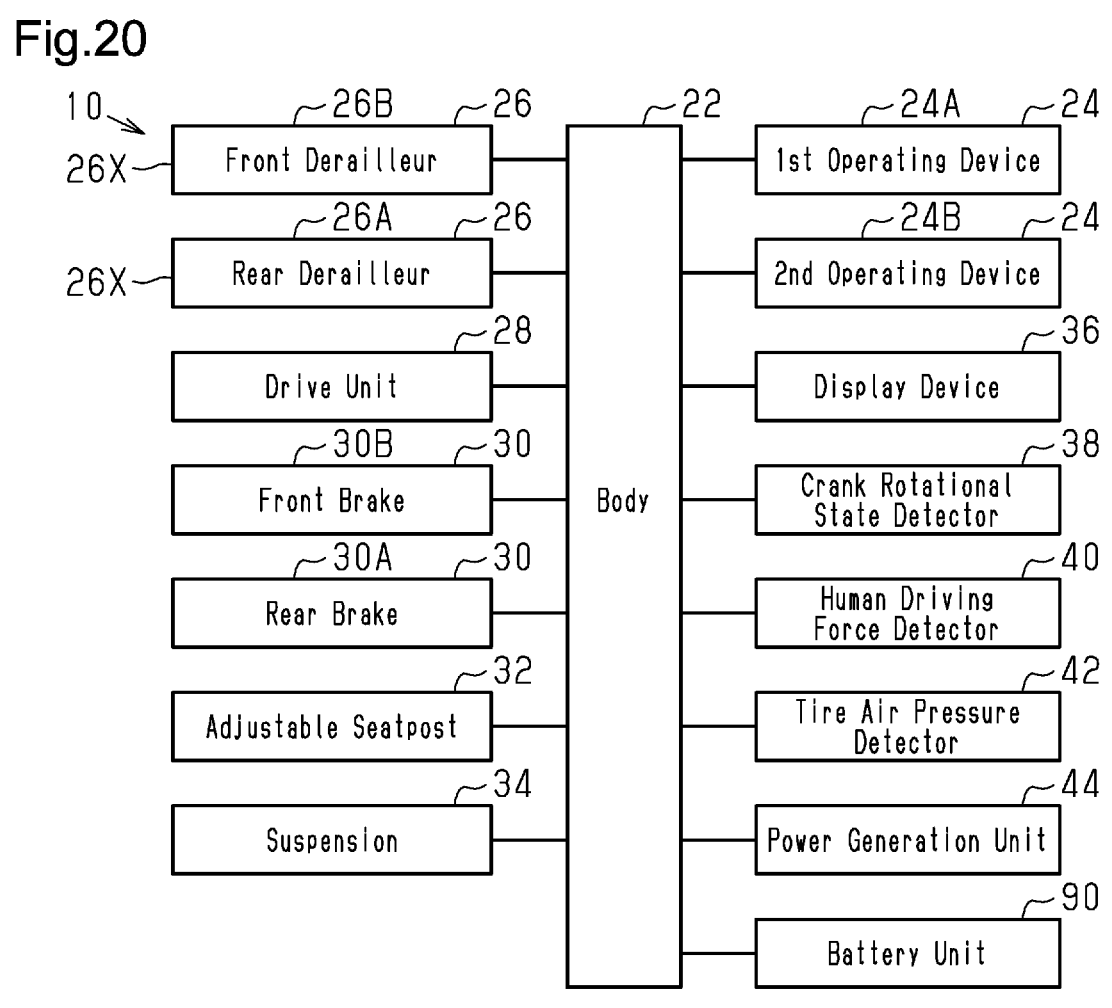

As shown in FIGS. 20 and 21, the human-powered vehicle 10 of the present embodiment includes a battery unit 90. In an example, the battery unit 90 is configured to be attached to the human-powered vehicle 10 separated from the component 52. In the other embodiments, the human-powered vehicle 10 can include the battery unit 90.

In an example, the battery unit 90 supplies electric power to at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. In an example, the battery unit 90 performs power line communication (PLC) with at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42.

In an example, the battery unit 90 includes a battery 90A and a battery housing 90B. In an example, the battery 90A includes a rechargeable battery. In an example, the battery housing 90B accommodates the battery 90A. In an example, the battery housing 90B has the form of a tube in which the battery 90A is accommodated. The battery unit 90 is configured to be removable from the human-powered vehicle 10.

In an example, the battery unit 90 is provided on the body 22 of the human-powered vehicle 10. The battery unit 90 can be attached to the outside of the frame 22F, the handlebar 22H, and the saddle 22S or can be accommodated in the frame 22F, the handlebar 22H, or the saddle 22S. In a case where the battery unit 90 is removed from the human-powered vehicle 10 and connected to a power supply such as a computer terminal or an electric outlet, the battery 90A is charged.

In an example, the human-powered vehicle 10 includes a first additional component 92 differing from the component 52. In an example, the control system 50 includes the first additional component 92. In an example, the first additional component 92 is configured to be attached to the human-powered vehicle 10 separated from the component 52. In an example, the first additional component 92 includes the battery 90A. In an example, the battery 90A is configured to supply electric power to the communicator 62. In a case where, the first additional component 92 includes the battery 90A, the first additional component 92 is the battery unit 90. In the present embodiment, the battery 68 can be omitted from the component 52.

In an example, the first additional component 92 is connected to the component 52 by wire. The component 52 is supplied with electric power from the first additional component 92. In a case where the first additional component 92 is not the battery unit 90, the component 52 can be supplied with electric power from the battery 90A of the battery unit 90 through the first additional component 92.

In an example, the first additional component 92 includes a first additional controller 92A. In an example, the first additional controller 92A includes a predetermined control program and a processor that executes a control process. In an example, the processor includes a CPU or an MPU. The first additional controller 92A can include one or more microcomputers. The first additional controller 92A can include a plurality of processors arranged at separate locations. The first additional controller 92A can include first additional storage. In an example, the first additional storage stores control programs and information used for various control processes. In an example, the first additional storage includes at least one of a nonvolatile memory and a volatile memory. The nonvolatile memory includes, for example, at least one of a ROM, an EPROM, an EEPROM, and a flash memory. The volatile memory includes, for example, a RAM.

The human-powered vehicle 10 includes a second additional component 94 differing from the component 52 and the first additional component 92. In an example, the control system 50 includes the second additional component 94. In an example, the second additional component 94 is configured to be attached to the human-powered vehicle 10 separated from the component 52 and the first additional component 92. In an example, the first additional component 92 is connected to the second additional component 94 by wire. The second additional component 94 is supplied with electric power from the first additional component 92. In an example, the battery unit 90 is configured to supply electric power to the second additional component 94 differing from the component 52.

In an example, the first additional component 92 is configured to communicate with the component 52 and the second additional component 94 using an additional predetermined signal. In an example, the additional predetermined signal includes a third signal, a fourth signal, and a fifth signal. The third signal is transmitted from the component 52 to the first additional component 92. In an example, the third signal includes information related to operation of at least one of the component 52 and the second additional component 94. The third signal can include information related to operation of the first additional component 92. The fourth signal is transmitted from the first additional component 92 to the component 52. The component 52 can actuate the actuator 70 in accordance with the first signal in the same manner as the first embodiment or can actuate the actuator 70 in accordance with the fourth signal. In an example, the first signal includes information related to operation of the component 52. The fifth signal is transmitted from the first additional component 92 to the second additional component 94. In an example, the fifth signal includes information related to operation of the second additional component 94. The second additional component 94 actuates the actuator 70 in accordance with the fifth signal.

In an example, the first additional component 92 includes at least one of the operating device 24, the transmission device 26, the drive unit 28, the brake 30, the adjustable seatpost 32, the suspension 34, the display device 36, the crank rotational state detector 38, the human driving force detector 40, the tire pressure detector 42, and the battery unit 90 that differ from the component 52.

In an example, the second additional component 94 includes at least one of the operating device 24, the transmission device 26, the drive unit 28, the brake 30, the adjustable seatpost 32, the suspension 34, the display device 36, the crank rotational state detector 38, the human driving force detector 40, the tire pressure detector 42, and the battery unit 90 that differ from the component 52 and the first additional component 92. In an example, the present embodiment of the second additional component 94 is configured in the same manner as the first embodiment of the component 52 except that the antenna 58, the amplifier 60, the communicator 62, and the detector 72 are omitted, the controller 64 of the second additional component 94 performs wired communicates with the first additional controller 92A, and the actuator 70 is actuated in accordance with the third signal instead of the first signal.

In the present embodiment, the component 52 includes one of the rear derailleur 26A and the front derailleur 26B. In the present embodiment, the first additional component 92 includes the battery unit 90. In the present embodiment, the second additional component 94 includes the other one of the rear derailleur 26A and the front derailleur 26B. In an example, the present embodiment of the component 52 is configured in the same manner as the first embodiment of the component 52 except that the controller 64 performs wired communication with the first additional controller 92A of the first additional component 92.

In the present embodiment, the control system 50 includes, for example, at least two communication devices 54. In an example, at least two communication devices 54 are configured to transmit the first signal to the component 52. One of the at least two communication devices 54 transmits, for example, a first signal including information related to the component 52 to the component 52. Another one of the at least two communication devices 54 transmits, for example, a first signal including information related to the second additional component 94 to the component 52. In an example, the present embodiment of the communication device 54 is configured in the same manner as the first embodiment of the communication device 54 except that another one of the at least two communication devices 54 transmits the first signal including information related to the second additional component 94 to the component 52.

In the present embodiment of the at least two communication devices 54, only one of the at least two communication devices 54 can be configured to transmit the first signal including information related to the component 52 and the first signal including information related to the second additional component 94 to the component 52. Each of two or more of the at least two communication devices 54 can be configured to transmit the first signal including information related to the component 52 and the first signal including information related to the second additional component 94 to the component 52. Transmission of the first signal including information related to the component 52 and transmission of the first signal including information related to the second additional component 94 to the component 52 can be separately performed by two or more of the at least two communication devices 54.

In an example, the component 52 generates a third signal based on at least one of the first signal including information related to the component 52 and the first signal including information related to the second additional component 94. In an example, the third signal includes information related to the shift stage of at least one of the rear derailleur 26A and the front derailleur 26B.

In an example, the first additional controller 92A generates a fourth signal and a fifth signal based on the third signal. In an example, the fourth signal includes information related to the shift stage of one of the rear derailleur 26A and the front derailleur 26B. In an example, the fifth signal includes information related to the shift stage of the other one of the rear derailleur 26A and the front derailleur 26B. In a case where the component 52 includes one of the rear derailleur 26A and the front derailleur 26B, the shift stage of the one of the rear derailleur 26A and the front derailleur 26B can be changed in accordance with the first signal or the fourth signal. In a case where the second additional component 94 includes the other one of the rear derailleur 26A and the front derailleur 26B, the shift stage of the other one of the rear derailleur 26A and the front derailleur 26B is changed in accordance with the fifth signal.

In a case where the controller 64 of the component 52 receives the first signal from at least two communication devices 54, the controller 64 generates a third signal based on the received first signal and transmits the generated third signal to the first additional controller 92A of the first additional component 92. The first additional controller 92A of the first additional component 92 generates at least one of the fourth signal and the fifth signal based on the received third signal. The first additional controller 92A transmits the fourth signal, generated based on the third signal, to the controller 64 of the component 52 and transmits the fifth signal, generated based on the third signal, to the controller 64 of the second additional component 94. In a case where the first signal does not include information related to the component 52, the first additional controller 92A can omit transmission of the fourth signal to the controller 64 of the component 52. In a case where the first signal does not include information related to the second additional component 94, the first additional controller 92A can omit transmission of the fifth signal to the controller 64 of the second additional component 94.

Eighth Embodiment

An eighth embodiment of the human-powered vehicle control system 50 and the human-powered vehicle component 52 will now be described with reference to FIG. 22. In the eighth embodiment of the human-powered vehicle control system 50 and the human-powered vehicle component 52, the same reference characters are given to those elements that are the same as the corresponding elements of the first and seventh embodiments. Such elements will not be described in detail.

Figure 22:
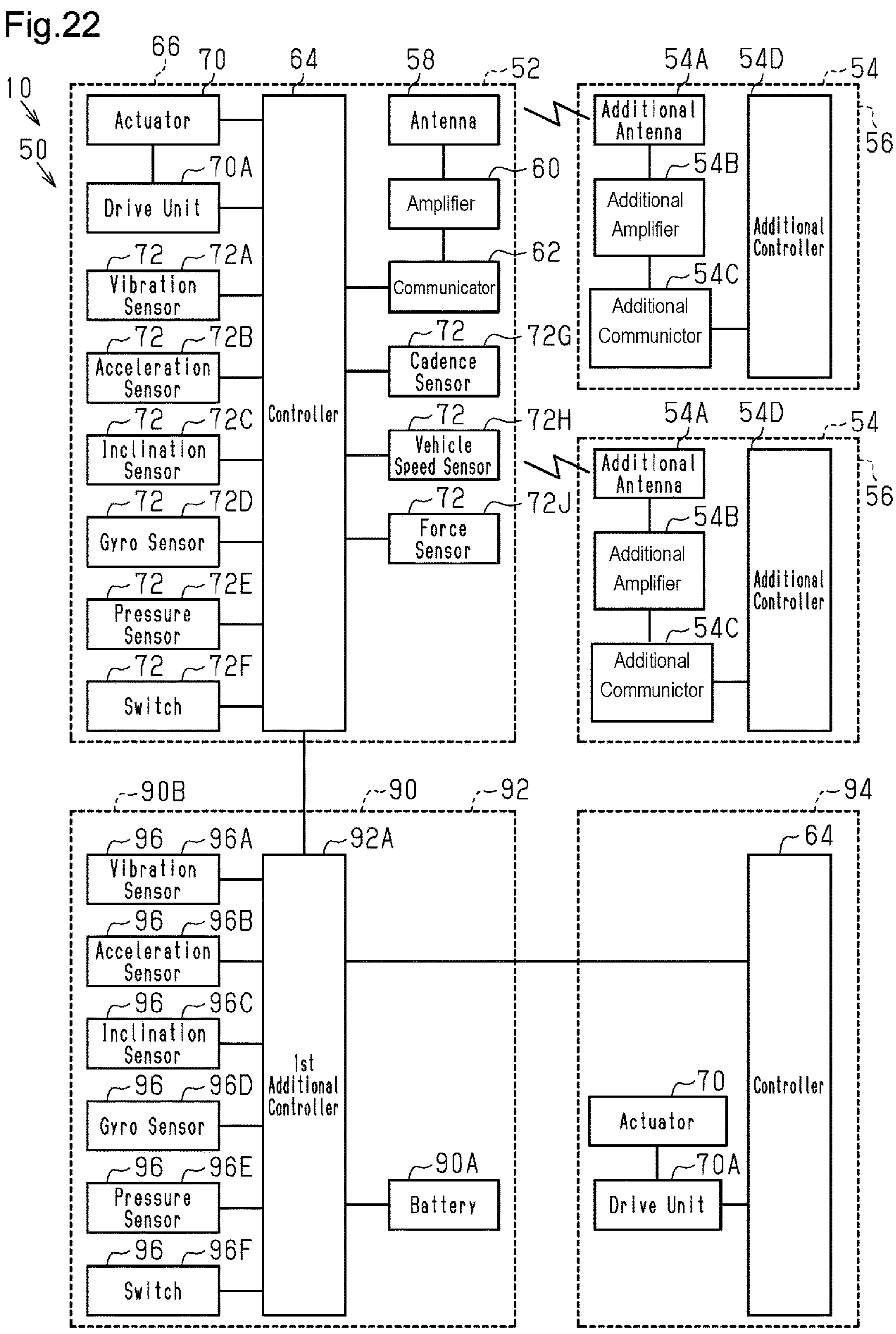
FIG. 22 is a block diagram showing the structure of a human-powered vehicle control system and a human-powered vehicle component in accordance with an eighth embodiment.

As shown in FIG. 22, in the present embodiment, the first additional component 92 includes a detector 96. In an example, the detector 96 is configured to detect the state of the human-powered vehicle 10. In an example, the detector 96 is provided on the battery housing 90B. The detector 96 can be provided outside the battery housing 90B. In an example, the detector 96 is configured to communicate with the first additional controller 92A. In an example, the detector 96 is configured to transmit information related to the human-powered vehicle 10 to the first additional controller 92A.

In an example, the detector 96 is configured to detect a parameter for determining whether a rider is using the human-powered vehicle 10. In an example, the detector 96 is configured to detect a parameter that changes in a case where a rider is using the human-powered vehicle 10.

In an example, the present embodiment of the detector 96 is configured in the same manner as to the detector 72 except that the present embodiment of the detector 96 is provided on the battery housing 90B. In an example, the controller 64 executes control based on the state of the detector 96 in the same manner as the control is executed based on the state of the detector 72. In the present embodiment, the component 52 can exclude the detector 72. In a case where the component 52 excludes the detector 72, the controller 64 can omit execution of the control based on the state of the detector 72.

The detector 96 includes, for example, at least one of a vibration sensor 96A, an acceleration sensor 96B, an inclination sensor 96C, a gyro sensor 96D, a pressure sensor 96E, a switch 96F, a cadence sensor 96G, a vehicle speed sensor 96H, and a force sensor 96J. The vibration sensor 96A is, for example, configured in the same manner as the vibration sensor 72A except that the vibration sensor 96A is provided on the battery housing 90B. The acceleration sensor 96B is, for example, configured in the same manner as the acceleration sensor 72B except that the acceleration sensor 96B is provided on the battery housing 90B. The inclination sensor 96C is, for example, configured in the same manner as the inclination sensor 72C except that the inclination sensor 96C is provided on the battery housing 90B. The gyro sensor 96D is, for example, configured in the same manner as the gyro sensor 72D except that the gyro sensor 96D is provided on the battery housing 90B. The pressure sensor 96E is, for example, configured in the same manner as the pressure sensor 72E except that the pressure sensor 96E is provided on the battery housing 90B. The switch 96F is, for example, configured in the same manner as the switch 72F except that the switch 96F is provided on the battery housing 90B.

The first additional controller 92A, for example, transmits predetermined information to the controller 64 of the component 52. The predetermined information is, for example, transmitted from the first additional controller 92A of the first additional component 92 to the detection result of the detector 96. The first additional controller 92A, for example, generates predetermined information based on a detection result of the detector 96. The predetermined information includes, for example, a detection signal related to the state of the human-powered vehicle 10. In an example, in a case where an action of the human-powered vehicle 10 is detected by the detector 96, the first additional controller 92A transmits a detection signal related to the state of the human-powered vehicle 10 to the controller 64 of the component 52.

The controller 64 of the present embodiment is configured to switch the communication control state, for example, in accordance with predetermined information.

In a case where the predetermined information includes a detection signal related to the state of the human-powered vehicle 10, the controller 64 can be configured to, for example, determine whether the human-powered vehicle 10 is in the use state in accordance with a detection signal that is output from the detector 96 and related to the state of the human-powered vehicle 10. The controller 64 can be configured to switch the amplification control state in accordance with the predetermined information.

In the present embodiment, for example, in a case where the communication control state is one of the first communication control state and the second communication control state, the controller 64 is configured to switch the communication control state to the other one of the first communication control state and the second communication control state in accordance with predetermined information. For example, in the first example of control at time t11 and the fourth example of control at time t52, the controller 64 can switch the communication control state from one of the first communication control state and the second communication control state to the other one of the first communication control state and the second communication control state in accordance with predetermined information.

In an example, in a case where the communication control state is the first communication control state and predetermined information is transmitted from the first additional controller 92A, the controller 64 is configured to switch the communication control state to the second communication control state. In a case where the communication control state is the second communication control state and predetermined information is not transmitted from the first additional controller 92A over the first period Y1, the controller 64 is configured to switch the communication control state to the first communication control state.

Ninth Embodiment

A ninth embodiment of the human-powered vehicle control system 50 and the human-powered vehicle component 52 will now be described with reference to FIG. 23. In the ninth embodiment of the human-powered vehicle control system 50 and the human-powered vehicle component 52, the same reference characters are given to those elements that are the same as the corresponding elements of the first and seventh embodiments. Such elements will not be described in detail.

Figure 23:
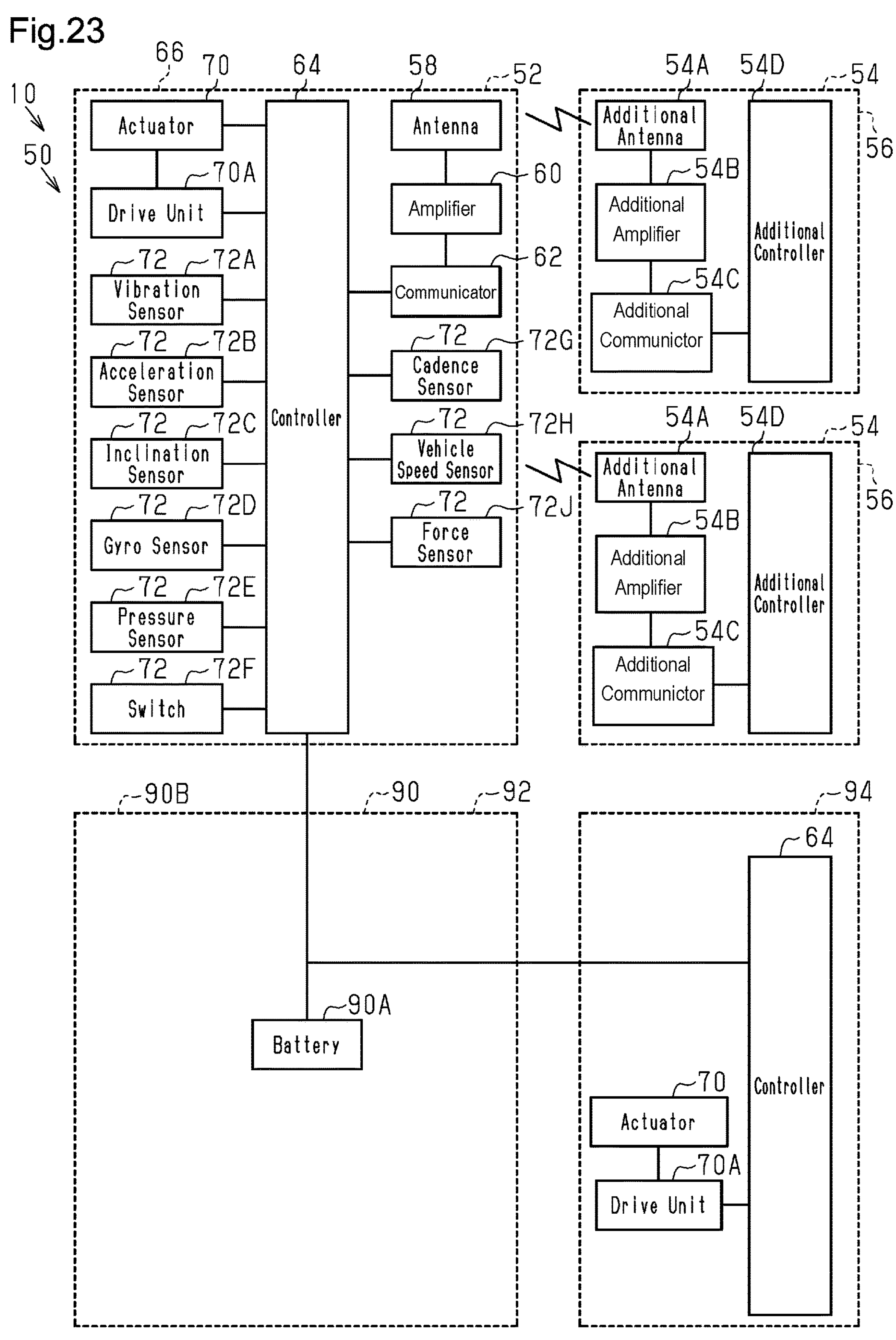
FIG. 23 is a block diagram showing the structure of a human-powered vehicle control system and a human-powered vehicle component in accordance with a ninth embodiment.

As shown in FIG. 23, in the present embodiment, the human-powered vehicle 10 includes a battery 90A. In an example, the battery 90A is configured to supply electric power to the communicator 62. In an example, the battery 90A is configured to supply electric power to the second additional component 94 that is separate from the component 52 and is configured to be attached to the human-powered vehicle 10 separated from the component 52.

The battery 90A is connected to the component 52 and the second additional component 94 by wire. In the present embodiment, the battery 90A can be included in the battery unit 90. In the present embodiment, the battery 90A can be accommodated in the battery housing 90B. In the present embodiment, the battery 90A can be included in the first additional component 92. In the present embodiment, the first additional component 92 does not include the first additional controller 92A.

In the present embodiment, the component 52 is, for example, configured to communicate with the second additional component 94 using an additional predetermined signal. In a case where the controller 64 of the component 52 receives the first signal from at least two communication devices 54, the controller 64 of the component 52, for example, generates a third signal based on the received first signal and transmits the third signal to the controller 64 of the second additional component 94. In the present embodiment, the second additional component 94 actuates the actuator 70, for example, in accordance with the third signal transmitted from the controller 64 of the component 52. In a case where the first signal does not include information related to the second additional component 94, the controller 64 of the component 52 can omit transmission of the third signal to the controller 64 of the second additional component 94.

Tenth Embodiment

A tenth embodiment of the human-powered vehicle control system 50 and the human-powered vehicle component 52 will now be described with reference to FIGS. 1, 24, and 25. In the tenth embodiment of the human-powered vehicle control system 50 and the human-powered vehicle component 52, the same reference characters are given to those elements that are the same as the corresponding elements of the first and eighth embodiments. Such elements will not be described in detail.

Figure 24:
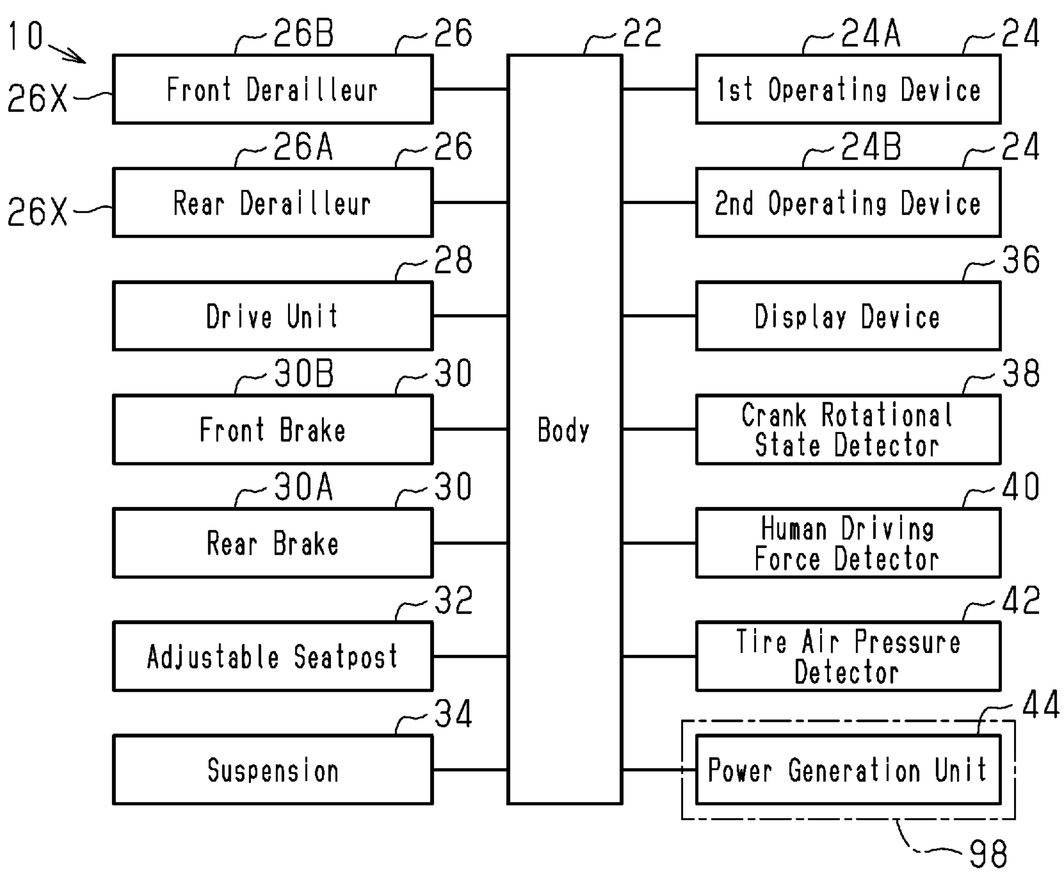
FIG. 24 is a block diagram showing the structure of a human-powered vehicle in accordance with a tenth embodiment.

As shown in FIGS. 1 and 24, the human-powered vehicle 10 of the present embodiment includes a power generator 98. In an example, the power generator 98 is provided on a hub of at least one of the rear wheel 20A and the front wheel 20B. The power generator 98 is, for example, a hub dynamo. The hub dynamo generates electric power in accordance with rotation of the hub shell about the hub axle.

In an example, the power generator 98 supplies electric power to at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. In an example, the power generator 98 performs power line communication (PLC) with at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42.

The power generator 98 includes the power generation unit 44. The power generation unit 44 includes, for example, a magnet provided on at least one of the hub shell and the hub axle and a coil provided on the other one of the hub shell and the hub axle so as to face the magnet. The magnet rotates relative to the coil in accordance with rotation of the hub shell relative to the hub axle. Thus, the power generation unit 44 generates electric power.

As shown in FIG. 25, in an example, the human-powered vehicle 10 includes a first additional component 92 differing from the component 52. The first additional component 92 can be included in the control system 50. The first additional component 92 includes, for example, the power generation unit 44. The power generation unit 44 is, for example, configured to supply electric power to the communicator 62. The power generation unit 44 is, for example, configured to be attached to the human-powered vehicle 10 separated from the component 52.

In the present embodiment, the first additional component 92 is the power generator 98. The first additional component 92 includes the first additional controller 92A. The present embodiment of the first additional controller 92A is configured in the same manner as the eighth embodiment of the first additional controller 92A except that the present embodiment of the first additional controller 92A does not communicate with a second additional controller of the second additional component 94.

In the present embodiment, the detector 96 is provided on the power generator 98. The detector 96 is provided, for example, on at least one of the hub shell and the hub axle. The detector 96 can be accommodated in the hub shell or provided outside the hub shell.

In the present embodiment, the detector 96 is, for example, configured in the same manner as the detector 72 except that the detector 96 is provided on the power generator 98. In the present embodiment, the component 52 can exclude the detector 72.

In the present embodiment, the detector 96 includes, for example, at least one of a vibration sensor 96A, an acceleration sensor 96B, an inclination sensor 96C, a gyro sensor 96D, a pressure sensor 96E, a switch 96F, a cadence sensor 96G, a vehicle speed sensor 96H, and a force sensor 96J. The vibration sensor 96A is, for example, configured in the same manner as the vibration sensor 72A except that the vibration sensor 96A is provided on the power generator 98. The acceleration sensor 96B is, for example, configured in the same manner as the acceleration sensor 72B except that the acceleration sensor 96B is provided on the power generator 98. The inclination sensor 96C is, for example, configured in the same manner as the inclination sensor 72C except that the inclination sensor 96C is provided on the power generator 98. The gyro sensor 96D is, for example, configured in the same manner as the gyro sensor 72D except that the gyro sensor 96D is provided on the power generator 98. The pressure sensor 96E is, for example, configured in the same manner as the pressure sensor 72E except that the pressure sensor 96E is provided on the power generator 98. The switch 96F is, for example, configured in the same manner as the switch 72F except that the switch 96F is provided on the power generator 98. The cadence sensor 96G is, for example, configured in the same manner as the cadence sensor 72G except that the cadence sensor 96G is provided on the power generator 98. The vehicle speed sensor 96H is, for example, configured in the same manner as the vehicle speed sensor 72H except that the vehicle speed sensor 96H is provided on the power generator 98. The force sensor 96J is, for example, configured in the same manner as the force sensor 72J except that the force sensor 96J is provided on the power generator 98.

Eleventh Embodiment

Figure 26:
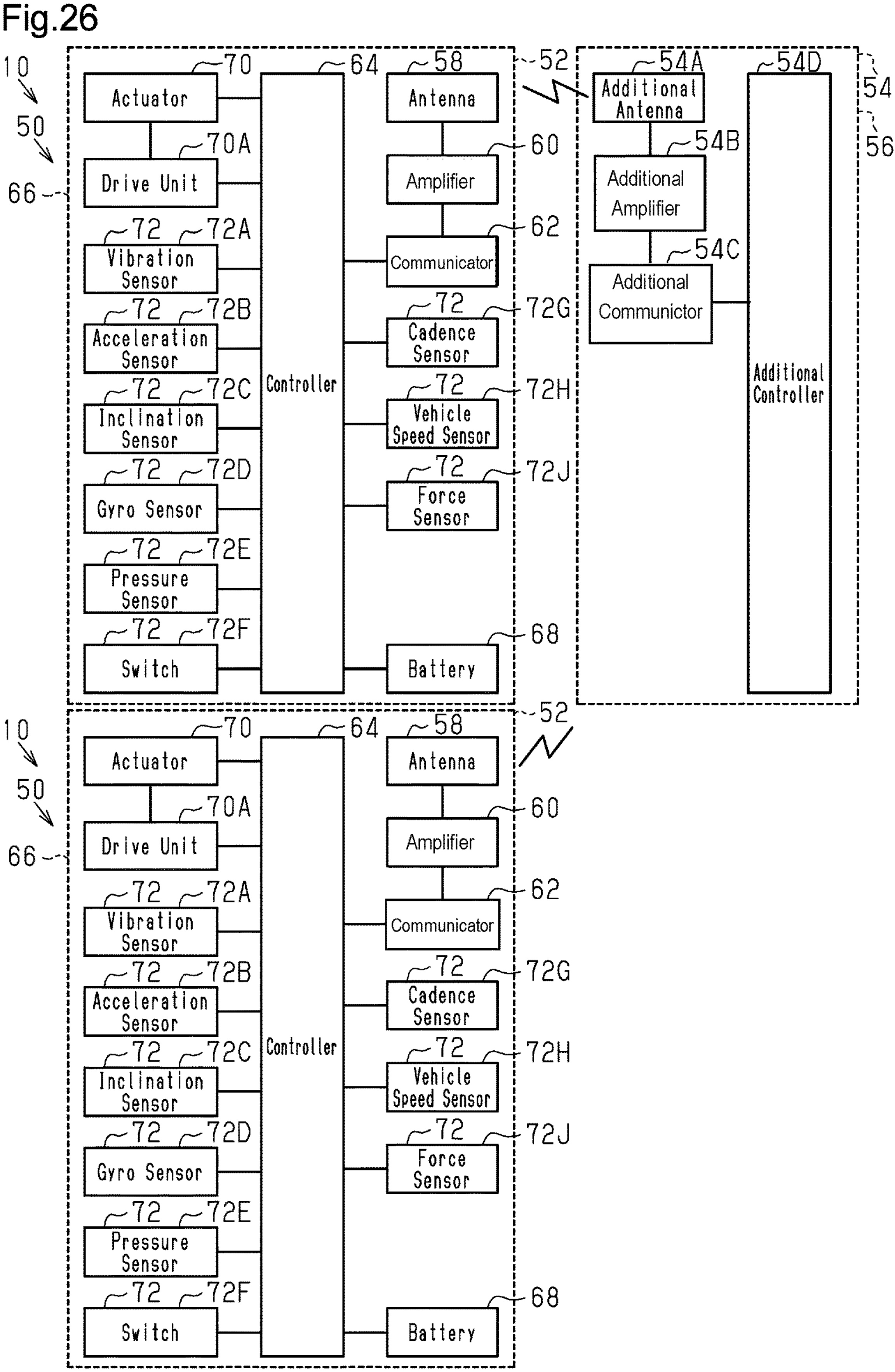
FIG. 26 is a block diagram showing the structure of a human-powered vehicle control system and a human-powered vehicle component in accordance with an eleventh embodiment.

An eleventh embodiment of the human-powered vehicle control system 50 and the human-powered vehicle component 52 will now be described with reference to FIG. 26. The eleventh embodiment of the human-powered vehicle control system 50 and the human-powered vehicle component 52 is the same as the first embodiment of the human-powered vehicle control system 50 and the human-powered vehicle component 52 except that the control system 50 includes a plurality of components 52. Thus, same reference characters are given to those elements that are the same as the corresponding elements of the first embodiment. Such elements will not be described in detail.

In the present embodiment, the control system 50 includes, for example, a plurality of components 52 and at least one communication device 54 differing from the components 52. In an example, the control system 50 includes the components 52 and at least one transmitter 56 differing from the components 52. Each of the components 52 is, for example, the component 52.

Each of the components 52 includes at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42 that differ from the other components 52. In the present embodiment, one of the components 52 includes the rear derailleur 26A. Another one of the components 52 includes the front derailleur 26B.

The communication device 54 of the present embodiment includes the operating device 24. The operating device 24 of the communication device 54 includes, for example, a shifter that operates both the rear derailleur 26A and the front derailleur 26B.

In the present embodiment, the at least one communication device 54 includes, for example, one communication device 54. In the present embodiment, the at least one transmitter 56 includes, for example, one transmitter 56. The one communication device 54 is configured to communicate with each of the components 52. The one transmitter 56 is configured to transmit the first signal to each of the components 52.

In an example, the transmitter 56 is configured to transmit the first signal to each of the components 52 through wireless communication. In an example, in a case the shifter is operated, the transmitter 56 transmits the first signal to at least one of the rear derailleur 26A and the front derailleur 26B. In an example, in a case where the shifter is operated to change the shift stage of the rear derailleur 26A, the transmitter 56 transmits the first signal to at least the rear derailleur 26A. In an example, in a case where the shifter is operated to change the shift stage of the front derailleur 26B, the transmitter 56 transmits the first signal to at least the front derailleur 26B. In the present embodiment, in a case where the shifter is operated, the transmitter 56 can be configured to transmit the first signal to both the rear derailleur 26A and the front derailleur 26B.

Each of the components 52 actuates the actuator 70 in accordance with the first signal. Each component 52 suspends actuation of the actuator 70 in a case where the first signal does not include information corresponding to the component 52. In an example, in a case where the component 52 includes the rear derailleur 26A and the first signal does not include information related to the shift stage of the rear derailleur 26A, the component 52 suspends actuation of the actuator 70.

The controller 64 of each component 52 is configured to switch the communication control state in accordance with the first signal. The controller 64 of each component 52 switches the communication control state in accordance with the first signal even in a case where the first signal does not include information corresponding to the component 52.

The controller 64 of each component 52 is configured to switch the amplification control state in accordance with the first signal. The controller 64 of each component 52 switches the amplification control state in accordance with the first signal even in a case where the first signal does not include information corresponding to the component 52.

Modifications

The description related to the above embodiments exemplifies, without any intention to limit, applicable forms of a human-powered vehicle control system and a human-powered vehicle component according to the present disclosure. The human-powered vehicle control system and the human-powered vehicle component according to the present disclosure can be applied to, for example, modifications of the embodiments that are described below and combinations of at least two of the modifications that do not contradict each other. In the following modifications, same reference characters are given to those elements that are the same as the corresponding elements of the above embodiment. Such elements will not be described in detail.

The component 52 can include the drive unit 28. In a case where the component 52 includes the drive unit 28, the first signal includes, for example, information related to the ratio of a motor driving force to a human driving force. In a case where the component 52 includes the drive unit 28, the drive unit 28 is configured to change the ratio of the motor driving force to the human driving force in accordance with the first signal.

The component 52 can include the brake 30. In a case where the component 52 includes the brake 30, the first signal includes, for example, information related to braking force applied to the human-powered vehicle 10. In a case where the component 52 includes the brake 30, the brake 30 is configured to change braking force applied to the human-powered vehicle 10 in accordance with the first signal.

The component 52 can include the suspension 34. In a case where the component 52 includes the suspension 34, the first signal includes, for example, information related to the allowed amount of relative movement of the first part and the second part. In a case where the component 52 includes the suspension 34, the suspension 34 is configured to change the allowed amount of relative movement of the first part and the second part.

The at least one transmitter 56 can include at least one of the crank rotational state detector 38, the human driving force detector 40, and the tire pressure detector 42. In a case where the at least one transmitter 56 includes the crank rotational state detector 38, the crank rotational state detector 38 is configured to transmit a detection signal to the controller 64 in accordance with rotation of the crank 12. In a case where the at least one transmitter 56 includes the human driving force detector 40, the human driving force detector 40 is configured to transmit a detection signal to the controller 64 in a case where human driving force is input to the human-powered vehicle 10. In a case where the at least one transmitter 56 includes the tire pressure detector 42, the tire pressure detector 42 is configured to transmit a detection signal to the controller 64 in accordance with a change in the air pressure of at least one of the rear wheel 20A and the front wheel 20B.

The battery 68 can be provided on a human-powered vehicle component differing from the component 52. The battery 68 can be provided on the body 22.

In a case where the communicator 62 receives the first signal, the controller 64 can be configured to actuate the actuator 70 in accordance with the first signal instead of actuating the actuator 70 to perform the predetermined operation. At time t13 shown in FIG. 9, the controller 64 can control the actuator 70 in accordance with the first signal.

The second reception cycle R2 can be equal to the first reception cycle R1, and the second reception period R7 can be longer than the first reception period R3. In a case where the second reception cycle R2 is equal to the first reception cycle R1 and the second reception period R7 is longer than the first reception period R3, the power consumption of the communicator 62 in the second communication control state is greater than the power consumption of the communicator 62 in the first communication control state. In a case where the second reception period R7 is shorter than the first reception period R3, the period for which the communicator 62 is in the activation state is shorter in the second communication control state than in the first communication control state. Thus, the power consumption of the communicator 62 in the second communication control state is greater than the power consumption of the communicator 62 in the first communication control state.

The second amplification cycle A2 can be equal to the first amplification cycle A1, and the second amplification period A7 can be longer than the first amplification period A3. In a case where the second amplification cycle A2 is equal to the first amplification cycle A1 and the second amplification period A7 is longer than the first amplification period A3, the power consumption of the amplifier 60 in the second intermittent control state is greater than the power consumption of the amplifier 60 in the first intermittent control state. In a case where the second amplification period A7 is shorter than the first amplification period A3, the period for which the amplifier 60 is in the activation state is shorter in the second intermittent control state than in the first intermittent control state.

In a case where a reception sensitivity of the communicator 62 in the first low sensitivity period R5 is lower than a reception sensitivity of the communicator 62 in the first reception period R3, the communicator 62 does not have to be in the standby state during the first low sensitivity period R5. The controller 64 can decrease a reception rate of the communicator 62 in the first low sensitivity period R5 as compared to a reception rate of the communicator 62 in the first reception period R3. The decrease of the reception rate of the communicator 62 in the first low sensitivity period R5 as compared to the reception rate of the communicator 62 in the first reception period R3 results in a decrease in the reception sensitivity of the communicator 62 in the first low sensitivity period R5 as compared to the reception sensitivity of the communicator 62 in the first reception period R3. In a case where the reception sensitivity of the communicator 62 in the second low sensitivity period R9 is lower than the reception sensitivity of the communicator 62 in the second reception period R7, the communicator 62 does not have to be in the standby state during the second low sensitivity period R9. The controller 64 can be configured to decrease a reception rate of the communicator 62 in the second low sensitivity period R9 as compared to a reception rate of the communicator 62 in the second reception period R7. In a case where the reception sensitivity of the communicator 62 in the first low sensitivity period R5 is lower than the reception sensitivity of the communicator 62 in the first reception period R3, the reception sensitivity of the communicator 62 in the second low sensitivity period R9 becomes lower than the reception sensitivity of the communicator 62 in the second reception period R7. The communicator 62 includes, for example, a first receiver and a second receiver provided at a position differing from the first receiver. In an example, the controller 64 controls the communicator 62 so that the first receiver and the second receiver both receive the first signal in the first reception period R3 and the second reception period R7. In an example, the controller 64 controls the communicator 62 so that only one of the first receiver and the second receiver receives the first signal in the first low sensitivity period R5 and the second low sensitivity period R9. In the first low sensitivity period R5, the other one of the first receiver and the second receiver does not receive the first signal. Thus, the reception rate of the communicator 62 in the first low sensitivity period R5 is decreased as compared to the reception rate of the communicator 62 in the first reception period R3. In the second low sensitivity period R9, the other one of the first receiver and the second receiver does not receive the first signal. Thus, the reception rate of the communicator 62 in the second low sensitivity period R9 is decreased as compared to the reception rate of the communicator 62 in the second reception period R7.

In a case where the predetermined signal is amplified in intensity at a lower degree in the first low amplification period A5 than in the first amplification period A3, the amplifier 60 does not have to be in the standby state during the first low amplification period A5. The controller 64 can decrease the amplification degree of the amplifier 60 in the first low amplification period A5 as compared to the amplification degree of the amplifier 60 in the first amplification period A3. The decrease in the amplification degree of the amplifier 60 in the first low amplification period A5 as compared to the amplification degree of the amplifier 60 in the first amplification period A3 causes the amplifier 60 to amplify the predetermined signal in intensity in the first low amplification period A5 at a degree lower than an amplification degree of the predetermined signal in the first amplification period A3. In a case where the predetermined signal is amplified in intensity at a lower degree in the second low amplification period A9 than in the second amplification period A7, the amplifier 60 does not have to be in the standby state during the second low amplification period A9. The controller 64 can decrease the amplification degree of the amplifier 60 in the second low amplification period A9 as compared to that in the second amplification period A7. The decrease in the amplification degree of the amplifier 60 in the second low amplification period A9 as compared to that in the second amplification period A7 causes the amplifier 60 to amplify the predetermined signal in intensity in the second low amplification period A9 at a degree lower than an amplification degree of the predetermined signal in the second amplification period A7.

The controller 64 can be configured to increase the amplification degree of the amplifier 60 in the second amplification control state as compared to that in the first amplification control state. The increase in the amplification degree of the amplifier 60 in the second amplification control state as compared to that in the first amplification control state results in an increase in the power consumption of the amplifier 60 in the second amplification control state as compared to the power consumption of the amplifier 60 in the first amplification control state. The controller 64 can be configured to increase the amplification degree of the amplifier 60 in the third amplification control state as compared to that in the second amplification control state. The increase in the amplification degree of the amplifier 60 in the third amplification control state as compared to that in the second amplification control state results in an increase in the power consumption of the amplifier 60 in the third amplification control state as compared to the power consumption of the amplifier 60 in the second amplification control state.

In the third amplification control state, the controller 64 can be configured to control the amplifier 60 so that the amplifier 60 operates intermittently. In an example, in the second amplification control state, the controller 64 is configured to control the amplifier 60 so that the amplifier 60 performs an intermittent amplification in the first amplification cycle A1. In the third amplification control state, the controller 64 is configured to control the amplifier 60 so that the amplifier 60 performs an intermittent amplification in the second amplification cycle A2.

In a case where the amplification control state is the second amplification control state, the controller 64 can be configured to switch the amplification control state to the third amplification control state in accordance with the state of the human-powered vehicle 10. The controller 64 can be configured to switch the amplification control state from the second amplification control state to the third amplification control state in a case where the human-powered vehicle 10 starts traveling regardless of whether or not the first signal is input.

In a case where the amplification control state is the first amplification control state, the controller 64 can be configured to switch the amplification control state to the second amplification control state in accordance with the state of the communicator 62. In a case where the amplification control state is the first amplification control state, the controller 64 can be configured to switch the amplification control state to the first intermittent control state in accordance with the state of the communicator 62. The state of the communicator 62 includes, for example, the communication control state. In an example, in a case where the controller 64 switches the communication control state from the first communication control state to the second communication control state, the controller 64 is configured to switch the amplification control state from the first amplification control state to the second amplification control state. In an example, in a case where the controller 64 switches the communication control state from the first communication control state to the second communication control state, the controller 64 is configured to switch the amplification control state from the first amplification control state to the first intermittent control state. In an example, the controller 64 can be configured to control so that the communicator 62 and the amplifier 60 simultaneously enter the activation state.

In a case where the amplification control state is the second amplification control state, the controller 64 can be configured to switch the amplification control state to the third amplification control state in accordance with the state of the communicator 62. In an example, in a case where the controller 64 switches the communication control state from the second communication control state to the third communication control state, the controller 64 is configured to switch the amplification control state from the second amplification control state to the third amplification control state.

Figure 27:
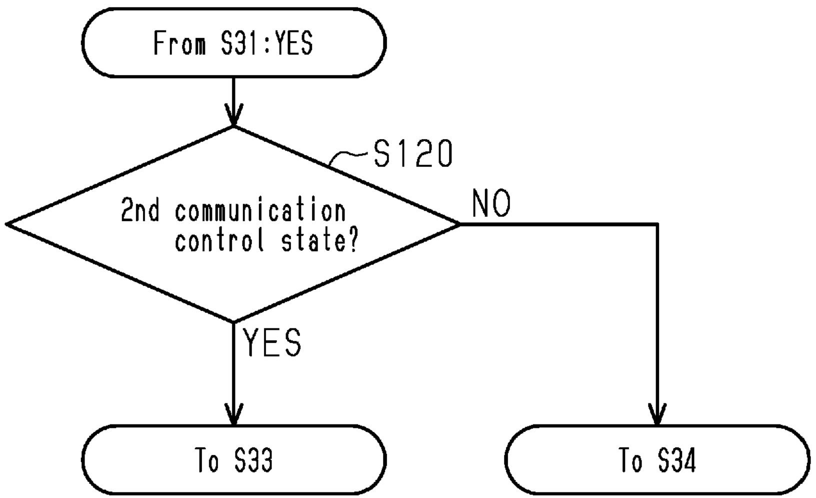
FIG. 27 is a flowchart of a process for switching the amplification control state executed by a first modification of an electronic controller.

The controller 64 can be configured to control the amplifier 60 in accordance with the state of the communicator 62. In an example, in a case where the communicator 62 is in the activation state, the controller 64 is configured so that the amplifier 60 is in the activation state. In an example, the first amplification period A3 is equal to the first reception period R3. In an example, the second amplification period A7 is equal to the second reception period R7. In an example, in a case where the amplification control state is the first amplification control state, the controller 64 is configured to switch the amplification control state to the first intermittent control state in accordance with the state of the communicator 62. In an example, in a case where the communication control state is the second communication control state, the controller 64 is configured to switch the amplification control state from the first amplification control state to the second amplification control state based on at least one of the predetermined signal and the state of the human-powered vehicle 10. In an example, in a case where the communication control state is the second communication control state, the controller 64 is configured to switch the amplification control state from the first amplification control state to the first intermittent control state based on at least one of the predetermined signal and the state of the human-powered vehicle 10. In an example, in step S31 shown in FIG. 7, in a case where the amplification control state is the first amplification control state, the controller 64 proceeds to step S120 shown in FIG. 27. In step S120, the controller 64 determines whether the communication control state is the second communication control state. In a case where the communication control state is the second communication control state, the controller 64 proceeds to step S33 shown in FIG. 7. In a case where the communication control state is not the second communication control state, the controller 64 proceeds to step S34 shown in FIG. 7.

Figure 28:
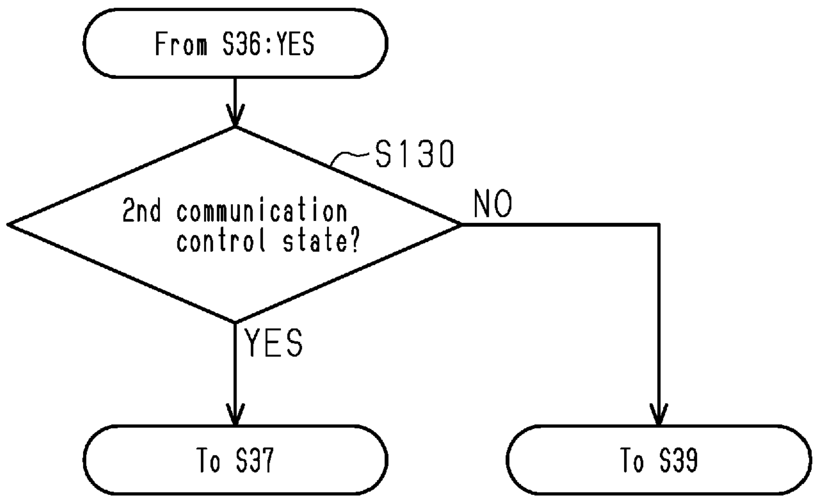
FIG. 28 is a flowchart of a process for switching the amplification control state executed by a second modification of an electronic controller.

In a case where the communication control state is the second communication control state, the controller 64 can be configured to switch the amplification control state from the second amplification control state to the third amplification control state based on at least one of the predetermined signal and the state of the human-powered vehicle 10. In an example, the second amplification control state corresponds to a state in which the amplifier 60 performs an intermittent amplification in the first amplification cycle A1. The third amplification control state corresponds to a state in which the amplifier 60 performs intermittent amplification in the second amplification cycle A2. In an example, in step S36 shown in FIG. 7, in a case where the amplification control state is the first intermittent control state, the controller 64 proceeds to step S130 shown in FIG. 28. In step S130, the controller 64 determines whether the communication control state is the second communication control state. In a case where the communication control state is the second communication control state, the controller 64 proceeds to step S37 shown in FIG. 7. In a case where the communication control state is not the second communication control state, the controller 64 proceeds to step S39 shown in FIG. 7.

The communication control state and the amplification control state can be switched independently from each other. In a case where the communication control state is the first communication control state, the controller 64 can be configured to switch the amplification control state from one of the first amplification control state, the second amplification control state, and the third amplification control state to another one. In a case where the communication control state is the second communication control state, the controller 64 can be configured to switch the amplification control state from one of the first amplification control state, the second amplification control state, and the third amplification control state to another one. In a case where the communication control state is the third communication control state, the controller 64 can be configured to switch the amplification control state from one of the first amplification control state, the second amplification control state, and the third amplification control state to another one.

Figure 29:
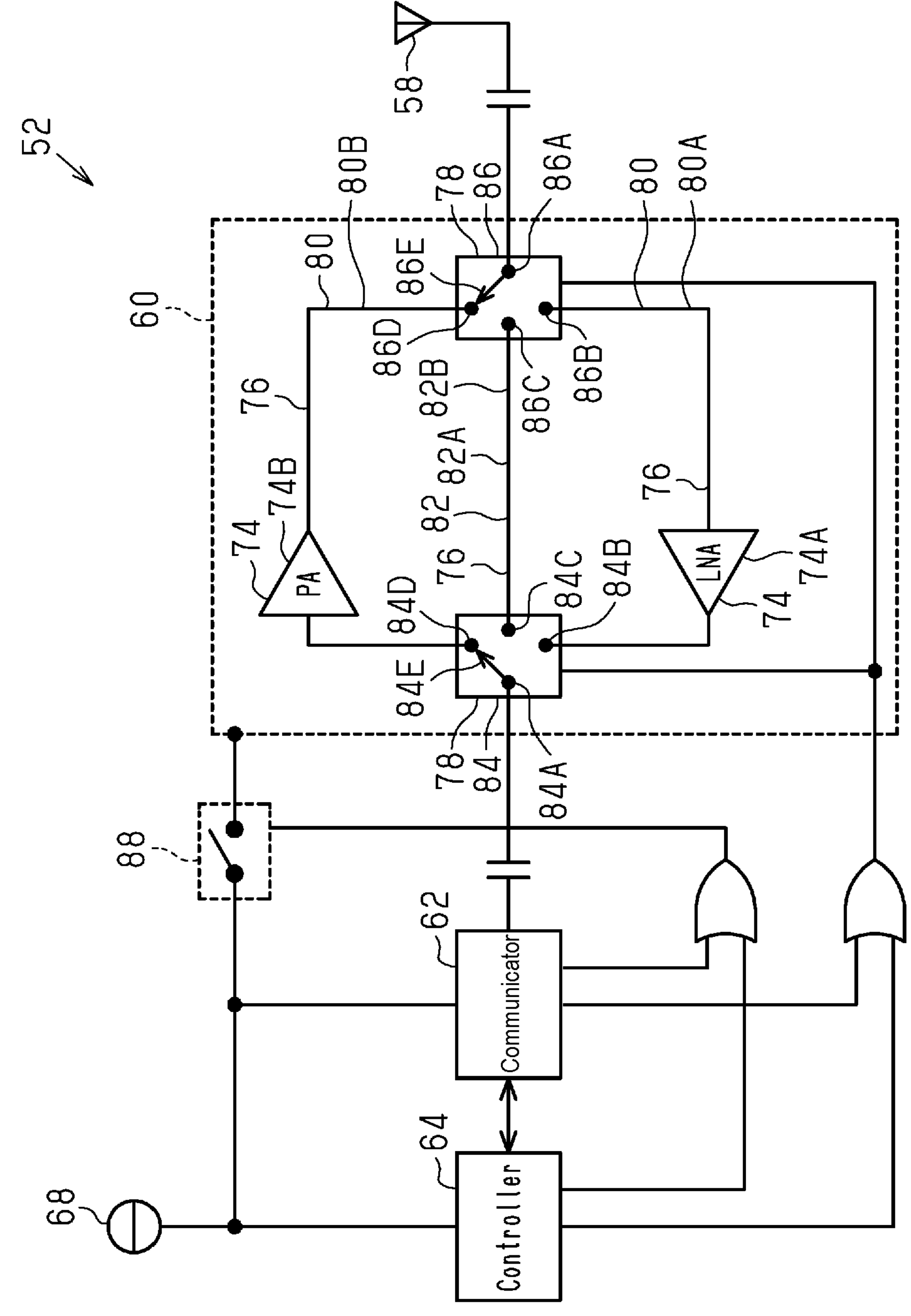
FIG. 29 is a block diagram showing the electric configuration of a third modification of a human-powered vehicle component.

The component 52 can further include an additional switch 88. As shown in FIG. 29, the additional switch 88 is configured to electrically disconnect the battery 68 from the amplifier 60. In an example, the additional switch 88 is electrically connected to at least one of the communicator 62 and the controller 64. The additional switch 88 is configured to electrically disconnect the battery 68 from the amplifier 60 in accordance with a signal of one of the communicator 62 and the controller 64. In a case where the additional switch 88 electrically disconnect the battery 68 from the amplifier 60, the amplifier 60 can be configured to enter sleep mode.

In an example of the changes shown in FIG. 9, in a case where the third predetermined period X3 has elapsed from completion of actuation of the actuator 70 at time t16 and the detector 72 is in the non-detection state, the controller 64 can control the communicator 62 so that the first signal is intermittently received in the second reception cycle R2.

In an example of the changes shown in FIG. 9, in a case where the third predetermined period X3 has elapsed from completion of actuation of the actuator 70 at time t16, the controller 64 can be configured to control the communicator 62 so that the first signal is intermittently received in the first reception cycle R1 or the second reception cycle R2 regardless of the state of the detector 72.

In an example of the changes shown in FIG. 9, time t17 can be the point in time at which the first predetermined period X1 has elapsed from time t16. In an example, the first predetermined period X1 has elapsed from completion of actuation of the actuator 70 that was started at time t15, the controller 64 controls the amplifier 60 so that the predetermined signal is intermittently amplified in the second amplification cycle A2.

Figure 11:
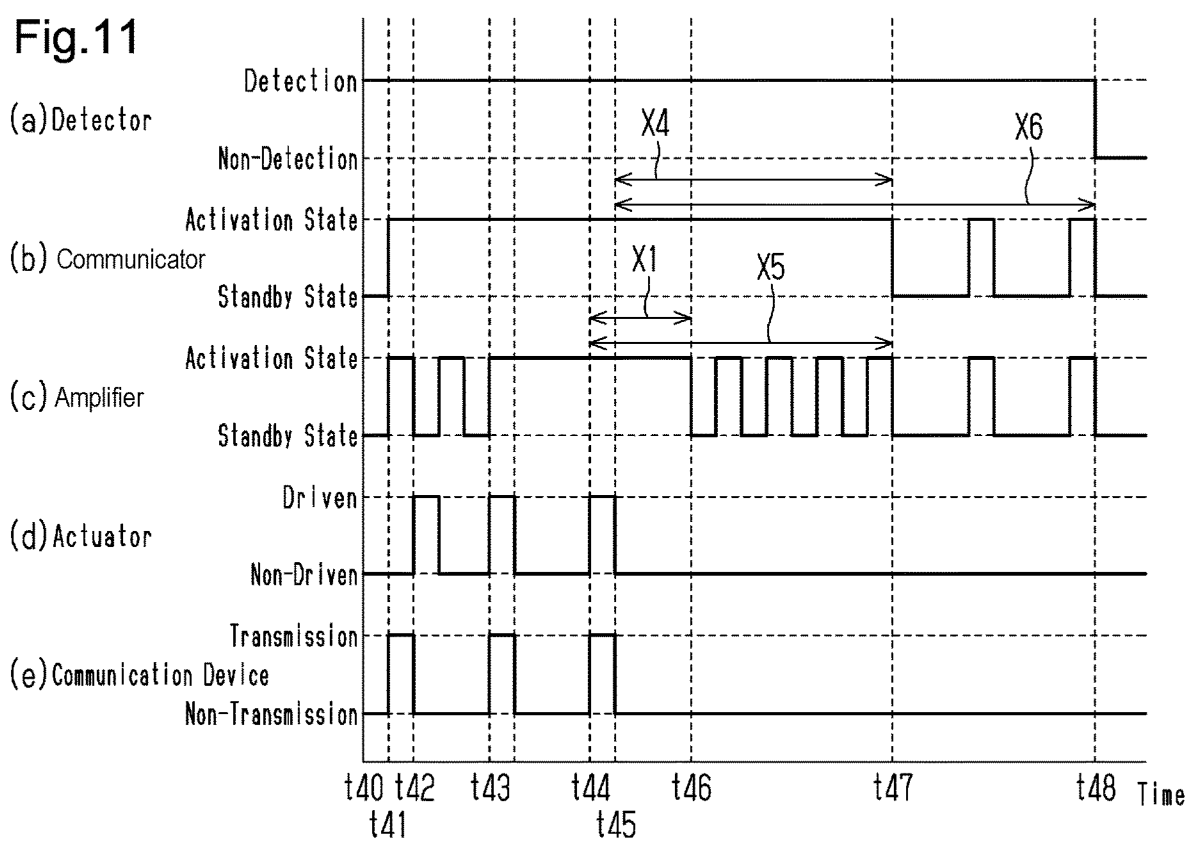
FIG. 11 is a timing chart showing a third example of changes in the states of the communicator, the amplifier, and the actuator shown in FIG. 3.

In an example of the changes shown in FIG. 11, time t47 can be the point in time at which the fifth predetermined period X5 has elapsed from time t45. For example, in a case where the fifth predetermined period X5 has elapsed from completion of actuation of the actuator 70 that was started at time t44, the controller 64 switches the amplification control state from the second intermittent control state to the first intermittent control state.

Figure 30:
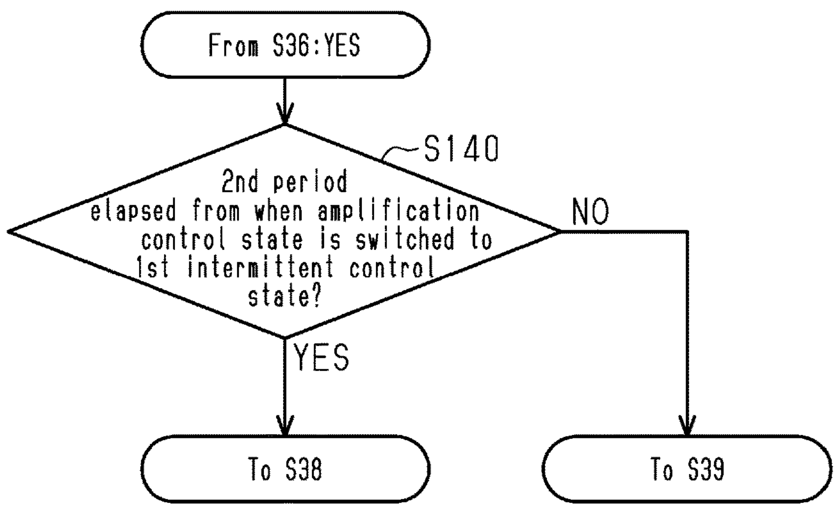
FIG. 30 is a flowchart of a process for switching the amplification control state executed by a fourth modification of an electronic controller.

As shown in FIG. 30, in the second embodiment, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state. In an example, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state as the second period Y2 elapses regardless of the state of the human-powered vehicle 10. In an example, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state as the second period Y2 elapses even if the human-powered vehicle 10 is operated. Control executed by the controller 64 for switching the amplification control state in this modification will now be described with reference to FIGS. 7 and 30. In this modification, in step S36 shown in FIG. 7, in a case where the amplification control state is the first intermittent control state, the controller 64 proceeds to step S140 shown in FIG. 30. In step S140, the controller 64 determines whether the second period Y2 has elapsed from when the amplification control state is switched to the first intermittent control state. In a case where the second period Y2 has elapsed from when the amplification control state is switched to the first intermittent control state, the controller 64 proceeds to step S38 shown in FIG. 7. In a case where the second period Y2 has not elapsed from when the amplification control state is switched to the first intermittent control state, the controller 64 proceeds to step S39 shown in FIG. 7. The second period Y2 of the present modification can be the same as or differ from the second period Y2 of the second embodiment.

Figure 31:
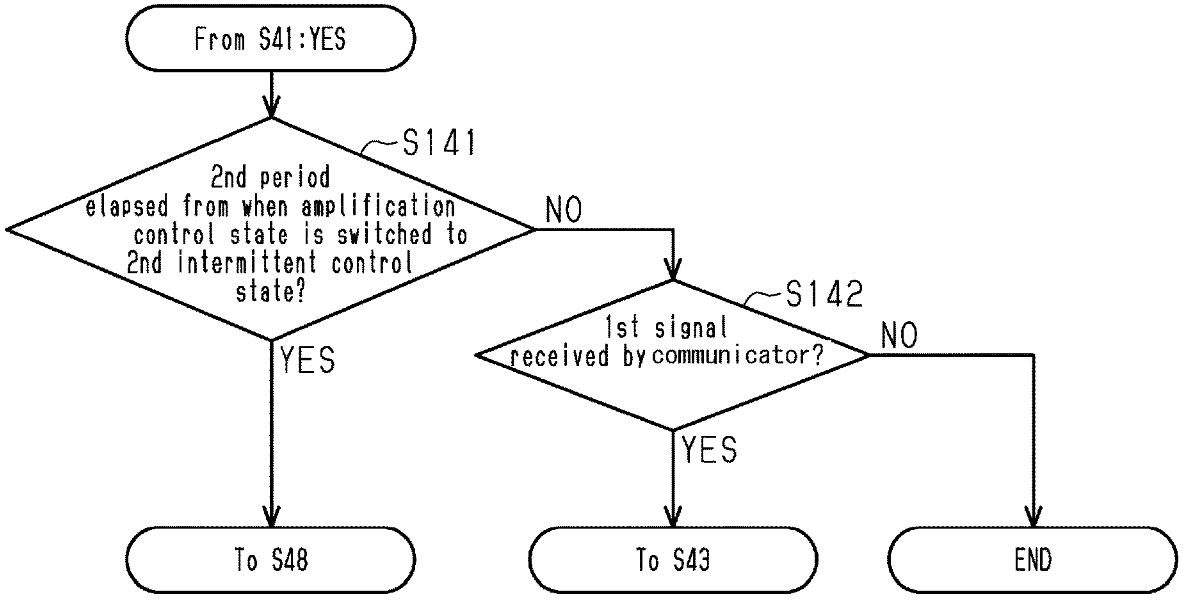
FIG. 31 is a flowchart of a process for switching the amplification control state executed by a fifth modification of an electronic controller.

As shown in FIG. 31, in the second embodiment, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state. In an example, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state as the second period Y2 elapses regardless of the state of the human-powered vehicle 10. In an example, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state as the second period Y2 elapses even if the human-powered vehicle 10 is operated. Control executed by the controller 64 for switching the amplification control state in the present embodiment will now be described with reference to FIGS. 8 and 31. In this modification, in step S41 shown in FIG. 8, in a case where the amplification control state is the second intermittent control state, the controller 64 proceeds to step S141 shown in FIG. 31. In step S141, the controller 64 determines whether the second period Y2 has elapsed from when the amplification control state is switched to the second intermittent control state. In a case where the second period Y2 has elapsed from when the amplification control state is switched to the second intermittent control state, the controller 64 proceeds to step S48 shown in FIG. 8. In a case where the second period Y2 has not elapsed from when the amplification control state is switched to the second intermittent control state, the controller 64 proceeds to step S142. In step S142, the controller 64 determines whether the first signal is received by the communicator 62. In a case where the first signal is received by the communicator 62, the controller 64 proceeds to step S43 shown in FIG. 8. In a case where the first signal is not received by the communicator 62, the controller 64 ends the process shown in FIGS. 7, 8, and 31. The second period Y2 of the present modification can be the same as or differ from the second period Y2 of the second embodiment.

The controller 64 can be configured to determine the state of the human-powered vehicle 10 from a method that differs from a detection signal related to the state of the human-powered vehicle 10 output from the detector 72. In an example, the controller 64 determines the state of the human-powered vehicle 10 based on the state of the power generation unit 44. In an example, the controller 64 can be configured to determine whether the human-powered vehicle 10 is in the use state based on whether the power generation unit 44 is generating electric power. In an example, in a case where the power generation unit 44 is generating electric power, the controller 64 determines that the human-powered vehicle 10 is in the use state.

As long as the component 52 includes the communicator 62 and the controller 64, other structures can be omitted.

As long as the component 52 includes the antenna 58, the amplifier 60, and the communicator 62, other structures can be omitted.

In the sixth embodiment, the human-powered vehicle 10 can include the first additional component 92. The first additional component 92 includes any one of the battery unit 90 of the eighth embodiment and the power generator 98 of the tenth embodiment. In the sixth embodiment, the first additional component 92 can include the detector 96. For example, the controller 64 can determine an action of the human-powered vehicle 10 based on predetermined information transmitted from the first additional controller 92A of the first additional component 92.

In the seventh to ninth embodiments, the control system 50 can be configured to include only one communication device 54. In this modification, the one communication device 54 can be configured to transmit a first signal including both information related to the component 52 and information related to the second additional component 94 to the component 52.

In the seventh to ninth embodiments, the control state of at least one of the first additional component 92 and the second additional component 94 can be switched between a first control state and a second control state. In an example, in the second control state, the power consumption is greater than the power consumption in the first control state. In the second control state, for example, the actuator 70 can be actuated. In an example, in a case where the component 52 transmits a third signal to the first additional component 92, at least one of the first additional component 92 and the second additional component 94 switches the control state from the first control state to the second control state. In an example, in a case where the component 52 does not transmit a third signal to the first additional component 92 over a predetermined period or longer, at least one of the first additional component 92 and the second additional component 94 switches the control state from the second control state to the first control state.

In the eighth or tenth embodiment, the predetermined information can include information related to the communication control state of the component 52. The information related to the communication control state of the component 52, for example, specifies the communication control state of the component 52. In a case where the predetermined information includes information related to the communication control state of the component 52, the controller 64 can switch the communication control state to the specified communication control state based on the predetermined information. In a case where the predetermined information includes information related to the communication control state of the component 52, the first additional controller 92A can execute the process shown in FIGS. 5 and 6, which is executed by the controller 64 for controlling the component 52. In this modification, the first additional controller 92A determines whether the human-powered vehicle 10 is in the predetermined state or the use state in accordance with a detection signal related to the state of the human-powered vehicle 10 output from the detector 96. In this modification, the first additional controller 92A determines whether the communication device 54 is in the transmission state or the non-transmission state in accordance with the third signal.

In the eighth or tenth embodiment, the predetermined information can include information related to the amplification control state of the component 52. The information related to the amplification control state of the component 52, for example, specifies the amplification control state of the component 52. In a case where the predetermined information includes information related to the amplification control state of the component 52, the controller 64 can switch the amplification control state to the specified amplification control state based on the predetermined information. In a case where the predetermined information includes information related to the amplification control state of the component 52, the first additional controller 92A can execute the process shown in FIGS. 7 and 8, which is executed by the controller 64 for switching the amplification control state. In this modification, the first additional controller 92A determines whether the human-powered vehicle 10 is in the predetermined state in accordance with a detection signal related to the state of the human-powered vehicle 10 output from the detector 96. In this modification, the first additional controller 92A determines whether the communication device 54 is in the transmission state or the non-transmission state in accordance with the third signal.

In the eighth embodiment, the detector 96 can include, for example, at least one of the cadence sensor 96G, the vehicle speed sensor 96H, and the force sensor 96J instead of or in addition to at least one of the vibration sensor 96A, the acceleration sensor 96B, the inclination sensor 96C, the gyro sensor 96D, the pressure sensor 96E, and the switch 96F. In this modification, for example, the battery unit 90 can be provided near at least one of the crank 12, the front sprocket 14, the chain 16, the rear sprocket 18, the rear wheel 20A, and the front wheel 20B so that the detector 96 detects movement of at least one of the front sprocket 14, the chain 16, the rear sprocket 18, the rear wheel 20A, and the front wheel 20B.

In the tenth embodiment, the detector 96 can be omitted from the power generator 98.

In the eleventh embodiment, the controller 64 of each component 52 can suspend the switching of the communication control state in accordance with the first signal in a case where the first signal does not include information corresponding to the component 52.

In the eleventh embodiment, the controller 64 of each component 52 can suspend the switching of the amplification control state in accordance with the first signal in a case where the first signal does not include information corresponding to the component 52.

In the first to tenth embodiments and the modifications, the control system 50 can include a plurality of components 52 and at least one transmitter 56 differing from the components 52 as in the eleventh embodiment.

Figure 32:
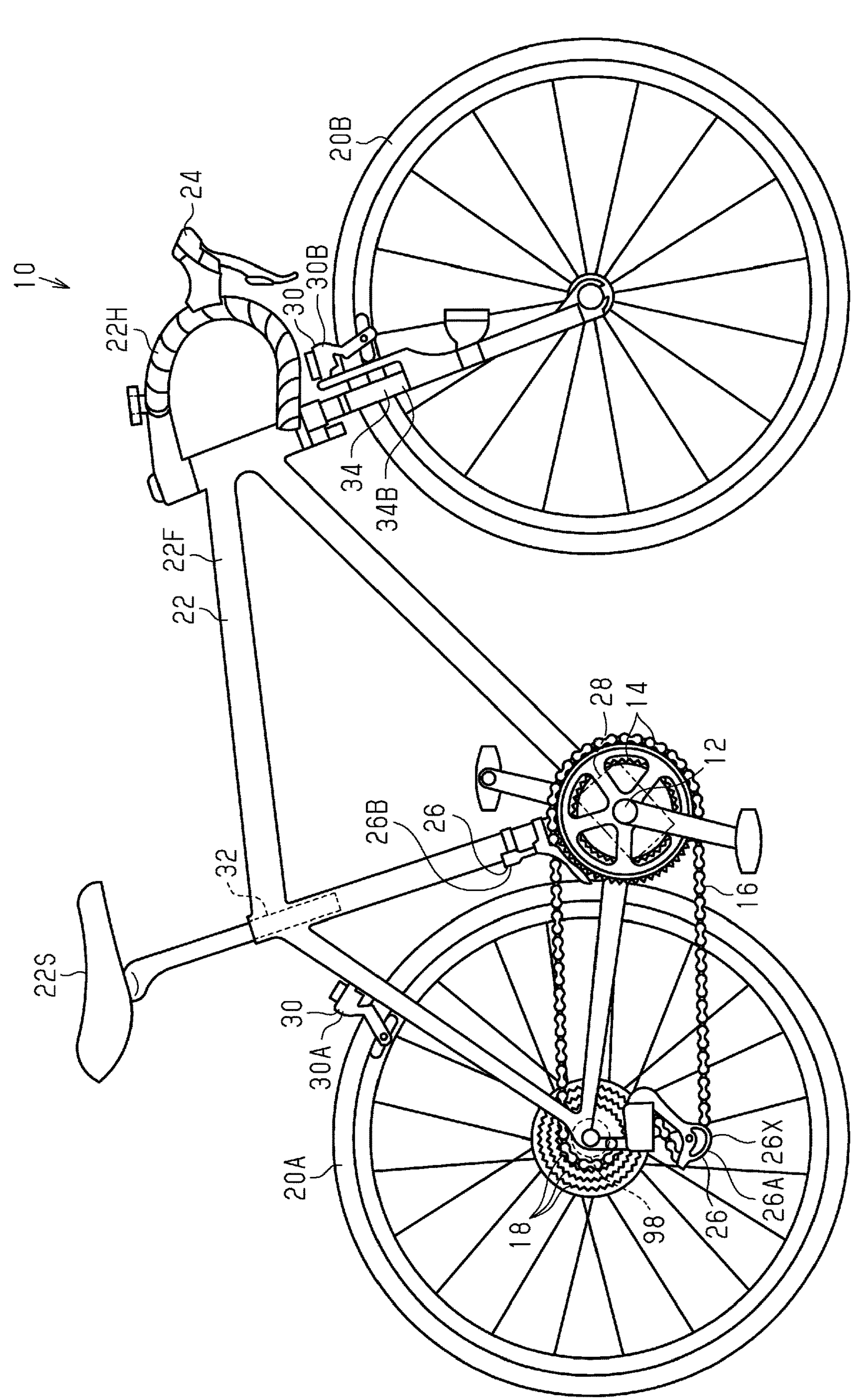
FIG. 32 is a side elevational view of a human-powered vehicle including a sixth modification of a control system for a human-powered vehicle and a component for a human-powered vehicle.

The structure of the human-powered vehicle 10 is not limited to the example shown in FIG. 1. In an example, the human-powered vehicle 10 can have the structure shown in FIG. 32. The human-powered vehicle 10 shown in FIG. 32 is an example of a road bike. In FIG. 32, the same reference characters are given to those elements that are the same as the corresponding elements of the embodiments.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A component for a human-powered vehicle, the component comprising:

a communicator configured to receive a first signal transmitted from at least one transmitter that is separate from the component; and an electronic controller configured to control the communicator in accordance with a communication control state, wherein:

the communication control state includes a first communication control state, a second communication control state in which power consumption of the communicator is greater than power consumption of the communicator in the first communication control state, and a third communication control state in which power consumption of the communicator is greater than the power consumption of the communicator in the second communication control state;

the electronic controller is configured to switch the communication control state to the third communication control state in accordance with the first signal in a case where the communication control state is the second communication control state;

the electronic controller is configured to control the communicator in the first communication control state so that a reception cycle of the communicator is a first reception cycle;

the electronic controller is configured to control the communicator in the second communication control state so that a reception cycle of the communicator is a second reception cycle that is shorter than the first reception cycle;

the first reception cycle includes a first reception period;

the second reception cycle includes a second reception period;

the electronic controller is configured to control the communicator so that the communicator receives the first signal in the first reception period; and the electronic controller is configured to control the communicator so that the communicator receives the first signal in the second reception period.

2. The component according to claim 1, wherein:

the first reception cycle further includes a first reception interval from the first reception period to a following first reception period; and the second reception cycle further includes a second reception interval from the second reception period to a following second reception period.

3. The component according to claim 2, wherein the first reception interval is longer than the second reception interval.

4. A component for a human-powered vehicle, the component comprising:

a communicator configured to receive a first signal transmitted from at least one transmitter that is separate from the component; and an electronic controller configured to control the communicator in accordance with a communication control state, wherein:

the communication control state includes a first communication control state, a second communication control state in which power consumption of the communicator is greater than power consumption of the communicator in the first communication control state, and a third communication control state in which power consumption of the communicator is greater than the power consumption of the communicator in the second communication control state;

the electronic controller is configured to switch the communication control state to the third communication control state in accordance with the first signal in a case where the communication control state is the second communication control state;

the electronic controller is configured to control the communicator in the first communication control state so that a reception cycle of the communicator is a first reception cycle;

the electronic controller is configured to control the communicator in the second communication control state so that a reception cycle of the communicator is a second reception cycle;

the first reception cycle includes a first reception period and a first reception interval from the first reception period to a following first reception period;

the second reception cycle includes a second reception period and a second reception interval from the second reception period to a following second reception period;

the second reception interval is shorter than the first reception interval;

the electronic controller is configured to control the communicator so that the communicator receives the first signal in the first reception period; and the electronic controller is configured to control the communicator so that the communicator receives the first signal in the second reception period.

5. The component according to claim 3, wherein:

the first reception interval includes a first low sensitivity period; and the electronic controller is configured to control the communicator so that a reception sensitivity of the communicator in the first low sensitivity period is lower than a reception sensitivity in the first reception period.

6. The component according to claim 5, wherein:

the first low sensitivity period includes a first non-reception period; and the electronic controller is configured to control the communicator so that the communicator does not receive the first signal in the first non-reception period.

7. The component according to claim 3, wherein:

the second reception interval includes a second low sensitivity period; and the electronic controller is configured to control the communicator so that a reception sensitivity of the communicator in the second low sensitivity period is lower than a reception sensitivity of the communicator in the second reception period.

8. The component according to claim 7, wherein:

the second low sensitivity period includes a second non-reception period; and the electronic controller is configured to control the communicator so that the communicator does not receive the first signal in the second non-reception period.

9. The component according to claim 1, wherein the electronic controller is configured to switch the communication control state to the third communication control state in accordance with the first signal in a case where the communication control state is the first communication control state.

10. The component according to claim 1, wherein the electronic controller is configured to control the communicator so that the first reception period becomes equal to the second reception period.

11. The component according to claim 1, wherein the electronic controller is configured to control the communicator in the third communication control state so that the communicator continuously receives the first signal.

12. The component according to claim 1, further comprising:

an actuator, the electronic controller being configured to control the actuator in accordance with the first signal in a case where the communicator receives the first signal in a case where the communication control state is the third communication control state.

13. The component according to claim 1, wherein the electronic controller is configured to switch the communication control state to the other one of the first communication control state and the second communication control state in accordance with a state of the human-powered vehicle in a case where the communication control state is one of the first communication control state and the second communication control state.

14. The component according to claim 1, wherein the electronic controller is configured to switch the communication control state to the first communication control state in a case where the communication control state is the second communication control state, and where the communicator does not receive the first signal and the human-powered vehicle is continuously maintained in a predetermined state over a first period or longer.

15. The component according to claim 1, wherein the electronic controller is configured to switch the communication control state to the first communication control state in a case where the communication control state is the second communication control state and the communicator does not receive the first signal before an elapsed period from when the communication control state is switched to the second communication control state becomes a second period.

16. A component for a human-powered vehicle, the component comprising:

a communicator configured to receive a first signal transmitted from at least one transmitter that is separate from the component; and an electronic controller configured to control the communicator in accordance with a communication control state, wherein:

the communication control state includes a first communication control state, a second communication control state in which power consumption of the communicator in the second communication control state is greater than power consumption of the communicator in the first communication control state, and a third communication control state, the third communication control state being different from the first communication control state and the second communication control state; and the electronic controller is configured to switch the communication control state to the first communication control state in a case where the communication control state is the second communication control state and the communicator does not receive the first signal before an elapsed period from when the communication control state is switched to the second communication control state becomes a second period, the electronic controller is configured to switch the communication control state to the third communication control state in a case where the communication control state is the second communication control state and the communicator receives the first signal before the elapsed period from when the communication control state is switched to the second communication control state becomes the second period.

17. The component according to claim 16, wherein:

the electronic controller is configured to control the communicator in the first communication control state so that a reception cycle of the communicator is a first reception cycle;

the electronic controller is configured to control the communicator in the second communication control state so that a reception cycle of the communicator is a second reception cycle;

the first reception cycle includes a first reception period;

the second reception cycle includes a second reception period;

the electronic controller is configured to control the communicator so that the communicator receives the first signal in the first reception period; and the electronic controller is configured to control the communicator so that the communicator receives the first signal in the second reception period.

18. The component according to claim 17, wherein the first reception cycle is longer than the second reception cycle.

19. The component according to claim 16, wherein the electronic controller is configured to switch the communication control state to the first communication control state as the second period elapses regardless of state of the human-powered vehicle in a case where the communication control state is the second communication control state and the communicator does not receive the first signal before the elapsed period from when the communication control state is switched to the second communication control state becomes the second period.

20. The component according to claim 13, wherein the state of the human-powered vehicle includes at least one of vehicle body state of the human-powered vehicle, traveling state of the human-powered vehicle, and state of a rider of the human-powered vehicle.

21. The component according to claim 20, further comprising:

a detector configured to detect the state of the human-powered vehicle, wherein the detector includes at least one of a vibration sensor, an acceleration sensor, an inclination sensor, a gyro sensor, a pressure sensor, a switch, a cadence sensor, a vehicle speed sensor, and a force sensor.

22. The component according to claim 20, wherein:

the human-powered vehicle includes a first additional component that is separate from the component;

the first additional component includes a detector configured to detect the state of the human-powered vehicle; and the electronic controller is configured to switch the communication control state to the other one of the first communication control state and the second communication control state in accordance with predetermined information transmitted from a first additional controller of the first additional component based on a detection result of the detector in a case where the communication control state is one of the first communication control state and the second communication control state.

23. The component according to claim 22, wherein the detector includes at least one of a vibration sensor, an acceleration sensor, an inclination sensor, a gyro sensor, a pressure sensor, a switch, a cadence sensor, a vehicle speed sensor, and a force sensor.

24. The component according to claim 22, wherein:

the first additional component includes a battery configured to supply electric power to the communicator; and the first additional component is configured to be attached to the human-powered vehicle separated from the component.

25. The component according to claim 22, wherein:

the first additional component includes a power generation unit configured to supply electric power to the communicator; and the power generation unit is configured to be attached to the human-powered vehicle separated from the component.

26. The component according to claim 1, wherein:

the human-powered vehicle includes a battery configured to supply electric power to the communicator; and the battery is configured to supply electric power to a second additional component that is separate from the component and is configured to be attached to the human-powered vehicle separated from the component.

27. The component according to claim 1, further comprising:

a battery configured to supply electric power to the communicator.

28. The component according to claim 27, further comprising a housing provided with the communicator, the electronic controller, and the battery.

29. The component according to claim 1, wherein the component includes at least one of an operating device, a transmission device, a drive unit that applies propulsion force to the human-powered vehicle, a brake, an adjustable seatpost, a suspension, a display device, a crank rotational state detector, a human driving force detector, and a tire pressure detector.

30. The component according to claim 29, wherein:

the component includes the transmission device; and the transmission device includes a derailleur.

31. A control system for a human-powered vehicle, the control system comprising:

the component according to claim 1; and the at least one transmitter.

32. A control system for a human-powered vehicle, the control system comprising:

a plurality of components; and at least one transmitter that is separate from the components, wherein each of the components is the component according to claim 1.

* * * * *